(12) United States Patent
Bao et al.

(10) Patent No.: US 12,177,923 B2
(45) Date of Patent: Dec. 24, 2024

(54) CONTROL LINK FOR LOW-POWER AND SIMPLIFIED TRANSCEIVER

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Arumugam Chendamarai Kannan, San Diego, CA (US); Taesang Yoo, San Diego, CA (US); Hamed Pezeshki, San Diego, CA (US); Mahmoud Taherzadeh Boroujeni, San Diego, CA (US); Ajay Gupta, San Diego, CA (US); Vinod Viswanatha Menon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/466,580

(22) Filed: Sep. 13, 2023

(65) Prior Publication Data

US 2023/0422335 A1 Dec. 28, 2023

Related U.S. Application Data

(63) Continuation of application No. 17/234,512, filed on Apr. 19, 2021, now Pat. No. 11,832,328.
(Continued)

(51) Int. Cl.
*H04W 76/19* (2018.01)
*H04W 72/21* (2023.01)
(Continued)

(52) U.S. Cl.
CPC ........... *H04W 76/19* (2018.02); *H04W 72/21* (2023.01); *H04W 74/04* (2013.01); *H04W 76/18* (2018.02)

(58) Field of Classification Search
CPC ............. H04W 72/1284; H04W 74/04; H04W 74/0833; H04W 76/18; H04W 76/19; H04W 88/04; Y02D 30/70
See application file for complete search history.

(56) References Cited

U.S. PATENT DOCUMENTS 6,889,064 B2    5/2005  Baratono et al.
10,056,963 B1   8/2018  Au
(Continued)

OTHER PUBLICATIONS

3GPP TS 36.300: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V16.1.0, Mar. 31, 2020, XP051893975, pp. 1-386.
(Continued)

*Primary Examiner* — Kashif Siddiqui
(74) *Attorney, Agent, or Firm* — Holland & Hart /QUALCOMM Incorporated

(57) ABSTRACT

Methods, systems, and devices for wireless communications are described. The described techniques provide for detecting when a control link between a user equipment (UE) and a base station is lost and recovering the control link. In one example, a UE may detect that a control link with a base station is lost based on a timer or counter expiring or based on failing to receive signaling from the base station. In another example, a UE may be configured to transmit uplink transmissions to a base station to maintain a control link with
(Continued)

the base station, and the base station may detect that a control link with the UE is lost if the base station fails to receive one or more uplink transmissions from the UE. If the control link is lost, the base station and the UE may communicate to re-establish the control link.

37 Claims, 41 Drawing Sheets

Related U.S. Application Data

(60) Provisional application No. 63/014,075, filed on Apr. 22, 2020, provisional application No. 63/014,077, filed on Apr. 22, 2020.

(51) Int. Cl.
  *H04W 74/04* (2009.01)
  *H04W 76/18* (2018.01)

(56) References Cited

U.S. PATENT DOCUMENTS

| | | | |
|---|---|---|---|
| 11,832,328 B2* | 11/2023 | Bao | H04W 72/21 |
| 2003/0151982 A1 | 8/2003 | Brewer et al. | |
| 2008/0013021 A1* | 1/2008 | Gugliotta | H04M 1/22 |
| | | | 349/113 |
| 2012/0163192 A1 | 6/2012 | Bae | |
| 2013/0003533 A1 | 1/2013 | Barbieri et al. | |
| 2014/0334299 A1 | 11/2014 | Ji et al. | |
| 2016/0112924 A1* | 4/2016 | Turakhia | H04W 24/10 |
| | | | 370/332 |
| 2017/0135151 A1* | 5/2017 | Fujishiro | H04L 45/245 |
| 2019/0103665 A1 | 4/2019 | Yoo et al. | |
| 2021/0051587 A1 | 2/2021 | Wu et al. | |
| 2021/0250778 A1 | 8/2021 | Tsutsui | |
| 2021/0337617 A1 | 10/2021 | Bao | |
| 2022/0231753 A1 | 7/2022 | Bengtsson et al. | |
| 2023/0090741 A1* | 3/2023 | Dong | H04W 74/004 |
| | | | 370/329 |

OTHER PUBLICATIONS

Abeywickrama S., et al., "Intelligent Reflecting Surface: Practical Phase Shift Model and Beamforming Optimization", arxiv.org, Cornell University Library, 201 Olin Library Cornell University Ithaca, NY 14853, Jul. 13, 2019 (Jul. 13, 2019), XP081441628, pp. 1-5, section II.
Intel Corporation: "Beam Failure and Radio Link Failure Handlings", 3GPP Draft, R2-1707052, 3GPP TSG RAN WG2 NR Ad-Hoc, 3rd Generation Partnership Project (3GPP), Mobile Competence Centre, 650, Route Des Lucioles, F-06921 Sophia-Antipolis Cedex, France, vol. RAN WG2, No. Qingdao, China, Jun. 27, 2017-Jun. 29, 2017, Jun. 26, 2017 (Jun. 26, 2017), XP051301548, 5 Pages, the whole document.
International Preliminary Report on Patentability—PCT/US2021/ 028217 The International Bureau of WIPO—Geneva, Switzerland, Nov. 3, 2022.
International Search Report and Written Opinion—PCT/US2021/ 028217—ISA/EPO—Aug. 18, 2021.
Mediatek Inc: "Discussion on Beam Recovery Mechanism", 3GPP Draft, 3GPP TSG RAN WG1 Meeting #90, R1-1713697_ BeamRecovery_Final, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 21, 2017-Aug. 25, 2017, Aug. 20, 2017 (Aug. 20, 2017), XP051316496, sections 2, 3, 4.
ZTE, et al., "Consideration on Beam Failure Recovery on SCell", 3GPP Draft, 3GPP TSG RAN WG2 Meeting #107, R2-1910404— Consideration On Beam Failure Recovery For SCell, 3rd Generation Partnership Project (3GPP), Mobile Competence Centre, 650, Route Des Lucioles, F-06921 Sophia-Antipolis Cedex, vol. RAN WG2, No. Prague, Czech Republic, Aug. 26, 2019-Aug. 30, 2019, Aug. 16, 2019 (Aug. 16, 2019), 5 Pages, XP051768183, the whole document.

* cited by examiner

CONTROL LINK FOR LOW-POWER AND SIMPLIFIED TRANSCEIVER

CROSS REFERENCE

The present Application for Patent is a continuation of U.S. patent application Ser. No. 17/234,512 by BAO et al., entitled "CONTROL LINK FOR LOW-POWER AND SIMPLIFIED TRANSCEIVER," filed Apr. 19, 2021, assigned to the assignee hereof, and expressly incorporated by reference herein, which claims the benefit of U.S. Provisional Patent Application No. 63/014,077 by BAO et al., entitled "CONTROL LINK FOR LOW-POWER AND SIMPLIFIED TRANSCEIVER," filed Apr. 22, 2020, assigned to the assignee hereof, and expressly incorporated by reference herein and U.S. Provisional Patent Application No. 63/014,075 by BAO et al., entitled "RANDOM-ACCESS PROCEDURE FOR LOW-POWER AND SIMPLIFIED TRANSCEIVER," filed Apr. 22, 2020, assigned to the assignee hereof, and expressly incorporated by reference herein.

INTRODUCTION

The following relates to wireless communications and more specifically to managing a control link between a base station and a low-power and simplified transceiver.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may transmit downlink data and control information directly to a UE (e.g., using beamforming). In some cases, however, the path between the base station and the UE may be obstructed or blocked, which may affect the ability of the UE to receive a downlink transmission from the base station.

SUMMARY

A method for wireless communication at a first device is described. The method may include establishing a first link with the base station based on a first random access procedure, the first link including a control link associated with controlling a state of the first device, the first device including a reflective surface for forwarding signals associated with a second link from the base station to a second device in a wireless network, detecting that the first link with the base station is lost based on a timer or counter expiring or based on failing to receive signaling from the base station, and re-establishing the first link with the base station based on detecting that the first link with the base station is lost, the first link re-established based on a second random access procedure.

An apparatus for wireless communication at a first device is described. The apparatus may include a processor and memory coupled to the processor. The processor and memory may be configured to establish a first link with the base station based on a first random access procedure, the first link including a control link associated with controlling a state of the first device, the first device including a reflective surface for forwarding signals associated with a second link from the base station to a second device in a wireless network, detect that the first link with the base station is lost based on a timer or counter expiring or based on failing to receive signaling from the base station, and re-establish the first link with the base station based on detecting that the first link with the base station is lost, the first link re-established based on a second random access procedure.

Another apparatus for wireless communication at a first device is described. The apparatus may include means for establishing a first link with the base station based on a first random access procedure, the first link including a control link associated with controlling a state of the first device, the first device including a reflective surface for forwarding signals associated with a second link from the base station to a second device in a wireless network, means for detecting that the first link with the base station is lost based on a timer or counter expiring or based on failing to receive signaling from the base station, and means for re-establishing the first link with the base station based on detecting that the first link with the base station is lost, the first link re-established based on a second random access procedure.

A non-transitory computer-readable medium storing code for wireless communication at a first device is described. The code may include instructions executable by a processor to establish a first link with the base station based on a first random access procedure, the first link including a control link associated with controlling a state of the first device, the first device including a reflective surface for forwarding signals associated with a second link from the base station to a second device in a wireless network, detect that the first link with the base station is lost based on a timer or counter expiring or based on failing to receive signaling from the base station, and re-establish the first link with the base station based on detecting that the first link with the base station is lost, the first link re-established based on a second random access procedure.

Some examples of the method, apparatuses, and non-transitory computer-readable medium described herein may further include operations, features, means, or instructions for failing to receive one or more periodic indicators in a control channel, where detecting that the first link with the base station may be lost may be based on failing to receive the one or more periodic indicators in the control channel.

Some examples of the method, apparatuses, and non-transitory computer-readable medium described herein may further include operations, features, means, or instructions for incrementing the counter after failing to receive each of the one or more periodic indicators in the control channel, where detecting that the first link with the base station may be lost may be based on the counter exceeding a threshold.

Some examples of the method, apparatuses, and non-transitory computer-readable medium described herein may further include operations, features, means, or instructions for decrementing the counter after failing to receive each of the one or more periodic indicators in the control channel, where detecting that the first link with the base station may be lost may be based on the counter reaching zero.

Some examples of the method, apparatuses, and non-transitory computer-readable medium described herein may further include operations, features, means, or instructions for identifying that the first link with the base station may be valid for a duration of the timer, where detecting that the first link with the base station may be lost may be based on the timer expiring.

Some examples of the method, apparatuses, and non-transitory computer-readable medium described herein may further include operations, features, means, or instructions for failing to detect energy from the base station for a duration of the timer, where detecting that the first link with the base station may be lost may be based on failing to detect the energy from the base station for the duration of the timer.

Some examples of the method, apparatuses, and non-transitory computer-readable medium described herein may further include operations, features, means, or instructions for restarting the timer after detecting the energy from the base station.

In some examples of the method, apparatuses, and non-transitory computer-readable medium described herein, performing the second random-access procedure may include operations, features, means, or instructions for performing a contention-free random-access procedure using a cell radio network temporary identifier (C-RNTI) to re-establish the first link with the base station.

Some examples of the method, apparatuses, and non-transitory computer-readable medium described herein may further include operations, features, means, or instructions for transmitting, to the base station, a random-access preamble including an indication that the first device includes the reflective surface, the random-access preamble initiating the first random-access procedure with the base station.

Some examples of the method, apparatuses, and non-transitory computer-readable medium described herein may further include operations, features, means, or instructions for identifying the random-access preamble from one or more random-access preambles reserved for indicating that the first device includes the reflective surface.

In some examples of the method, apparatuses, and non-transitory computer-readable medium described herein, the first device includes a user equipment (UE), the second device includes a UE, and the second device includes a base station.

A method for wireless communication at a base station is described. The method may include establishing a first link with a first device based on a first random-access procedure, the first link including a control link associated with controlling a state of the first device, the first device including a reflective surface for forwarding signals associated with a second link from the base station to a second device in a wireless network, transmitting signaling to the first device to maintain the first link with the first device, and performing a second random-access procedure to re-establish the first link with the first device after the first link with the first device is lost.

An apparatus for wireless communication at a base station is described. The apparatus may include a processor and memory coupled to the processor. The processor and memory may be configured to establish a first link with a first device based on a first random-access procedure, the first link including a control link associated with controlling a state of the first device, the first device including a reflective surface for forwarding signals associated with a second link from the base station to a second device in a wireless network, transmit signaling to the first device to maintain the first link with the first device, and perform a second random-access procedure to re-establish the first link with the first device after the first link with the first device is lost.

Another apparatus for wireless communication at a base station is described. The apparatus may include means for establishing a first link with a first device based on a first random-access procedure, the first link including a control link associated with controlling a state of the first device, the first device including a reflective surface for forwarding signals associated with a second link from the base station to a second device in a wireless network, means for transmitting signaling to the first device to maintain the first link with the first device, and means for performing a second random-access procedure to re-establish the first link with the first device after the first link with the first device is lost.

A non-transitory computer-readable medium storing code for wireless communication at a base station is described. The code may include instructions executable by a processor to establish a first link with a first device based on a first random-access procedure, the first link including a control link associated with controlling a state of the first device, the first device including a reflective surface for forwarding signals associated with a second link from the base station to a second device in a wireless network, transmit signaling to the first device to maintain the first link with the first device, and perform a second random-access procedure to re-establish the first link with the first device after the first link with the first device is lost.

In some examples of the method, apparatuses, and non-transitory computer-readable medium described herein, transmitting signaling to the first device to maintain the first link with the first device may include operations, features, means, or instructions for transmitting one or more periodic indicators in a control channel to the base station, where the first link with the first device may be lost when the first device fails to receive a threshold number of the one or more periodic indicators.

Some examples of the method, apparatuses, and non-transitory computer-readable medium described herein may further include operations, features, means, or instructions for receiving, from the first device, a random-access preamble including an indication that the first device includes the reflective surface, the random-access preamble initiating the first random-access procedure with the first device.

In some examples of the method, apparatuses, and non-transitory computer-readable medium described herein, performing the second random-access procedure may include operations, features, means, or instructions for performing a contention-free random-access procedure using a cell radio network temporary identifier (C-RNTI) to re-establish the first link with the first device.

A method for wireless communication at a first device is described. The method may include establishing a first link with a base station based on a first random-access procedure, the first link including a control link associated with controlling a state of the first device, the first device including a reflective surface for forwarding signals associated with a second link from the base station to a second device in a wireless network and transmitting an uplink transmission to the base station to maintain the first link with the base station.

An apparatus for wireless communication at a first device is described. The apparatus may include a processor and memory coupled to the processor. The processor and memory may be configured to establish a first link with a base station based on a first random-access procedure, the first link including a control link associated with controlling a state of the first device, the first device including a reflective surface for forwarding signals associated with a second link from the base station to a second device in a wireless network and transmit an uplink transmission to the base station to maintain the first link with the base station.

Another apparatus for wireless communication at a first device is described. The apparatus may include means for establishing a first link with a base station based on a first random-access procedure, the first link including a control link associated with controlling a state of the first device, the first device including a reflective surface for forwarding signals associated with a second link from the base station to a second device in a wireless network and means for transmitting an uplink transmission to the base station to maintain the first link with the base station.

A non-transitory computer-readable medium storing code for wireless communication at a first device is described. The code may include instructions executable by a processor to establish a first link with a base station based on a first random-access procedure, the first link including a control link associated with controlling a state of the first device, the first device including a reflective surface for forwarding signals associated with a second link from the base station to a second device in a wireless network and transmit an uplink transmission to the base station to maintain the first link with the base station.

In some examples of the method, apparatuses, and non-transitory computer-readable medium described herein, the uplink transmission includes a scheduling request.

In some examples of the method, apparatuses, and non-transitory computer-readable medium described herein, the uplink transmission includes a periodic uplink transmission.

Some examples of the method, apparatuses, and non-transitory computer-readable medium described herein may further include operations, features, means, or instructions for receiving a request for the uplink transmission from the first device in response to a downlink transmission and receiving the downlink transmission from the base station, where the uplink transmission may be received in response to the downlink transmission.

In some examples of the method, apparatuses, and non-transitory computer-readable medium described herein, transmitting the uplink transmission to the base station may include operations, features, means, or instructions for transmitting a random-access preamble indicating a quantity of control commands received from the base station.

Some examples of the method, apparatuses, and non-transitory computer-readable medium described herein may further include operations, features, means, or instructions for transmitting, to the base station, a random-access preamble including an indication that the first device includes a reflective surface, the random-access preamble initiating the first random-access procedure with the base station.

Some examples of the method, apparatuses, and non-transitory computer-readable medium described herein may further include operations, features, means, or instructions for identifying the random-access preamble from one or more random-access preambles reserved for indicating that the first device includes the reflective surface.

In some examples of the method, apparatuses, and non-transitory computer-readable medium described herein, the first device includes a UE, the second device includes a UE, and the second device includes a base station.

A method for wireless communication at a base station is described. The method may include establishing a first link with a first device based on a first random-access procedure, the first link including a control link associated with controlling a state of the first device, the first device including a reflective surface for forwarding signals associated with a second link from the base station to a second device in a wireless network and receiving an uplink transmission from the first device to maintain the first link with the base station.

An apparatus for wireless communication at a base station is described. The apparatus may include a processor and memory coupled to the processor. The processor and memory may be configured to establish a first link with a first device based on a first random-access procedure, the first link including a control link associated with controlling a state of the first device, the first device including a reflective surface for forwarding signals associated with a second link from the base station to a second device in a wireless network and receive an uplink transmission from the first device to maintain the first link with the base station.

Another apparatus for wireless communication at a base station is described. The apparatus may include means for establishing a first link with a first device based on a first random-access procedure, the first link including a control link associated with controlling a state of the first device, the first device including a reflective surface for forwarding signals associated with a second link from the base station to a second device in a wireless network and means for receiving an uplink transmission from the first device to maintain the first link with the base station.

A non-transitory computer-readable medium storing code for wireless communication at a base station is described. The code may include instructions executable by a processor to establish a first link with a first device based on a first random-access procedure, the first link including a control link associated with controlling a state of the first device, the first device including a reflective surface for forwarding signals associated with a second link from the base station to a second device in a wireless network and receive an uplink transmission from the first device to maintain the first link with the base station.

Some examples of the method, apparatuses, and non-transitory computer-readable medium described herein may further include operations, features, means, or instructions for failing to receive one or more uplink transmissions from the first device, detecting that the first link with the first device may be lost based on failing to receive the one or more uplink transmissions from the first device, and avoiding transmitting downlink signals to the first device for forwarding to the device in the wireless network until the first device performs a second random-access procedure to re-establish the first link with the base station.

In some examples of the method, apparatuses, and non-transitory computer-readable medium described herein, the uplink transmission includes a scheduling request.

In some examples of the method, apparatuses, and non-transitory computer-readable medium described herein, the uplink transmission includes a periodic uplink transmission.

Some examples of the method, apparatuses, and non-transitory computer-readable medium described herein may further include operations, features, means, or instructions for transmitting a request for the uplink transmission from the first device in response to a downlink transmission and transmitting the downlink transmission to the first device, where the uplink transmission may be received in response to the downlink transmission.

In some examples of the method, apparatuses, and non-transitory computer-readable medium described herein, receiving the uplink transmission from the first device may include operations, features, means, or instructions for receiving a random-access preamble indicating a first quantity of control commands received from the base station.

Some examples of the method, apparatuses, and non-transitory computer-readable medium described herein may further include operations, features, means, or instructions for determining that a second quantity of control commands transmitted by the base station exceeds the first quantity of control commands received by the first device by a threshold amount, detecting that the first link with the first device may be lost based on the determining, and avoiding transmitting downlink signals to the first device for forwarding to the device in the wireless network until the first device performs a second random-access procedure to re-establish the first link with the base station.

A method of wireless communication at a UE is described. The method may include performing a first random-access procedure to establish a control link with a base station, the UE including a reflective surface for forwarding signals from the base station to a device in a wireless network, detecting that the control link with the base station is lost based on a timer or counter expiring or based on failing to receive signaling from the base station, and performing a second random-access procedure to re-establish the control link with the base station based on detecting that the control link with the base station is lost.

An apparatus for wireless communication at a UE is described. The apparatus may include a processor and memory coupled to the processor. The processor and memory may be configured to perform a first random-access procedure to establish a control link with a base station, the UE including a reflective surface for forwarding signals from the base station to a device in a wireless network, detect that the control link with the base station is lost based on a timer or counter expiring or based on failing to receive signaling from the base station, and perform a second random-access procedure to re-establish the control link with the base station based on detecting that the control link with the base station is lost.

Another apparatus for wireless communication at a UE is described. The apparatus may include means for performing a first random-access procedure to establish a control link with a base station, the UE including a reflective surface for forwarding signals from the base station to a device in a wireless network, detecting that the control link with the base station is lost based on a timer or counter expiring or based on failing to receive signaling from the base station, and performing a second random-access procedure to re-establish the control link with the base station based on detecting that the control link with the base station is lost.

A non-transitory computer-readable medium storing code for wireless communication at a UE is described. The code may include instructions executable by a processor to perform a first random-access procedure to establish a control link with a base station, the UE including a reflective surface for forwarding signals from the base station to a device in a wireless network, detect that the control link with the base station is lost based on a timer or counter expiring or based on failing to receive signaling from the base station, and perform a second random-access procedure to re-establish the control link with the base station based on detecting that the control link with the base station is lost.

Some examples of the method, apparatuses, and non-transitory computer-readable medium described herein may further include operations, features, means, or instructions for failing to receive one or more periodic indicators in a control channel, where detecting that the control link with the base station may be lost may be based on failing to receive the one or more periodic indicators in the control channel. Some examples of the method, apparatuses, and non-transitory computer-readable medium described herein may further include operations, features, means, or instructions for incrementing a counter after failing to receive each of the one or more periodic indicators in the control channel, where detecting that the control link with the base station may be lost may be based on the counter exceeding a threshold.

Some examples of the method, apparatuses, and non-transitory computer-readable medium described herein may further include operations, features, means, or instructions for decrementing a counter after failing to receive each of the one or more periodic indicators in the control channel, where detecting that the control link with the base station may be lost may be based on the counter reaching zero. Some examples of the method, apparatuses, and non-transitory computer-readable medium described herein may further include operations, features, means, or instructions for identifying that the control link with the base station may be valid for a duration of the timer, where detecting that the control link with the base station may be lost may be based on the timer expiring.

Some examples of the method, apparatuses, and non-transitory computer-readable medium described herein may further include operations, features, means, or instructions for failing to detect energy from the base station for a duration of the timer, where detecting that the control link with the base station may be lost may be based on failing to detect the energy from the base station for the duration of the timer. Some examples of the method, apparatuses, and non-transitory computer-readable medium described herein may further include operations, features, means, or instructions for restarting the timer after detecting energy from the base station. In some examples of the method, apparatuses, and non-transitory computer-readable medium described herein, performing the second random-access procedure may include operations, features, means, or instructions for performing a contention-free random-access procedure using a cell radio network temporary identifier (C-RNTI) to re-establish the control link with the base station.

A method of wireless communication at a base station is described. The method may include performing a first random-access procedure to establish a control link with a UE, the UE including a reflective surface for forwarding signals from the base station to a device in a wireless network, transmitting signaling to the UE to maintain the control link with the UE, and performing a second random-access procedure to re-establish the control link with the UE after the control link with the UE is lost.

An apparatus for wireless communication at a base station is described. The apparatus may include a processor and memory coupled to the processor. The processor and memory may be configured to perform a first random-access procedure to establish a control link with a UE, the UE including a reflective surface for forwarding signals from the base station to a device in a wireless network, transmit signaling to the UE to maintain the control link with the UE, and perform a second random-access procedure to re-establish the control link with the UE after the control link with the UE is lost.

Another apparatus for wireless communication at a base station is described. The apparatus may include means for performing a first random-access procedure to establish a control link with a UE, the UE including a reflective surface for forwarding signals from the base station to a device in a wireless network, transmitting signaling to the UE to maintain the control link with the UE, and performing a second random-access procedure to re-establish the control link with the UE after the control link with the UE is lost.

A non-transitory computer-readable medium storing code for wireless communication at a base station is described. The code may include instructions executable by a processor to perform a first random-access procedure to establish a control link with a UE, the UE including a reflective surface for forwarding signals from the base station to a device in a wireless network, transmit signaling to the UE to maintain the control link with the UE, and perform a second random-access procedure to re-establish the control link with the UE after the control link with the UE is lost.

In some examples of the method, apparatuses, and non-transitory computer-readable medium described herein, transmitting signaling to the UE to maintain the control link with the UE may include operations, features, means, or instructions for transmitting one or more periodic indicators in a control channel to the base station, where the control link with the UE may be lost when the UE fails to receive a threshold number of the one or more periodic indicators. In some examples of the method, apparatuses, and non-transitory computer-readable medium described herein, performing the second random-access procedure may include operations, features, means, or instructions for performing a contention-free random-access procedure using a cell radio network temporary identifier (C-RNTI) to re-establish the control link with the UE.

A method of wireless communication at a UE is described. The method may include performing a first random-access procedure to establish a control link with a base station, the UE including a reflective surface for forwarding signals from the base station to a device in a wireless network and transmitting an uplink transmission to the base station to maintain the control link with the base station.

An apparatus for wireless communication at a UE is described. The apparatus may include a processor and memory coupled to the processor. The processor and memory may be configured to perform a first random-access procedure to establish a control link with a base station, the UE including a reflective surface for forwarding signals from the base station to a device in a wireless network and transmit an uplink transmission to the base station to maintain the control link with the base station.

Another apparatus for wireless communication at a UE is described. The apparatus may include means for performing a first random-access procedure to establish a control link with a base station, the UE including a reflective surface for forwarding signals from the base station to a device in a wireless network and transmitting an uplink transmission to the base station to maintain the control link with the base station.

A non-transitory computer-readable medium storing code for wireless communication at a UE is described. The code may include instructions executable by a processor to perform a first random-access procedure to establish a control link with a base station, the UE including a reflective surface for forwarding signals from the base station to a device in a wireless network and transmit an uplink transmission to the base station to maintain the control link with the base station.

In some examples of the method, apparatuses, and non-transitory computer-readable medium described herein, the uplink transmission includes a scheduling request. In some examples of the method, apparatuses, and non-transitory computer-readable medium described herein, the uplink transmission includes a periodic uplink transmission. Some examples of the method, apparatuses, and non-transitory computer-readable medium described herein may further include operations, features, means, or instructions for receiving a request for the uplink transmission from the UE in response to a downlink transmission, and receiving the downlink transmission from the base station, where the uplink transmission may be received in response to the downlink transmission. In some examples of the method, apparatuses, and non-transitory computer-readable medium described herein, transmitting the uplink transmission to the base station may include operations, features, means, or instructions for transmitting a random-access preamble indicating a quantity of control commands received from the base station.

A method of wireless communication at a base station is described. The method may include performing a first random-access procedure to establish a control link with a UE, the UE including a reflective surface for forwarding signals from the base station to a device in a wireless network and receiving an uplink transmission from the UE used to maintain the control link with the base station.

An apparatus for wireless communication at a base station is described. The apparatus may include a processor and memory coupled to the processor. The processor and memory may be configured to perform a first random-access procedure to establish a control link with a UE, the UE including a reflective surface for forwarding signals from the base station to a device in a wireless network and receive an uplink transmission from the UE used to maintain the control link with the base station.

Another apparatus for wireless communication at a base station is described. The apparatus may include means for performing a first random-access procedure to establish a control link with a UE, the UE including a reflective surface for forwarding signals from the base station to a device in a wireless network and receiving an uplink transmission from the UE used to maintain the control link with the base station.

A non-transitory computer-readable medium storing code for wireless communication at a base station is described. The code may include instructions executable by a processor to perform a first random-access procedure to establish a control link with a UE, the UE including a reflective surface for forwarding signals from the base station to a device in a wireless network and receive an uplink transmission from the UE used to maintain the control link with the base station.

Some examples of the method, apparatuses, and non-transitory computer-readable medium described herein may further include operations, features, means, or instructions for failing to receive one or more uplink transmissions from the UE, detecting that the control link with the UE may be lost based on failing to receive the one or more uplink transmissions from the UE, and avoiding transmitting downlink signals to the UE for forwarding to the device in the wireless network until the UE performs a second random-access procedure to re-establish the control link with the base station. In some examples of the method, apparatuses, and non-transitory computer-readable medium described herein, the uplink transmission includes a scheduling request. In some examples of the method, apparatuses, and non-transitory computer-readable medium described herein, the uplink transmission includes a periodic uplink transmission. Some examples of the method, apparatuses, and non-transitory computer-readable medium described herein may further include operations, features, means, or instructions for transmitting a request for the uplink transmission from the UE in response to a downlink transmission, and transmitting the downlink transmission to the UE, where the uplink transmission may be received in response to the downlink transmission.

In some examples of the method, apparatuses, and non-transitory computer-readable medium described herein, receiving the uplink transmission from the UE may include operations, features, means, or instructions for receiving a random-access preamble indicating a first quantity of control commands received from the base station. Some examples of the method, apparatuses, and non-transitory computer-readable medium described herein may further include operations, features, means, or instructions for determining that a second quantity of control commands transmitted by the base station exceeds the first quantity of control commands received by the UE by a threshold amount, detecting that the control link with the UE may be lost based on the determining, and avoiding transmitting downlink signals to the UE for forwarding to the device in the wireless network until the UE performs a second random-access procedure to re-establish the control link with the base station.

A method of wireless communication at a UE is described. The method may include initiating a random-access procedure to connect to a base station, transmitting, to the base station, an indication that the UE includes a reflective surface for forwarding signals from the base station to a device in a wireless network, and receiving signals from the base station for forwarding to the device in the wireless network based on transmitting the indication.

An apparatus for wireless communication at a UE is described. The apparatus may include a processor and memory coupled with the processor. The processor and memory may be configured to connect to a base station, transmit, to the base station, an indication that the UE includes a reflective surface for forwarding signals from the base station to a device in a wireless network, and receive signals from the base station for forwarding to the device in the wireless network based on transmitting the indication.

Another apparatus for wireless communication at a UE is described. The apparatus may include means for initiating a random-access procedure to connect to a base station, transmitting, to the base station, an indication that the UE includes a reflective surface for forwarding signals from the base station to a device in a wireless network, and receiving signals from the base station for forwarding to the device in the wireless network based on transmitting the indication.

A non-transitory computer-readable medium storing code for wireless communication at a UE is described. The code may include instructions executable by a processor to initiate a random-access procedure to connect to a base station, transmit, to the base station, an indication that the UE includes a reflective surface for forwarding signals from the base station to a device in a wireless network, and receive signals from the base station for forwarding to the device in the wireless network based on transmitting the indication.

In some examples of the method, apparatuses, and non-transitory computer-readable medium described herein, transmitting the indication that the UE may include operations, features, means, or instructions for transmitting a random-access preamble indicating that the UE includes the reflective surface. Some examples of the method, apparatuses, and non-transitory computer-readable medium described herein may further include operations, features, means, or instructions for identifying the random-access preamble from one or more random-access preambles reserved for indicating that the UE includes the reflective surface. In some examples of the method, apparatuses, and non-transitory computer-readable medium described herein, transmitting the indication that the UE may include operations, features, means, or instructions for transmitting a first random-access message in a two-step random-access procedure including the indication that the UE includes the reflective surface.

In some examples of the method, apparatuses, and non-transitory computer-readable medium described herein, transmitting the indication that the UE may include operations, features, means, or instructions for transmitting a third random-access message in a four-step random-access procedure including the indication that the UE includes the reflective surface. In some examples of the method, apparatuses, and non-transitory computer-readable medium described herein, transmitting the indication that the UE may include operations, features, means, or instructions for transmitting, after the random-access procedure, a radio resource control (RRC) message indicating that the UE includes the reflective surface. Some examples of the method, apparatuses, and non-transitory computer-readable medium described herein may further include operations, features, means, or instructions for receiving an indication of one or more random-access preambles reserved for indicating that the UE includes the reflective surface, and transmitting, as part of a subsequent random-access procedure, a random-access preamble of the one or more random-access preambles indicating that the UE includes the reflective surface.

Some examples of the method, apparatuses, and non-transitory computer-readable medium described herein may further include operations, features, means, or instructions for receiving, from the base station, a command indicating a sweep pattern, sweep direction, center frequency, bandwidth, or a combination thereof for forwarding signals from the base station to the device in the wireless network, and forwarding signals from the base station to the device in the wireless network based on receiving the command. Some examples of the method, apparatuses, and non-transitory computer-readable medium described herein may further include operations, features, means, or instructions for receiving, from the base station, a command indicating positive or negative feedback for signals forwarded from the base station to the device in the wireless network, tuning parameters for forwarding signals from the base station to the device in the wireless network based on the command, and forwarding signals from the base station to the device in the wireless network based on the tuning.

Some examples of the method, apparatuses, and non-transitory computer-readable medium described herein may further include operations, features, means, or instructions for transmitting an indication of a location of the device in the wireless network to the base station. Some examples of the method, apparatuses, and non-transitory computer-readable medium described herein may further include operations, features, means, or instructions for receiving one or more signals from the base station, and reflecting the one or more signals back to the base station at a same angle at which the one or more signals may be received. In some examples of the method, apparatuses, and non-transitory computer-readable medium described herein, the UE includes a low-power UE and the reflective surface includes an intelligent reflective surface (IRS).

A method of wireless communication at a base station is described. The method may include receiving, from a UE, an indication that the UE includes a reflective surface for forwarding signals from the base station to a device in a wireless network and transmitting signals to the UE for forwarding to the device in the wireless network based on receiving the indication.

An apparatus for wireless communication at a base station is described. The apparatus may include a processor and memory coupled to the processor. The processor and memory may be configured to receive, from a UE, an indication that the UE includes a reflective surface for forwarding signals from the base station to a device in a wireless network and transmit signals to the UE for forwarding to the device in the wireless network based on receiving the indication.

Another apparatus for wireless communication at a base station is described. The apparatus may include means for receiving, from a UE, an indication that the UE includes a reflective surface for forwarding signals from the base station to a device in a wireless network and transmitting signals to the UE for forwarding to the device in the wireless network based on receiving the indication.

A non-transitory computer-readable medium storing code for wireless communication at a base station is described. The code may include instructions executable by a processor to receive, from a UE, an indication that the UE includes a reflective surface for forwarding signals from the base station to a device in a wireless network and transmit signals to the UE for forwarding to the device in the wireless network based on receiving the indication.

In some examples of the method, apparatuses, and non-transitory computer-readable medium described herein, receiving the indication that the UE may include operations, features, means, or instructions for receiving a random-access preamble indicating that the UE includes the reflective surface. In some examples of the method, apparatuses, and non-transitory computer-readable medium described herein, receiving the indication that the UE may include operations, features, means, or instructions for receiving a first random-access message in a two-step random-access procedure including the indication that the UE includes the reflective surface. In some examples of the method, apparatuses, and non-transitory computer-readable medium described herein, receiving the indication that the UE may include operations, features, means, or instructions for receiving a third random-access message in a four-step random-access procedure including the indication that the UE includes the reflective surface.

In some examples of the method, apparatuses, and non-transitory computer-readable medium described herein, receiving the indication that the UE may include operations, features, means, or instructions for receiving, after a random-access procedure, a RRC message indicating that the UE includes the reflective surface. Some examples of the method, apparatuses, and non-transitory computer-readable medium described herein may further include operations, features, means, or instructions for transmitting, to the UE, an indication of one or more random-access preambles reserved for indicating that the UE includes the reflective surface, and receiving, from the UE as part of a subsequent random-access procedure, a random-access preamble of the one or more random-access preambles indicating that the UE includes the reflective surface. Some examples of the method, apparatuses, and non-transitory computer-readable medium described herein may further include operations, features, means, or instructions for transmitting, to the UE, a command indicating a sweep pattern, sweep direction, center frequency, bandwidth, or a combination thereof for forwarding signals from the base station to the device in the wireless network.

Some examples of the method, apparatuses, and non-transitory computer-readable medium described herein may further include operations, features, means, or instructions for receiving, from the device in the wireless network, feedback on signals forwarded by the UE from the base station to the device in the wireless network, where transmitting the command may be based on the received feedback. Some examples of the method, apparatuses, and non-transitory computer-readable medium described herein may further include operations, features, means, or instructions for receiving, from the device in the wireless network, feedback on signals forwarded by the UE from the base station to the device in the wireless network, and transmitting, to the UE, a command indicating positive or negative feedback for signals forwarded from the base station to the device in the wireless network based on receiving the feedback.

Some examples of the method, apparatuses, and non-transitory computer-readable medium described herein may further include operations, features, means, or instructions for transmitting, to the UE on a set of beams, a set of signals for forwarding to the device in the wireless network, receiving, from the device in the wireless network, feedback on the set of signals forwarded by the UE from the base station to the device in the wireless network, identifying a beam of the set of beams associated with a highest quality based on the received feedback, and selecting the identified beam for transmitting signals to the UE for forwarding to the device in the wireless network. Some examples of the method, apparatuses, and non-transitory computer-readable medium described herein may further include operations, features, means, or instructions for receiving an indication of a location of the UE, and selecting a beam for transmitting signals to the UE for forwarding to the device in the wireless network based on the location of the UE.

Some examples of the method, apparatuses, and non-transitory computer-readable medium described herein may further include operations, features, means, or instructions for transmitting a set of signals to the UE on a set of beams, receiving a reflection of the set of signals from the UE at a same angle at which the set of signals may be transmitted to the UE on the set of beams, identifying a beam of the set of beams associated with a highest quality based on receiving the reflection, and selecting the identified beam for transmitting signals to the UE for forwarding to the device in the wireless network. Some examples of the method, apparatuses, and non-transitory computer-readable medium described herein may further include operations, features, means, or instructions for selecting a beam identified in the random-access procedure for transmitting signals to the UE for forwarding to the device in the wireless network. In some examples of the method, apparatuses, and non-transitory computer-readable medium described herein, the UE includes a low-power UE and the reflective surface includes an IRS.

DETAILED DESCRIPTION

Some wireless communications systems may support communications between a base station and another device (e.g., a UE or another base station) via an intelligent reflective surface (IRS). In particular, the base station may transmit downlink signals to the IRS for forwarding to the other device. The IRS may redirect the downlink signals to the other device such that the other device may reliably receive the downlink signals from the base station (e.g., even when there is an obstruction in the path between the base station and the other device). In such systems, it may be appropriate for the IRS to connect to the base station to forward signals from the base station to other devices. In some examples, forwarding signals may include reflecting signals received from the base station to other devices and may be described as redirecting, relaying, or routing the signals. For example, it may be appropriate for the IRS to establish a control link with the base station to receive control information from the base station and establish a data link with the base station to receive downlink signals from the base station for forwarding to other devices. In some cases, however, it may be challenging for the IRS to maintain the control link with the base station (e.g., if the IRS is set up for minimal communication with the base station).

As described herein, a UE and a base station in a wireless communications system may detect when a control link between the UE and the base station is lost and recover the control link. Specifically, the UE and the base station may maintain the control link with minimal signaling. In one example, the UE may detect that a control link with a base station is lost based on a timer or counter expiring or based on failing to receive signaling from the base station. For example, the base station may be configured to transmit signaling to the UE to maintain the control link with the UE, and the UE may detect that the control link is lost when the UE fails to receive the signaling. In another example, a UE may transmit uplink signals to a base station to maintain a control link with the base station, and, if the base station fails to receive one or more of the uplink signals, the base station may determine that the control link with the UE is lost. In this example, the base station may wait until the control link is re-established to transmit downlink signals to the UE for forwarding to another device.

Aspects of the disclosure introduced above are described below in the context of a wireless communications system. Examples of processes and signaling exchanges that support a control link for a low-power and simplified transceiver are then described. Aspects of the disclosure are further illustrated by and described with reference to apparatus diagrams, system diagrams, and flowcharts that relate to a control link for a low-power and simplified transceiver.

Figure 1:
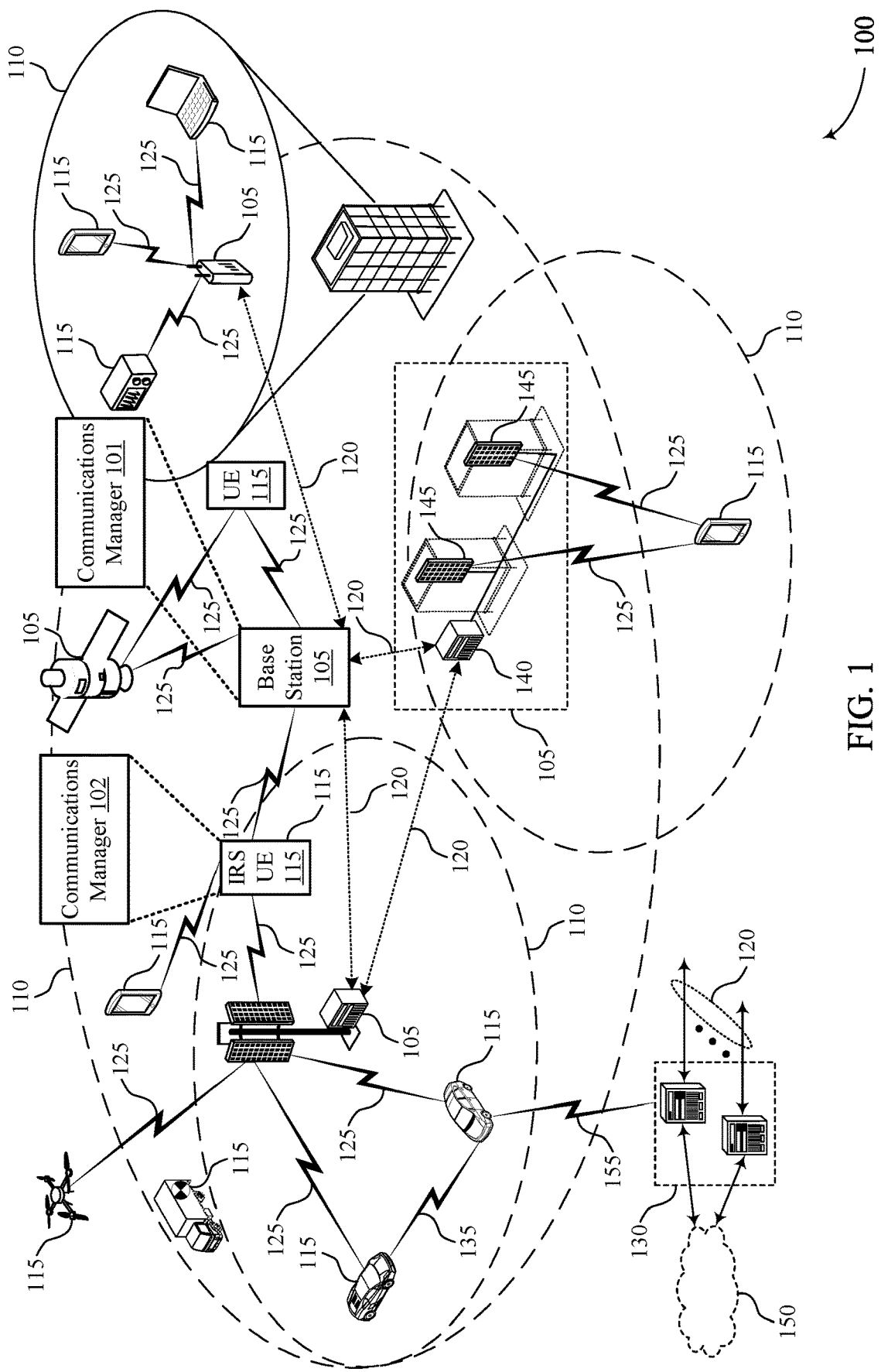
FIG. 1 illustrates an example of a wireless communications system that supports a control link for a low-power and simplified transceiver in accordance with one or more aspects of the present disclosure.

FIG. 1 illustrates an example of a wireless communications system 100 that supports a control link for a low-power and simplified transceiver in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, or FR5, or may be within the EHF band.

The wireless communications system 100 may operate using one or more frequency bands, for example in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ feedback may include an acknowledgment (ACK) indicating that a receiving device successfully received a transmission from a transmitting device or a negative ACK (NACK) indicating that a receiving device failed to receive a transmission from a transmitting device. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In wireless communications system 100, a UE 115 may use a random-access procedure to establish or re-establish a connection with a base station 105 or identify suitable parameters and configurations for communicating with the base station 105. Wireless communications system 100 may support four-step random-access procedures and two-step random-access procedures. A four-step random-access procedure may include four message exchanges between a UE 115 and a base station 105, and a two-step random-access procedure may include two message exchanges between a UE 115 and a base station 105. In both procedures, it may be appropriate for a UE 115 to transmit data or control information to a base station 105. In a four-step random-access procedure, the UE 115 may transmit the data or control information in a third random-access message (e.g., a random-access Message 3 (Msg3)) to the base station 105. In a two-step random-access procedure, the UE 115 may transmit the data or control information in a first random-access message (e.g., MSG1 or MsgA) to the base station 105. In some examples, of the wireless communications 100, a UE 115 (e.g., an IRS UE 115) may include a reflective surface for relaying signals from base station 105 to another device (e.g., another base station 105 or UE 115). For example, a base station 105 may transmit signaling to a UE 115 which is out of a coverage area 110 of the base station 105, or is outside of a line-of-sight path from base station 105, via an IRS UE 115. In such examples, the IRS UE 115 may perform a random-access procedure to establish a control link with a base station 105 such that the base station 105 may configured a state of the IRS UE 115.

A base station 105 may include a communications manager 101. Communications manager 101 may perform a first random-access procedure to establish a control link with a UE 115, the UE 115 including a reflective surface for forwarding signals from the base station 105 to a device in wireless communications system 100. Communications manager 101 may transmit signaling to the UE 115 to maintain the control link with the UE 115 and perform a second random-access procedure to re-establish the control link with the UE 115 after the control link with the UE 115 is lost. Communications manager 101 may also receive an uplink transmission from the UE 115 to maintain the control link with the base station 105.

An IRS UE 115 may include a communications manager 102. Communications manager 102 may perform a first random-access procedure to establish a control link with a base station 105, the IRS UE 115 including a reflective surface for forwarding signals from the base station 105 to a device in wireless communications system 100. Communications manager 102 may detect that the control link with the base station 105 is lost based at least in part on a timer or counter expiring or based at least in part on failing to receive signaling from the base station 105. Communications manager 102 may perform a second random-access procedure to re-establish the control link with the base station 105 based at least in part on detecting that the control link with the base station 105 is lost. Communications manager 102 may also transmit an uplink transmission to the base station 105 to maintain the control link with the base station 105.

Figure 2:
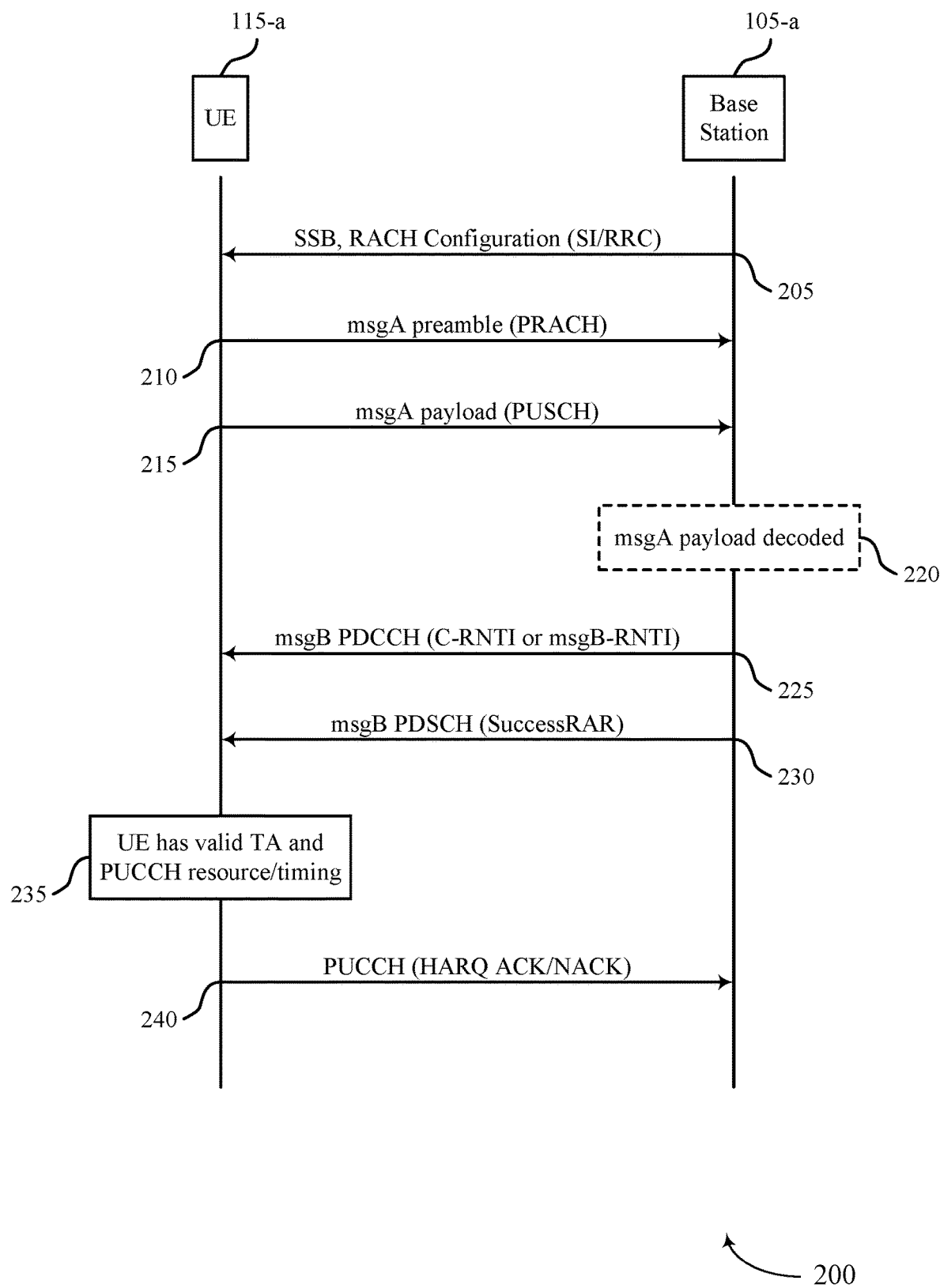
FIG. 2 illustrates an example of a process flow illustrating a two-step random-access procedure in accordance with one or more aspects of the present disclosure.

FIG. 2 illustrates an example of a process flow 200 illustrating a two-step random-access procedure in accordance with one or more aspects of the present disclosure. Process flow 200 illustrates aspects of techniques performed by a UE 115-a, which may be an example of a UE 115 described with reference to FIG. 1. Process flow 200 also illustrates aspects of techniques performed by a base station 105-a, which may be an example of a base station 105 described with reference to FIG. 1. At 205, the base station 105-a may transmit random-access channel (RACH) configuration information to the UE 115-a in system information or in RRC signaling. The base station 105-a may also transmit a synchronization signal block (SSB) to the UE 115-a. The UE 115-a may receive the SSB and determine to connect to the base station 105-a. At 210, the UE 115-a may transmit a RACH preamble (e.g., physical RACH (PRACH)) to the base station 105-a, and, at 215, the UE 115-a may transmit a payload in a PUSCH to the base station 105-a. The UE 115-a may transmit the RACH preamble and the PUSCH payload in a first random-access message (e.g., a MsgA) in the two-step random-access procedure.

At 220, the base station 105-a may decode the first random-access message including the preamble and the PUSCH payload. The base station 105-a may then transmit a second random-access message (e.g., a random-access message B (MsgB) or random-access response (RAR)) to the UE 115-a in the two-step random-access procedure. In particular, at 225, the base station 105-a may transmit control information in a PDCCH (e.g., MsgB PDCCH) to the UE 115-*a* (e.g., using a cell radio network temporary identifier (RNTI) (C-RNTI) or MsgB RNTI), and, at 230, the base station 105-*a* may transmit data in a PDSCH (e.g., MsgB PDSCH) to the UE 115-*a* (e.g., a success RAR). At 235, the UE 115-*a* may identify a valid timing alignment (TA) for communications with the base station 105-*a* and valid PUCCH resources and timing for an uplink transmission to the base station 105-*a*. At 240, the UE 115-*a* may then transmit HARQ feedback (e.g., an ACK or NACK) indicating whether the second random-access message is received and successfully decoded by the UE 115-*a*.

Figure 3:
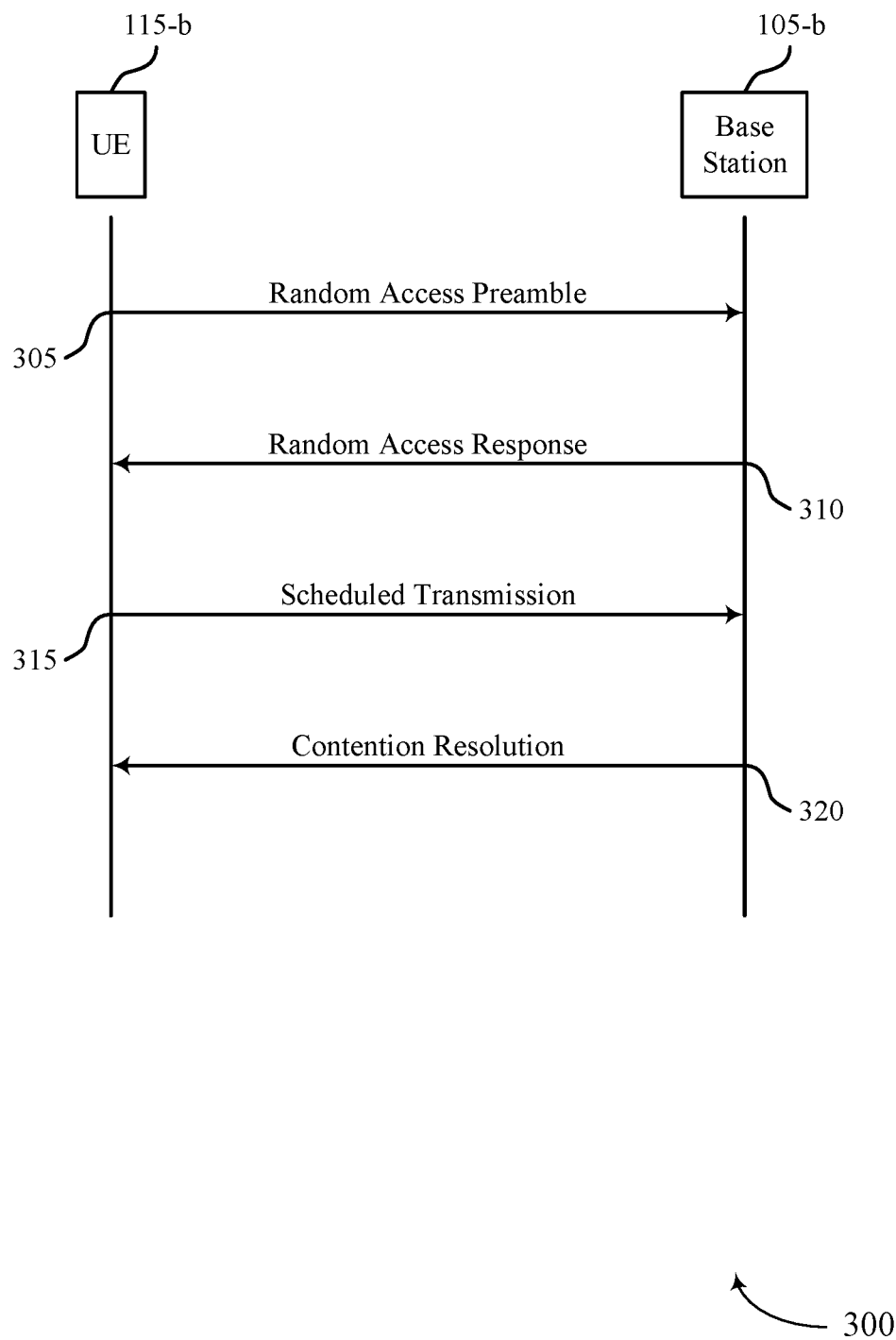
FIG. 3 illustrates an example of a process flow illustrating a four-step random-access procedure in accordance with one or more aspects of the present disclosure.

FIG. 3 illustrates an example of a process flow 300 illustrating a four-step random-access procedure in accordance with one or more aspects of the present disclosure. Process flow 300 illustrates aspects of techniques performed by a UE 115-*b*, which may be an example of a UE 115 described with reference to FIGS. 1 and 2. Process flow 300 also illustrates aspects of techniques performed by a base station 105-*b*, which may be an example of a base station 105 described with reference to FIGS. 1 and 2. At 305, the UE 115-*b* may transmit a random-access preamble to the base station 105-*b* in a first random-access message, and, at 310, the base station 105-*b* may transmit a second random-access message (e.g., RAR) in response to the random-access preamble. At 315, the UE 115-*b* may transmit a third random-access message including a scheduled transmission (e.g., data) to the base station 105-*b*, and, at 320, the base station 105-*b* may transmit a contention resolution message to the UE 115-*b* indicating that the four-step random-access procedure was successful.

Figure 4:
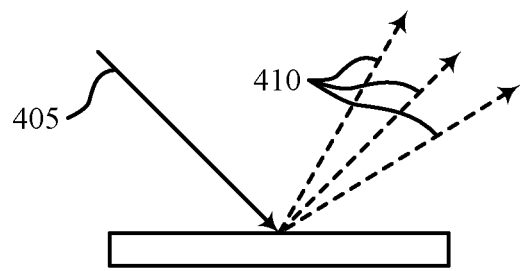
FIG. 4 illustrates an example of an intelligent reflective surface (IRS) in accordance with one or more aspects of the present disclosure.
Figure 4:
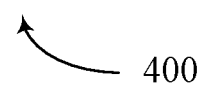

FIG. 4 illustrates an example of an IRS 400 in accordance with one or more aspects of the present disclosure. The IRS in FIG. 4 may be an energy efficient environment controller and may reflect incoming signals 405 from one device (e.g., a base station 105) to another device (e.g., a UE 115 or a base station 105). The IRS may control the angle of reflected signals 410 and may cast and extend the signal to an uncovered region in a wireless communications system (e.g., a region uncovered by a base station 105 due to blockage). The reflected pattern (e.g., time division duplex (TDD) pattern) may be further improved to offer better coverage with guidance from a base station 105. For instance, the base station 105 may adjust the reflected angle or sweep of the reflected angles to allow the IRS to redirect a transmission to another wireless device. The IRS may include a minimum control unit design and may operate with low power (e.g., extreme low power). The IRS may also have little to no requirements for uplink communication. For instance, the IRS may be configured for full transmission and reception (e.g., similar to an IoT device), or the IRS may be configured for simple transmission and full reception. Simple transmission may include PRACH-only, RACH only (e.g., PRACH plus a Msg3 transmission or a random-access Message A (MsgA) transmission), RACH transmissions plus an ACK for Msg3, or RACH transmissions plus an ACK for Msg3 and uplink keep-alive signaling.

Figure 5:
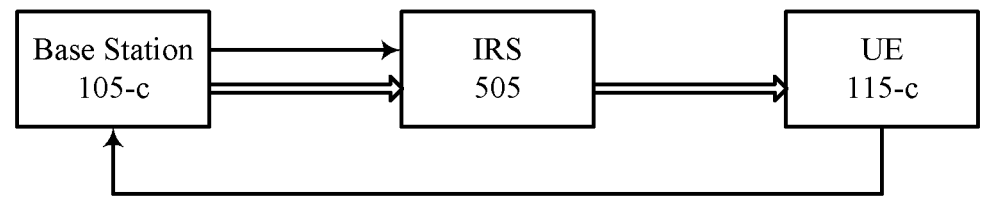
FIG. 5 illustrates an example of the flow of communications between a base station, an IRS, and a UE in accordance with one or more aspects of the present disclosure.

FIG. 5 illustrates an example of a flow of communications 500 between a base station 105-*c*, an IRS 505, and a UE 115-*c* in accordance with one or more aspects of the present disclosure. In the example of FIG. 5, there may be a closed loop for communications between the base station 105-*c*, the IRS 505, and the UE 115-*c*. The base station 105-*c* may transmit data to the IRS 505 on a data link through the IRS 505 (e.g., in the data plane), such that the IRS 505 may reflect or otherwise relay the data to the UE 115-*c*. The base station 105-*c* may also transmit control information to the IRS 505 on a control link with the IRS 505 (e.g., in the control plane) to configure the IRS 505 to forward the data to the UE 115-*c*. The UE 115-*c* may provide feedback to the base station 105-*c* on the data forwarded by the IRS 505 (e.g., control signaling that closes the loop). To facilitate the data and control signaling between the base station 105-*c*, the IRS 505, and the UE 115-*c*, it may be appropriate for the base station 105-*c* and the UE 115-*c* to establish a data link through the IRS 505 and for the base station 105-*c* and the IRS 505 to establish a control link (e.g., RACH to start and end the process). In some cases, however, it may be challenging for the IRS 505 to maintain the control link with the base station 105-*c* (e.g., if the IRS 505 is set up for minimal communication with the base station 105-*c*). Wireless communications system 100 may support efficient techniques for detecting when a control link between a UE 115 and a base station 105 is lost and for recovering the control link.

Figure 6:
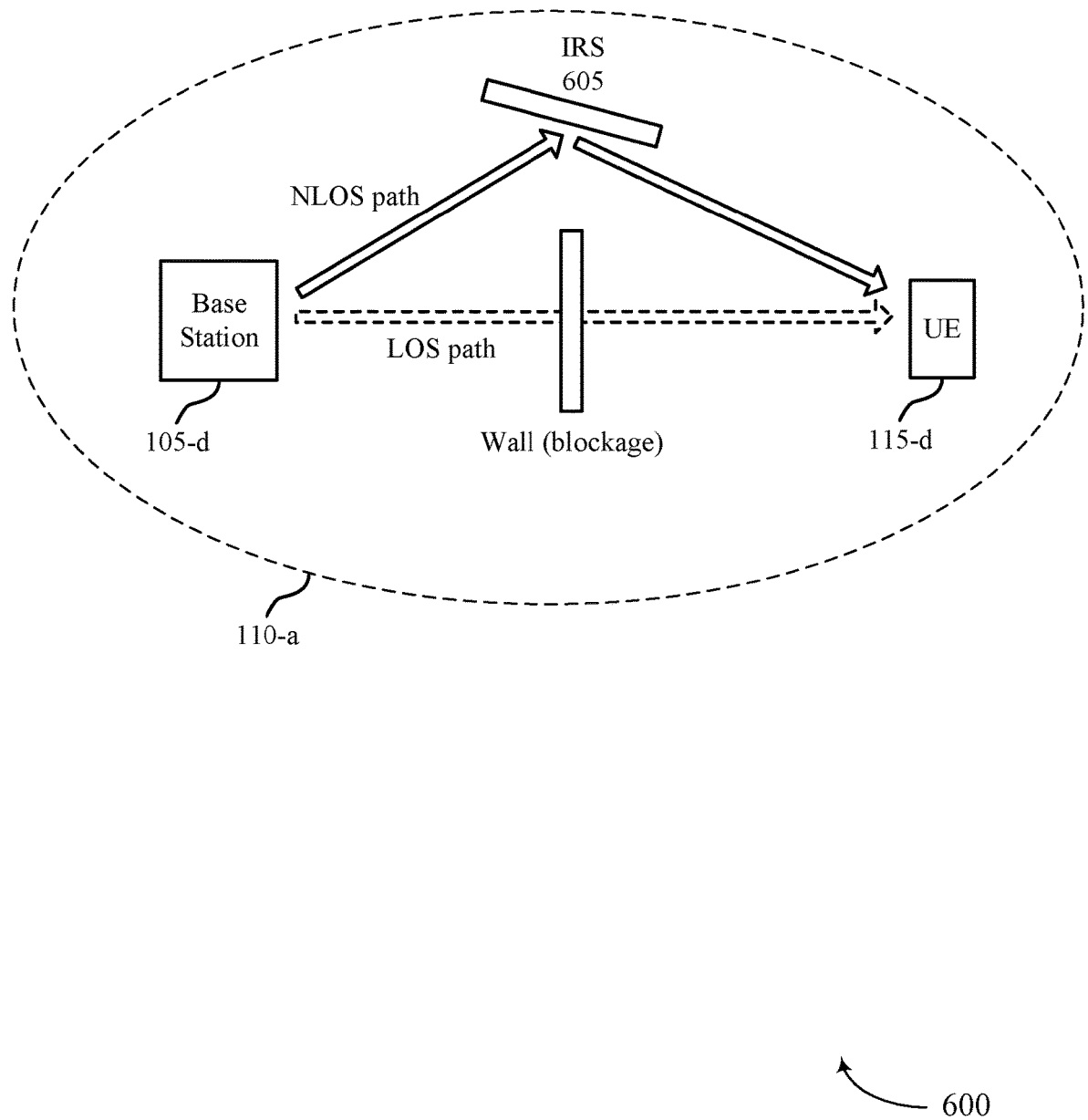
FIG. 6 illustrates an example of a wireless communications system that supports a control link for a low-power and simplified transceiver in accordance with one or more aspects of the present disclosure.

FIG. 6 illustrates an example of a wireless communications system 600 that supports control link for low-power and simplified transceiver in accordance with one or more aspects of the present disclosure. The wireless communications system 600 includes a UE 115-*d*, which may be an example of a UE 115 described with reference to FIGS. 1-5. The wireless communications system 600 may also include an IRS 605, which may be an example of an IRS as described with reference to FIGS. 1-5. The wireless communications system 600 also includes a base station 105-*d*, which may be an example of a base station 105 described with reference to FIGS. 1-5. The base station 105-*d* may provide communication coverage for a coverage area 110-*a*. The wireless communications system 600 may implement aspects of wireless communications system 100. For example, the wireless communications system 600 may support efficient techniques for detecting when a control link between the UE 115-*d* and the base station 105-*d* is lost and for recovering the control link.

In the example of FIG. 6, a path (e.g., line-of-sight (LOS) path) between the base station 105-*d* and the UE 115-*d* may be obstructed or blocked. Thus, instead of transmitting downlink signals directly to the UE 115-*d*, the base station 105-*d* may transmit the downlink signals to the IRS 605, and the IRS 605 may forward the downlink signals to the UE 115-*d* (e.g., a non-LOS (NLOS) path). To ensure that the base station 105-*d* is able to use the IRS 605 for forwarding signals to the UE 115-*d* (e.g., and other devices in the wireless communications system 600), the IRS 605 may indicate to the base station 105-*d* that the IRS 605 is capable of forwarding signals to the UE 115-*d* (e.g., and other devices). Specifically, the IRS 605 may transmit an indication to the base station 105-*d* that the IRS 605 includes a reflective surface for forwarding signals from the base station 105-*d* to the UE 115-*d* (e.g., that the IRS 605 is a low-power UE 115 capable of forwarding signals to other devices).

In one example, the IRS 605 may transmit a random-access preamble (e.g., PRACH) to the base station 105-*d* indicating that the IRS 605 includes the reflective surface. In this example, the base station 105-*d* may configure a reserved pool of random-access preambles that indicate that a UE 115 is an IRS or includes an IRS. In another example, the IRS 605 may transmit the indication that the IRS 605 includes the reflective surface in a random-access message as part of a random-access procedure. For instance, the IRS 605 may transmit the indication that the IRS 605 includes the reflective surface in a first random-access message in a two-step random-access procedure (e.g., indicated in a field in a payload of MsgA) or a third random-access message in a four-step random-access procedure (e.g., indicated in a field in the payload of Msg3).

In yet another example, the IRS 605 may transmit the indication that the IRS 605 includes the reflective surface after the IRS 605 is connected to the base station 105-d. For instance, the IRS 605 may transmit the indication that the IRS 605 includes the reflective surface in a control message (e.g., RRC message) to the base station 105-d after performing a random-access procedure (e.g., a PRACH or RACH procedure as described with reference to FIGS. 2 and 3). The control message may indicate the capability of the IRS 605 (e.g., that the IRS 605 includes the reflective surface) to allow the IRS 605 to identify with the base station 105-d. In this example, the IRS 605 may be assigned with a reserved pool of random-access preambles for future connection. Specifically, the IRS 605 may transmit random-access preambles from the reserved pool to the base station 105-d in subsequent random-access procedures to indicate that the IRS 605 includes a reflective surface for forwarding signals from the base station 105-d to other devices. The base station 105-d may also indicate a C-RNTI to the IRS 605 that the IRS 605 may use for performing a contention-free random-access procedure to connect to the base station 105-d.

Using these examples, the IRS 605 may be able to identify with the base station 105-d, and the base station 105-d may be aware that the IRS 605 is an IRS (e.g., the base station 105-d may be able to differentiate the IRS 605 from another UE 115). In some cases, the IRS 605 may also have a different configuration capability from other UEs 115 (e.g., bandwidth, center frequency, command type, etc.), and it may also be appropriate for the IRS 605 to indicate the configuration capability to the base station 105-d (e.g., inform the base station 105-d for further guidance). Thus, as an example, the IRS 605 may transmit the configuration capability to the base station 105-d in a random-access message in a random-access procedure (e.g., Msg3 in a four-step random-access procedure or the payload of MsgA in a two-step random-access procedure). That is, the IRS 605 may transmit an indication that the IRS 605 is capable of supporting some configurations, and the base station 105-d may configure the IRS for subsequent communications (e.g., forwarding signals from the base station 105-d to the UE 115-d) based on the configurations supported by the IRS 605.

The IRS 605 may also transmit a trigger to the base station 105-d to activate or deactivate a control procedure (e.g., using an additional indicator embedded in Msg3 of a four-step random-access procedure or the payload in MsgA of a two-step random-access procedure). The control procedure may include control signaling from the base station 105-d to configure the IRS 605 for forwarding signals to the UE 115-d. In particular, the base station 105-d may transmit a command to the IRS 605 indicating parameters or configurations for forwarding signals from the base station 105-d to the UE 115-d (e.g., in accordance with the configurations supported by the IRS 605). In some cases, the command may be embedded in a fourth random-access message of a four-step random-access procedure (e.g., a random-access Message 4 (Msg4)) or in a second random-access message of a two-step random-access procedure (e.g., payload in MsgB, where the IRS 605 may send HARQ feedback after decoding the MsgB). That is, the base station 105-d may transmit the command in a random-access message to the IRS 605 in a random-access procedure.

In one example, the base station 105-d may transmit an explicit command to the IRS 605 (e.g., in a few bytes in a PDCCH or PDSCH) indicating configurations or parameters for forwarding signals from the base station 105-d to the UE 115-d. The configurations or parameters may include a sweep pattern (e.g., an order or sequence of the reflected angles at which the IRS forwards (or reflects) signals), sweep direction (e.g., the reflected angles at which the IRS forwards (or reflects) signals), center frequency, or bandwidth for forwarding signals from the base station 105-d to the UE 115-d. In some cases, the base station 105-d may also transmit a request for the IRS 605 to perform beam training to identify a suitable beam for forwarding signals to the UE 115-d (e.g., to enable channel estimation). In such cases, the base station 105-d may also configure the IRS 605 for a beam sweep (e.g., based on a sweep pattern and sweep direction), and the IRS may perform the beam sweep (e.g., over an SSB time slot or with channel state information reference signals (CSI-RSs). The beam sweep may refer to transmitting, forwarding, or reflecting signals at multiple reflected angles or on multiple beams (i.e., sweeping though reflected angles or beams). The UE 115-d may then transmit feedback to the base station 105-d on the beam sweep (e.g., on the signals received in the beam sweep), and the base station 105-d may transmit configurations or parameters to the IRS for forwarding signals from the base station 105-d to the UE 115-d based on the feedback. That is, the explicit command may be based on feedback from the UE 115-d.

In another example, the base station 105-d may transmit an implicit command to the IRS 605 (e.g., in a few bits in a PDCCH) to allow the IRS 605 to identify suitable configurations or parameters for forwarding signals from the base station 105-d to the UE 115-d. For instance, the implicit command may indicate either positive (e.g., good) or negative (e.g., bad) feedback for signals forwarded by the IRS 605 to the UE 115-d. In some cases, the UE 115-d may provide feedback to the base station 105-d on signals received from the base station 105-d via the IRS 605, and the base station 105-d may indicate either positive or negative feedback to the IRS 605 based on the feedback from the UE 115-d. As an example, if the UE 115-d provides an ACK for a transmission forwarded by the IRS to the UE 115-d, the base station 105-d may transmit positive feedback to the IRS 605. Alternatively, if the UE 115-d provides a NACK for a transmission forwarded by the IRS 605 to the UE 115-d, the base station 105-d may transmit negative feedback to the IRS 605. The implicit command providing positive or negative feedback may serve for reinforcement learning (RL) based IRS tuning, where the IRS 605 gradually learns how to serve the base station 105-d. That is, the IRS 605 may tune parameters for forwarding signals from the base station 105-d to the UE 115-d based on the implicit command (e.g., one or more rounds of positive or negative feedback).

In addition to identifying with the base station 105-d and establishing a control link with the base station 105-d (e.g., to receive configurations and parameters for forwarding signals to the UE 115-d), it may be appropriate for the IRS 605 to maintain the control link with the base station 105-d. That is, because the environment may change over time (e.g., due to blockage between the base station 105-d and the UE 115-d and even between the base station 105-d and the IRS 605 or between the IRS 605 and the UE 115-d), it may be appropriate for the base station 105-d to confirm that the IRS 605 is connected (e.g., alive) and is able to receive signals (e.g., control commands and data) from the base station 105-d. The IRS 605 may use the techniques described herein to detect when the control link with the base station 105-d is lost so that the IRS 605 may initiate a random-access procedure to recover the control link. Alternatively, the base station 105-d may detect when the control link with the IRS 605 is lost and wait until the control link is re-established before transmitting signals to the IRS 605 for forwarding to the UE 115-*d*.

In one example, the base station 105-*d* may transmit indicators periodically through PDCCH to the IRS 605 to maintain the control link with the IRS 605 (e.g., even in a long sleep period). An indicator may also indicate whether the control link with the IRS 605 is to be adjusted. Because the indicators may be periodic, the IRS 605 may identify when to expect each indicator, and the IRS 605 may keep count of a number of indicators missed from the base station 105-*d*. For instance, the IRS 605 may increment a counter for each indicator that the IRS 605 failed to receive from the base station 105-*d*. If the counter overflows (e.g., the counter exceeds a threshold or expires), the IRS 605 may detect that the control link with the base station 105-*d* is lost. Alternatively, the IRS 605 may decrement a counter for each indicator that the IRS 605 failed to receive from the base station 105-*d*. If the counter reaches zero (e.g., the counter expires), the IRS 605 may detect that the control link with the base station 105-*d* is lost. Once the IRS 605 detects that the control link with the base station 105-*d* is lost, the IRS 605 may perform a random-access procedure (e.g., restart a RACH process) to re-establish the control link with the base station 105-*d*.

In another example, the IRS 605 may be configured with a period for which a control link with the base station 105-*d* is valid. That is, the control link with the base station 105-*d* may be valid for the duration of a timer. After the timer overflows or expires, the IRS 605 may detect that the control link with the base station 105-*d* is lost, and the IRS 605 may perform a random-access procedure (e.g., restart a RACH process) to re-establish the control link with the base station 105-*d*. The base station 105-*d* may also determine the duration of the timer so that the base station 105-*d* may avoid transmitting signaling to the IRS 605 for forwarding to the UE 115-*d* after the timer expires (e.g., and before the IRS 605 performs a next random-access procedure). In this example (e.g., and others), the IRS 605 may maintain a cell radio network temporary identifier (C-RNTI) for contention-free connection (e.g., to perform a contention-free random-access procedure to re-establish the control link with the base station 105-*d*).

In yet another example, the IRS 605 may detect whether the control link with the base station 105-*d* is lost using energy detection. That is, if the IRS 605 fails to detect energy from the base station 105-*d* for a duration of a timer (e.g., energy from control or data signaling), the IRS 605 may detect that the control link with the base station 105-*d* is lost, and the IRS 605 may perform a random-access procedure (e.g., restart a RACH process) to re-establish the control link with the base station 105-*d*. That is, the IRS 605 may restart a cell-search when the timer overflows. The IRS 605 may have limited radio frequency components (e.g., such as an analog to digital converter (ADC)) connected with a subset of units in the IRS 605, and the IRS 605 may use the radio frequency components to detect the energy from the base station 105-*d*.

In yet another example, the IRS 605 may transmit uplink transmissions (e.g., similar to scheduling request (SR) transmissions) to the base station 105-*d* to maintain the control link with the base station 105-*d*. In one example, the IRS 605 may be dynamically configured to transmit an uplink transmission in response to a downlink transmission (e.g., a specific downlink packet). For instance, the IRS 605 may receive downlink control information (DCI) from the base station 105-*d* requesting an uplink transmission from the IRS 605 in response to a downlink transmission (e.g., HARQ feedback, such as an ACK). The requests for uplink transmissions from the IRS 605 may be used by the base station 105-*d* to ensure that a controller at the IRS 605 is able to receive commands from the base station 105-*d*. Alternatively, the IRS 605 may be configured to transmit uplink transmissions periodically. If the base station 105-*d* fails to receive a threshold number of uplink transmissions from the UE 115-*d* (e.g., requested uplink transmissions or periodic uplink transmission), the base station 105-*d* may detect that the control link with the UE 115-*d* is lost. The base station 105-*d* may then wait until the control link with the UE 115-*d* is re-established (e.g., through a random-access procedure) before transmitting signals to the IRS 605 for forwarding to the UE 115-*d*.

In some cases, the IRS 605 may also be configured with a few different PRACH sequences (e.g., random-access preambles) to indicate a quantity of commands (e.g., control commands) received from the base station 105-*d*. That is, each PRACH sequence may correspond to a quantity of commands received by the IRS 605, and the IRS 605 may increment a counter for each command received from the base station 105-*d*. In such cases, the base station 105-*d* may request that the IRS 605 transmit a PRACH sequence to the base station 105-*d* indicating the quantity of commands received by the IRS 605. Alternatively, the IRS 605 may transmit PRACH sequences periodically to the base station, each PRACH sequence indicating the quantity of commands received by the IRS 605. If the base station 105-*d* determines that the quantity of commands received by the IRS 605 is less than the quantity of commands transmitted to the IRS 605 by a threshold amount, the base station 105-*d* may detect that the control link with the UE 115-*d* is lost. The base station 105-*d* may then wait until the control link with the UE 115-*d* is re-established (e.g., through a random-access procedure) before transmitting signals to the IRS 605 for forwarding to the UE 115-*d*.

Figure 7:
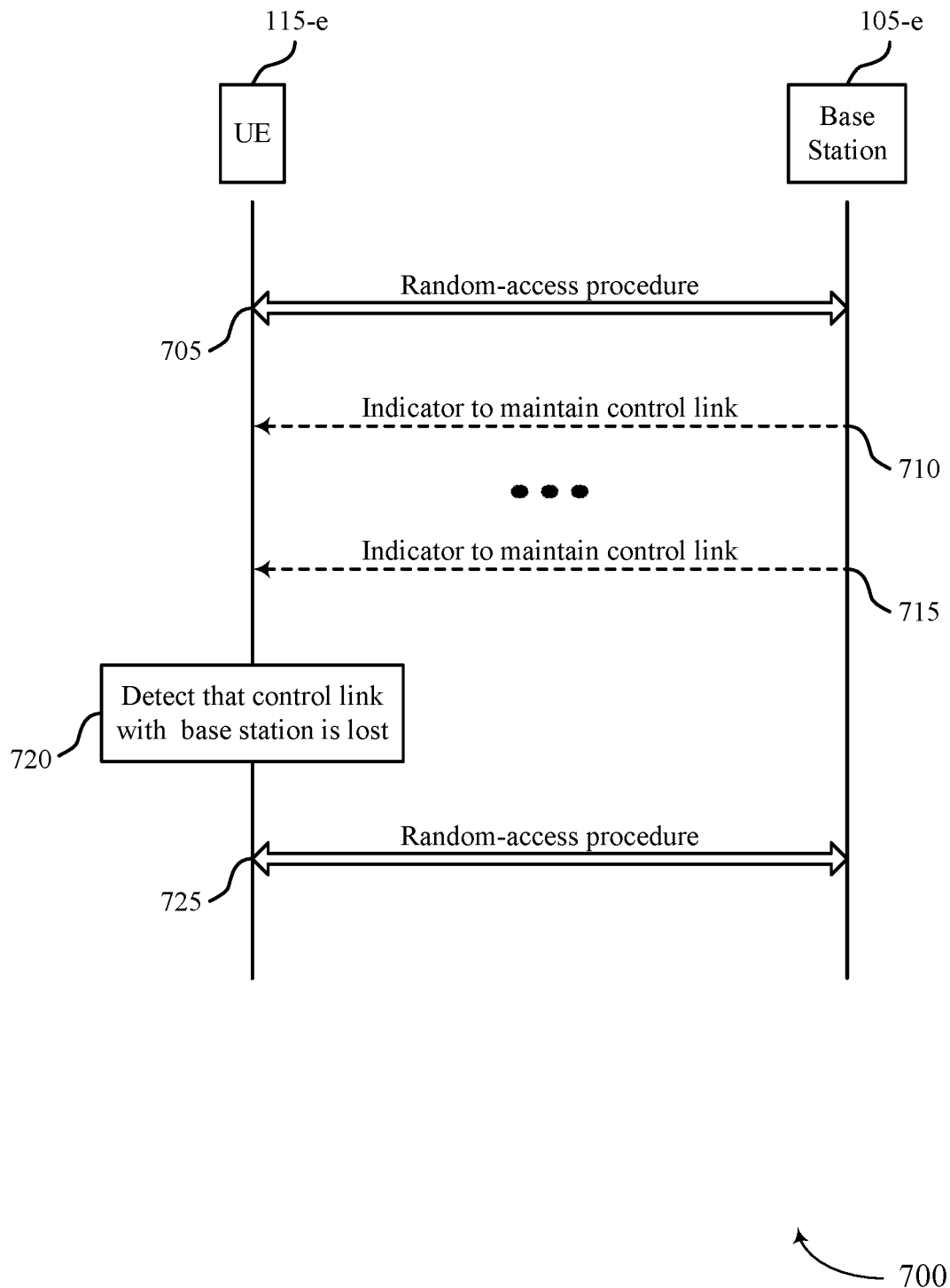
FIG. 7 illustrates an example of a process flow that supports a control link for a low-power and simplified transceiver in accordance with one or more aspects of the present disclosure.

FIG. 7 illustrates an example of a process flow 700 that supports a control link for a low-power and simplified transceiver in accordance with one or more aspects of the present disclosure. Process flow 700 illustrates aspects of techniques performed by a UE 115-*e*, which may be an example of a UE 115 that includes an IRS as described with reference to FIGS. 1-6. Process flow 700 also illustrates aspects of techniques performed by a base station 105-*e*, which may be an example of a base station 105 described with reference to FIGS. 1-6. Process flow 700 may support efficient techniques for detecting when a control link between the UE 115-*e* and the base station 105-*e* is lost and recovering the control link.

At 705, the UE 115-*e* may perform a first random-access procedure (e.g., exchange random-access messages) to establish a control link with the base station 105-*e*. In some cases, the base station 105-*e* may transmit one or more periodic indicators in a control channel (e.g., PDCCH) to the UE 115-*e* to maintain a control link with the UE 115-*e* (e.g., at 710 and at 715). In such cases, the UE 115-*e* may be configured to determine whether the control link with the base station 105-*e* is lost based on the one or more indicators. For instance, at 720, the UE 115-*e* may detect that the control link with the base station 105-*e* is lost if the UE 115-*e* fails to receive one or more (e.g., a threshold quantity) of the indicators. In one example, the UE 115-*e* may increment a counter after each periodic indicator that the UE 115-*e* failed to receive. In this example, the UE 115-*e* may detect that the control link with the base station 105-*e* is lost when the counter exceeds a threshold (e.g., when the counter expires).

In another example, the UE 115-e may decrement a counter after each periodic indicator that the UE 115-e failed to receive. In this example, the UE 115-e may detect that the control link with the base station 105-e is lost when the counter reaches zero (e.g., when the counter expires). The UE 115-e may receive control information from the base station 105-e indicating the periodicity and time intervals to monitor for the periodic indicators (e.g., control information scheduling the periodic indicators). Alternatively, the periodicity and time intervals to monitor for the periodic indicators may be preconfigured at the UE 115-e.

In other cases, at 720, the UE 115-e may detect that the control link with the base station 105-e is lost based on a timer. The UE 115-e may receive an indication of the duration of the timer from the base station 105-e, or the duration of the timer may be preconfigured at the UE 115-e. In some examples, if the base station 105-e is also running the timer, the base station 105-e may avoid transmitting signals to the UE 115-e for forwarding to other devices after the timer expires. In one example, the UE 115-e may detect that the control link with the base station 105-e is lost based on failing to detect energy from the base station 105-e for the duration of the timer. In this example, the UE 115-e may restart the timer after detecting energy from the base station 105-e. The UE 115-e may use limited radio frequency components to monitor for energy from the base station 105-e. In another example, the UE 115-e may simply detect that the control link with the base station is lost when the timer expires. That is, the control link between the UE 115-e and the base station 105-e may be valid for the duration of the timer, and, once the timer expires, the UE 115-e may detect that the control link with the base station 105-e is lost. Once the UE 115-e detects that the control link with the base station 105-e is lost, at 725, the UE 115-e may perform a second random-access procedure to re-establish the control link with the base station 105-e. In some cases, the UE 115-e may perform a contention-free random-access procedure using a C-RNTI to re-establish the control link with the base station 105-e.

Figure 8:
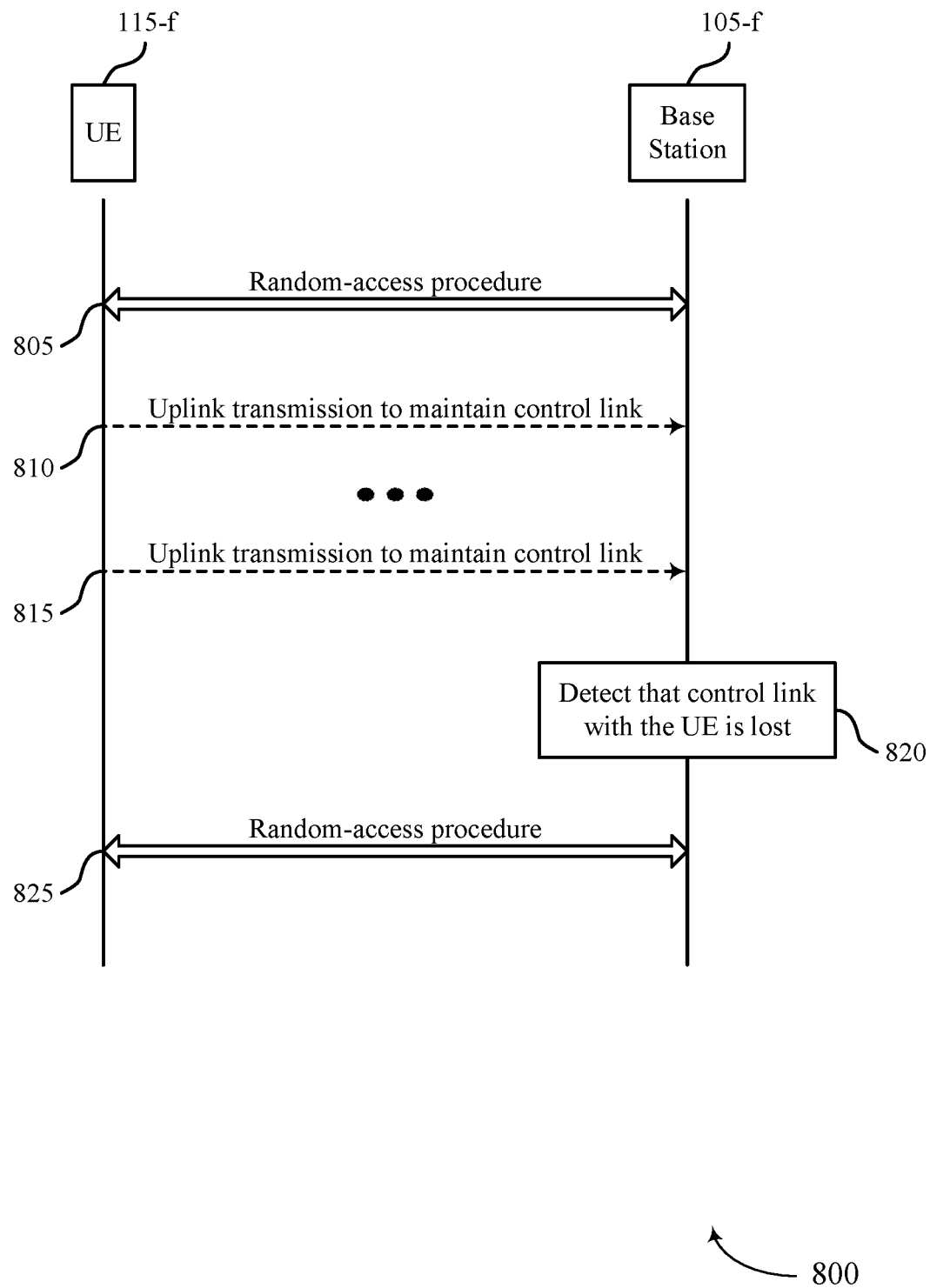
FIG. 8 illustrates an example of a process flow that supports a control link for a low-power and simplified transceiver in accordance with one or more aspects of the present disclosure.

FIG. 8 illustrates an example of a process flow 800 that supports control link for low-power and simplified transceiver in accordance with one or more aspects of the present disclosure. Process flow 800 illustrates aspects of techniques performed by a UE 115-f, which may be an example of a UE 115 that includes an IRS as described with reference to FIGS. 1-7. Process flow 800 also illustrates aspects of techniques performed by a base station 105-f, which may be an example of a base station 105 described with reference to FIGS. 1-7. Process flow 800 may support efficient techniques for detecting when a control link between the UE 115-f and the base station 105-f is lost and recovering the control link.

At 805, the UE 115-f may perform a first random-access procedure (e.g., exchange random-access messages) to establish a control link with the base station 105-f. In some cases, the UE 115-f may transmit one or more uplink transmissions to the base station 105-f to maintain the control link with the base station 105-f (e.g., at 810 and at 815). In some examples, the one or more uplink transmissions may be scheduling request (SR) transmissions or transmissions similar to SR transmissions (e.g., a heartbeat signal (a few bits)). In some examples, the one or more uplink transmissions may be periodic transmissions. An uplink transmission from the UE 115-f may also be in response to a downlink transmission from the base station 105-f. For instance, the UE 115-f may receive a request for the uplink transmission (e.g., ACK) in response to a downlink transmission. The UE 115-f may then receive the downlink transmission and transmit the uplink transmission in response to the downlink transmission.

At 820, the base station 105-f may detect that the control link with the UE 115-f is lost based on the one or more uplink transmissions. For example, the base station 105-f may fail to receive one or more of the uplink transmissions (e.g., a threshold quantity of uplink transmissions) from the UE 115-f, and the base station 105-f may detect that the control link with the UE 115-f is lost based on failing to receive the one or more uplink transmissions from the UE 115-f. Alternatively, the UE 115-f may transmit, and the base station 105-f may receive, a random-access preamble indicating a quantity of control commands that the UE 115-f received from the base station 105-f (e.g., control commands (implicit or explicit) as described with reference to FIG. 6). The UE 115-f may transmit the random-access preamble as an uplink transmission in the one or more uplink transmissions described above. For example, the UE 115-f may periodically transmit random-access preambles each indicating a quantity of control commands received by the UE 115-f, or the UE 115-f may transmit a random-access preamble indicating a quantity of control commands received by the UE 115-f in response to a request from the base station 105-e.

The base station 105-f may then compare the quantity of control commands received by the UE 115-f to an actual quantity of control commands transmitted by the base station 105-f to the UE 115-f. If the actual quantity of control commands transmitted by the base station 105-f exceeds the quantity of control commands received by the UE 115-f by a threshold amount, the base station 105-f may detect that the control link with the UE 115-f is lost. Once the base station 105-f detects that the control link with the UE 115-f is lost, the base station 105-f may avoid transmitting downlink signals to the UE 115-f for forwarding to other devices until the UE performs a second random-access procedure to re-establish the control link with the base station 105-f. At 825, the UE 115-f and the base station 105-f may perform a second random-access procedure (e.g., exchange random-access messages) to re-establish the control link. Then, the base station 105-f may continue transmitting downlink signals to the UE 115-f for forwarding to other devices.

Figure 9:
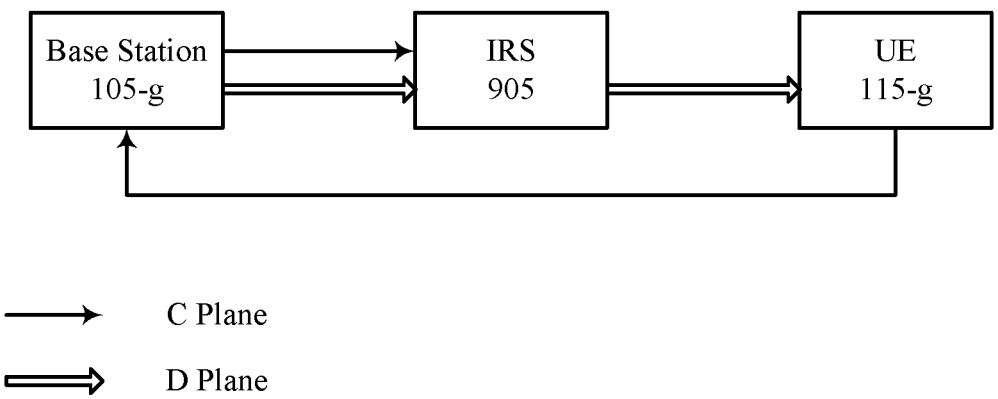
FIG. 9 illustrates an example of the flow of communications between a base station, an IRS, and a UE in accordance with one or more aspects of the present disclosure.

FIG. 9 illustrates an example of a flow of communications 500 between a base station 105-c, an IRS 905, and a UE 115-c in accordance with one or more aspects of the present disclosure. In the example of FIG. 5, there may be a closed loop for communications between the base station 105-c, the IRS 905, and the UE 115-c. The base station 105-c may transmit data to the IRS 905 on a data link through the IRS 905 (e.g., in the data plane), and the IRS 905 may forward the data to the UE 115-c. The base station 105-c may also transmit control information to the IRS 905 on a control link with the IRS 905 (e.g., in the control plane) to configure the IRS 905 to forward the data to the UE 115-c. In some cases, the UE 115-c may provide feedback to the base station 105-c on the data forwarded by the IRS 905 (e.g., control signaling that closes the loop). To facilitate the data and control signaling between the base station 105-c, the IRS 905, and the UE 115-c, it may be appropriate for the base station 105-c and the UE 115-c to establish a data link through the IRS 905 and for the base station 105-c and the IRS 905 to establish a control link (e.g., RACH to start and end the process). However, if the IRS 905 uses a same procedure as other UEs 115 for connecting to the base station 105-c, the base station 105-c may not be able to differentiate the IRS 905 from other UEs 115. Wireless communications system 100 may support efficient techniques for establishing a connection between an IRS and a base station 105.

Figure 10:
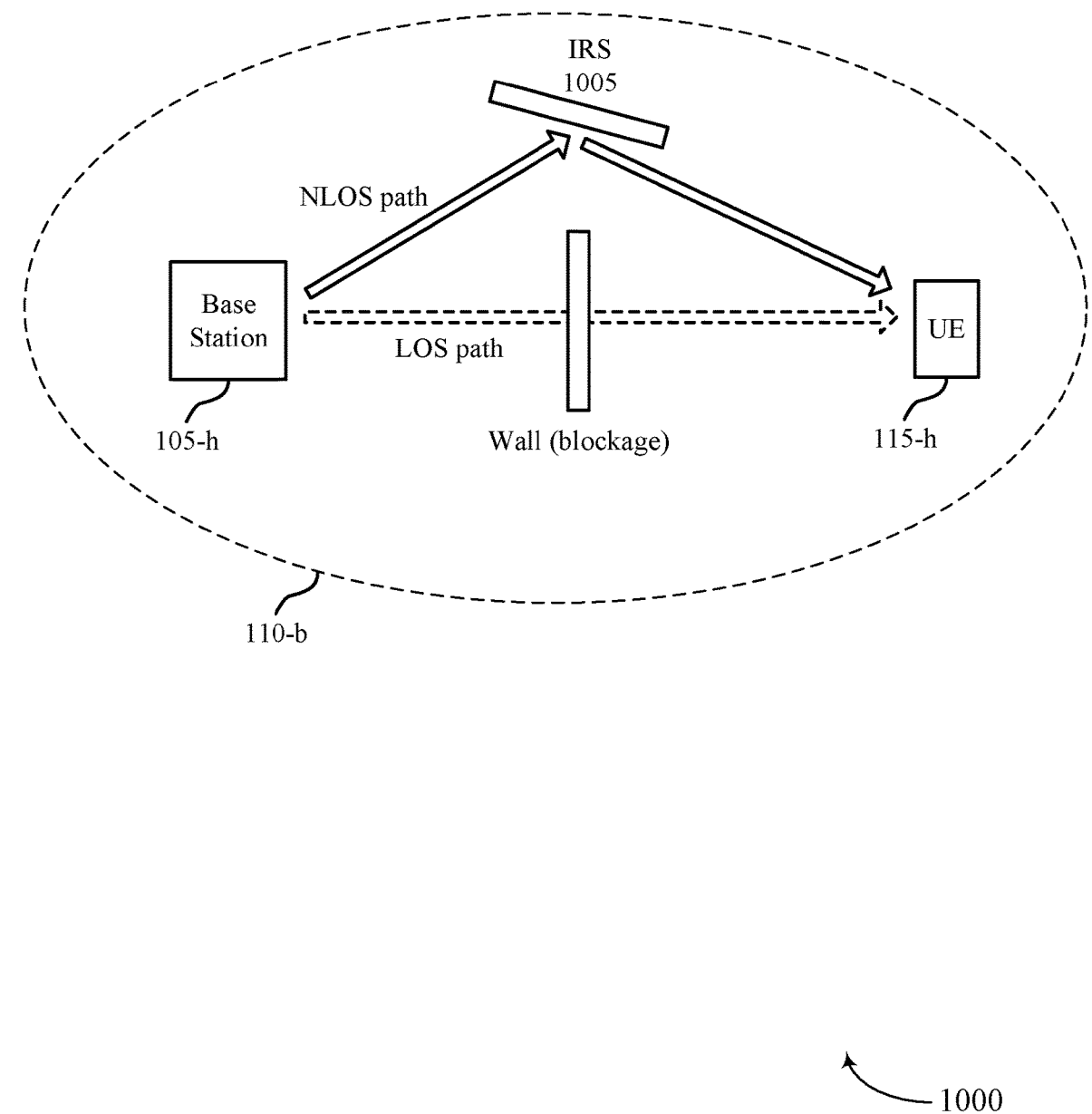
FIG. 10 illustrates an example of a wireless communications system that supports a control link for a low-power and simplified transceiver in accordance with one or more aspects of the present disclosure.

FIG. 10 illustrates an example of a wireless communications system 1000 that supports a random-access procedure for a low-power and simplified transceiver in accordance with as with one or more aspects of the present disclosure. The wireless communications system 1000 includes a UE 115-d, which may be examples of a UE 115 described with reference to FIGS. 1-5. The wireless communications system 1000 also includes an IRS 1005, which may be an example of an IRS described with reference to FIGS. 1-5. The wireless communications system 1000 also includes a base station 105-d, which may be an example of a base station 105 described with reference to FIGS. 1-5. The base station 105-d may provide communication coverage for a coverage area 110-a. The wireless communications system 1000 may implement aspects of wireless communications system 100. For example, the wireless communications system 1000 may support efficient techniques for establishing a connection between the IRS 1005 and the base station 105-d.

In the example of FIG. 10, a path (e.g., line-of-sight (LOS) path) between the base station 105-d and the UE 115-d may be obstructed or blocked. Thus, instead of transmitting downlink signals directly to the UE 115-d, the base station 105-d may transmit the downlink signals to the IRS 1005, and the IRS 1005 may forward the downlink signals to the UE 115-d (e.g., a non-LOS (NLOS) path). To ensure that the base station 105-d is able to use the IRS 1005 for forwarding signals to the UE 115-d (e.g., and other devices in the wireless communications system 1000), the IRS 1005 may indicate to the base station 105-d that the IRS 1005 is capable of forwarding signals to the UE 115-d (e.g., and other devices). Specifically, the IRS 1005 may transmit an indication to the base station 105-d that the IRS 1005 includes a reflective surface for forwarding signals from the base station 105-d to the UE 115-d (e.g., that the IRS 1005 is a low-power UE 115 capable of forwarding signals to other devices).

In one example, the IRS 1005 may transmit a random-access preamble (e.g., PRACH) to the base station 105-d indicating that the IRS 1005 includes the reflective surface. In this example, the base station 105-d may configure a reserved pool of random-access preambles that indicate that a UE 115 is an IRS or includes an IRS. In another example, the IRS 1005 may transmit the indication that the IRS 1005 includes the reflective surface in a random-access message as part of a random-access procedure. For instance, the IRS 1005 may transmit the indication that the IRS 1005 includes the reflective surface in a first random-access message in a two-step random-access procedure (e.g., indicated in a field in the payload of MsgA) or a third random-access message in a four-step random-access procedure (e.g., indicated in a field in the payload of Msg3).

In yet another example, the IRS 1005 may transmit the indication that the IRS 1005 includes the reflective surface after the IRS 1005 is connected to the base station 105-d. For instance, the IRS 1005 may transmit the indication that the IRS 1005 includes the reflective surface in a control message (e.g., RRC message) to the base station 105-d after performing a random-access procedure (e.g., a PRACH or RACH procedure as described with reference to FIGS. 2 and 3). The control message may indicate the capability of the IRS 1005 (e.g., that the IRS 1005 includes the reflective surface) to allow the IRS 1005 to identify with the base station 105-d. In this example, the IRS 1005 may be assigned with a reserved pool of random-access preambles for future connection. Specifically, the IRS 1005 may transmit random-access preambles from the reserved pool to the base station 105-d in subsequent random-access procedures to indicate that the IRS 1005 includes a reflective surface for forwarding signals from the base station 105-d to other devices. The base station 105-d may also indicate a C-RNTI to the IRS 1005 that the IRS 1005 may use for performing a contention-free random-access procedure to connect to the base station 105-d.

Using these examples, the IRS 1005 may be able to identify with the base station 105-d, and the base station 105-d may be aware that the IRS 1005 is an IRS (e.g., the base station 105-d may be able to differentiate the IRS 1005 from another UE 115). In some cases, the IRS 1005 may also have a different configuration capability from other UEs 115 (e.g., bandwidth, center frequency, command type, etc.), and it may also be appropriate for the IRS 1005 to indicate the configuration capability to the base station 105-d (e.g., inform the base station 105-d for further guidance). Thus, as an example, the IRS 1005 may transmit the configuration capability to the base station 105-d in a random-access message in a random-access procedure (e.g., Msg3 in a four-step random-access procedure or the payload of MsgA in a two-step random-access procedure). That is, the IRS 1005 may transmit an indication that the IRS 1005 is capable of supporting some configurations, and the base station 105-d may configure the IRS for subsequent communications (e.g., forwarding signals from the base station 105-d to the UE 115-d) based on the configurations supported by the IRS 1005.

The IRS 1005 may also transmit a trigger to the base station 105-d to activate or deactivate a control procedure (e.g., using an additional indicator embedded in Msg3 of a four-step random-access procedure or the payload in MsgA of a two-step random-access procedure). The control procedure may include control signaling from the base station 105-d to configure the IRS 1005 for forwarding signals to the UE 115-d. In particular, the base station 105-d may transmit a command to the IRS 1005 indicating parameters or configurations for forwarding signals from the base station 105-d to the UE 115-d (e.g., in accordance with the configurations supported by the IRS 1005). In some cases, the command may be embedded in a fourth random-access message of a four-step random-access procedure (e.g., Msg4) or in a second random-access message of a two-step random-access procedure (e.g., payload in MsgB, where the IRS 1005 may send HARQ feedback after decoding the MsgB). That is, the base station 105-d may transmit the command in a random-access message to the IRS 1005 in a random-access procedure.

In one example, the base station 105-d may transmit an explicit command to the IRS 1005 (e.g., in a few bytes in a PDCCH or PDSCH) indicating configurations or parameters for forwarding signals from the base station 105-d to the UE 115-d. The configurations or parameters may include a sweep pattern (e.g., an order or sequence of the reflected angles at which the IRS forwards (or reflects) signals), sweep direction (e.g., the reflected angles at which the IRS forwards (or reflects) signals), center frequency, or bandwidth for forwarding signals from the base station 105-d to the UE 115-d. In some cases, the base station 105-d may also transmit a request for the IRS 1005 to perform beam training to identify a suitable beam for forwarding signals to the UE 115-d (e.g., to enable channel estimation). In such cases, the base station 105-d may also configure the IRS 1005 for a beam sweep (e.g., based on a sweep pattern and sweep direction), and the IRS may perform the beam sweep (e.g., over an SSB time slot or with channel state information reference signals (CSI-RSs). The beam sweep may refer to transmitting, forwarding, or reflecting signals at multiple reflected angles or on multiple beams (i.e., sweeping though reflected angles or beams). The UE 115-*d* may then transmit feedback to the base station 105-*d* on the beam sweep (e.g., on the signals received in the beam sweep), and the base station 105-*d* may transmit configurations or parameters to the IRS for forwarding signals from the base station 105-*d* to the UE 115-*d* based on the feedback. That is, the explicit command may be based on feedback from the UE 115-*d*.

In another example, the base station 105-*d* may transmit an implicit command to the IRS 1005 (e.g., in a few bits in a PDCCH) to allow the IRS 1005 to identify suitable configurations or parameters for forwarding signals from the base station 105-*d* to the UE 115-*d*. For instance, the implicit command may indicate either positive (e.g., good) or negative (e.g., bad) feedback for signals forwarded by the IRS 1005 to the UE 115-*d*. In some cases, the UE 115-*d* may provide feedback to the base station 105-*d* on signals received from the base station 105-*d* via the IRS 1005, and the base station 105-*d* may indicate either positive or negative feedback to the IRS 1005 based on the feedback from the UE 115-*d*. As an example, if the UE 115-*d* provides an ACK for a transmission forwarded by the IRS to the UE 115-*d*, the base station 105-*d* may transmit positive feedback to the IRS 1005. Alternatively, if the UE 115-*d* provides a NACK for a transmission forwarded by the IRS 1005 to the UE 115-*d*, the base station 105-*d* may transmit negative feedback to the IRS 1005. The implicit command providing positive or negative feedback may serve for reinforcement learning (RL) based IRS tuning, where the IRS 1005 gradually learns how to serve the base station 105-*d*. That is, the IRS 1005 may tune parameters for forwarding signals from the base station 105-*d* to the UE 115-*d* based on the implicit command (e.g., one or more rounds of positive or negative feedback).

In addition to identifying with the base station 105-*d* and establishing a control link with the base station 105-*d* (e.g., to receive configurations and parameters for forwarding signals to the UE 115-*d*), it may be appropriate for the IRS 1005 to forward signals for a data link between the base station 105-*d* and the UE 115-*d*, such that the IRS 1005 may receive the signals from the base station 105-*d* and relay the signals to the UE 115-*d*. In some cases, control signaling and data signaling from the base station 105-*d* to the IRS 1005 may be on the same carrier. In other cases, however, control signaling from the base station 105-*d* to the IRS 1005 (e.g., IRS controller) may be on a first carrier (e.g., FRX), and data signaling from the base station 105-*d* to the IRS 1005 (e.g., IRS carrier) may be on a second, different carrier (e.g., FRY). Thus, commands from the base station 105-*d* may be carrier-specific (e.g., FR-specific). Further, establishing a control link may not guarantee that the base station 105-*d* could discover the location of the IRS 1005. Accordingly, the base station 105-*d* and IRS 1005 may use the techniques described herein to establish a data link. For example, the base station 105-*d* may use the techniques described herein to select a beam for transmitting downlink signals to the IRS 1005 for forwarding to the UE 115-*d* (e.g., identify the incident angle from the base station 105-*d* to the IRS 1005).

In one example, the base station 105-*d* may discover the IRS 1005 in space without assistance from the IRS 1005 and may establish a data link through the IRS 1005 (e.g., IRS operating at FR2 or FR4). For example, the base station 105-*d* may use the IRS 1005 to establish a data link with the UE 115-*d*, such that the IRS 1005 may reflect or otherwise relay signals between the base station 105-*d* and the UE 115-*d*. In this example, the base station 105-*d* may transmit signals to the IRS 1005 for forwarding to the UE 115-*d*. For instance, the base station 105-*d* may perform a beam sweep by transmitting signals on multiple beams to the IRS 1005 for forwarding to the UE 115-*d*. The base station 105-*d* may then receive feedback from the UE 115-*d* on the signals forwarded by the IRS 1005 to the UE 115-*d*, and the base station 105-*d* may establish a data link through the IRS 1005 based on the feedback. Specifically, the base station 105-*d* may identify which of the beams used to transmit signals to the IRS 1005 is associated with a highest quality based on the feedback from the UE 115-*d*, and the base station 105-*d* may select the highest quality beam for transmitting subsequent signals to the IRS 1005 for forwarding to the UE 115-*d*.

In another example, the IRS 1005 may provide assistance (e.g., information or operation) to the base station 105-*d* to allow the base station 105-*d* to discover the IRS 1005 and establish a data link through the IRS 1005. For instance, if the control link and the data link are on the same carrier, the base station 105-*d* may use the same beam identified in the random-access procedure or a beam with a similar target direction to the beam identified in the random-access procedure to transmit signals to the IRS 1005 for forwarding to the UE 115-*d*. The beam identified in the random-access procedure may correspond to the SSB received by the IRS 1005 that triggered the random-access procedure. That is, the incident angle for transmissions from the base station 105-*d* to the UE 115-*d* may roughly be known (e.g., for beam-based communication), so the SSB identified in the random-access procedure may be used for IRS reflection (e.g., to transmit signals to the IRS 1005 for reflection to the UE 115-*d*).

Alternatively, if the control link and data link are cross-carrier (e.g., the control link is in a lower band and the base station 105-*d* transmits control signaling with an omnidirectional antenna), the UE 115-*d* may provide additional assistance to the base station 105-*d* to establish the data link. In one example, the UE 115-*d* may report its location to the base station 105-*d* (e.g., in the two PRACH since the UE 115-*d* may be mostly static in space). In this example, the base station 105-*d* may identify a beam for transmitting signals to the IRS 1005 for forwarding to the UE 115-*d* based on the location of the IRS 1005. In another example, the base station 105-*d* may transmit downlink signals on multiple beams to the IRS 1005, and the IRS 1005 may sweep through all the reflected angles (e.g., forward the downlink signals at all the reflected angles), where one of the reflected angles may reflect the downlink signals back to the base station 105-*d* to establish the data link with the base station 105-*d* (e.g., the IRS 1005 may use its capability and operate in a mirror mode to reflect the downlink signals back to the base station 105-*d*). The base station 105-*d* may then identify which of the beams used to transmit signals to the IRS 1005 is associated with a highest quality based on the reflected signals, and the base station 105-*d* may select the highest quality beam for transmitting subsequent signals to the IRS 1005 for forwarding to the UE 115-*d*.

Figure 11:
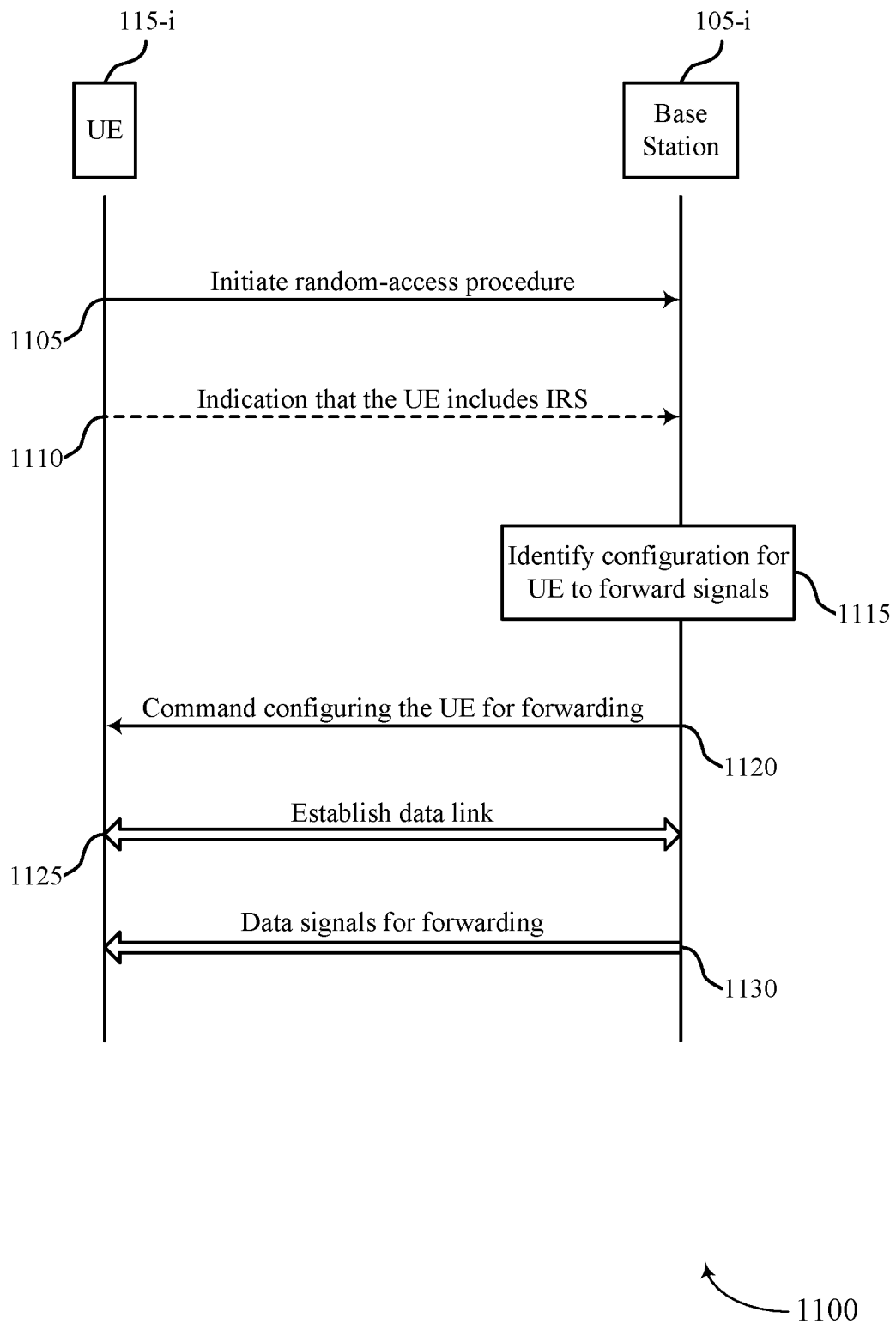
FIG. 11 illustrates an example of a process flow that supports a control link for a low-power and simplified transceiver in accordance with one or more aspects of the present disclosure.

FIG. 11 illustrates an example of a process flow 1100 that supports a random-access procedure for a low-power and simplified transceiver in accordance with one or more aspects of the present disclosure. Process flow 1100 illustrates aspects of techniques performed by a UE 115-*e*, which may be an example of a UE 115 described with reference to FIGS. 1-10. Process flow 1100 also illustrates aspects of techniques performed by a base station 105-*e*, which may be an example of a base station 105 described with reference to FIGS. 1-10. Process flow 1100 may support efficient techniques for establishing a connection between the UE 115-*e* that includes an IRS and the base station 105-*e*.

At 1105, the UE 115-*e* may transmit a random-access preamble (e.g., PRACH) to the base station 105-*e* to initiate a random-access procedure to connect to the base station 105-*e*. At 1110, the UE 115-*e* may then transmit an indication to the base station 105-*e* that the UE 115-*e* includes an IRS. In some cases, the random-access preamble may indicate that the UE 115-*e* includes the IRS, and the UE 115-*e* may avoid transmitting an additional indication at 1110. In such cases, the UE 115-*e* may be configured with one or more random-access preambles reserved for indicating that the UE 115-*e* includes the IRS. In other cases, the UE 115-*e* may transmit the indication that the UE 115-*e* includes the IRS in a first random-access message (e.g., MsgA) in a two-step random-access procedure. In yet other cases, the UE 115-*e* may transmit the indication that the UE 115-*e* includes the IRS in a third random-access message (e.g., Msg3) in a four-step random-access procedure. In yet other cases, the UE 115-*e* may transmit the indication that the UE 115-*e* includes the IRS in a control message (e.g., RRC message) after the random-access procedure. In such cases, the UE 115-*e* may receive an indication of one or more random-access preambles reserved for indicating that the UE 115-*e* includes the IRS. As such, for subsequent random-access procedures, the UE 115-*e* may transmit a random-access preamble of the one or more random-access preambles to indicate that the UE 115-*e* includes the IRS.

At 1115, the base station 105-*e* may identify a configuration for the UE 115-*e* to forward signals to another device (e.g., a UE 115 or a base station 105). At 1120, the base station 105-*e* may then transmit a command configuring the UE 115-*e* for forwarding signals to other devices. In one example, the command (e.g., explicit command) may indicate a sweep pattern, sweep direction, center frequency, bandwidth, or a combination thereof for the IRS to use to forward signals from the base station 105-*e* to another device. In another example, the command (e.g., implicit command) may indicate either positive or negative feedback for signals from the base station 105-*e* forwarded by the UE 115-*e* to another wireless device. In this example, the UE 115-*e* may tune parameters for forwarding signals from the base station 105-*e* to the wireless device based on the command.

At 1125, the UE 115-*e* may communicate with the base station 105-*e* to establish a data link. For example, the UE 115-*e* may communicate with the base station 105-*e* to allow the base station 105-*e* to identify an appropriate beam for transmitting signals to the UE 115-*e* for forwarding to another device. In one example, the UE 115-*e* may transmit an indication of the location of the UE 115-*e* to the base station 105-*e*, and the base station 105-*e* may select a beam for transmitting signals to the UE 115-*e* for forwarding to another device based on the location of the UE. In another example, the base station 105-*e* may transmit signals to the UE 115-*e* on multiple beams, and the UE 115-*e* may reflect the signals back to the base station 105-*e* at a same angle at which the signals are transmitted to the UE 115-*e* on the multiple beams. In this example, the base station 105-*e* may identify a beam of the multiple beams associated with a highest quality based on the reflection, and the base station 105-*e* may select the identified beam for transmitting signals to the UE 115-*e* for forwarding to another wireless device. In yet another example, the base station 105-*e* may select a beam identified in the random-access procedure (e.g., initiated at 1105) for transmitting signals to the UE 115-*e* for forwarding to another wireless device.

At 1130, the UE 115-*e* may receive downlink signals from the base station 105-*e* for forwarding from the base station 105-*e* to another device (e.g., a UE 115 or base station 105). The UE 115-*e* may then forward the downlink signals to the other device. In some cases, the base station 105-*e* may receive feedback from the other device on the signals forwarded by the UE 115-*e* from the base station 105-*e* to the other device. In such cases, the base station 105-*e* may adjust a configuration at the UE 115-*e* for forwarding signals to the other device based on the feedback. For example, the base station 105-*e* may transmit another command (e.g., similar to the command at 1120) to configure the UE 115-*e* for forwarding signals to the wireless device. The base station 105-*e* may also adjust a configuration for transmitting signals to the UE 115-*e* for forwarding signals to the other device based on the feedback.

Figure 12:
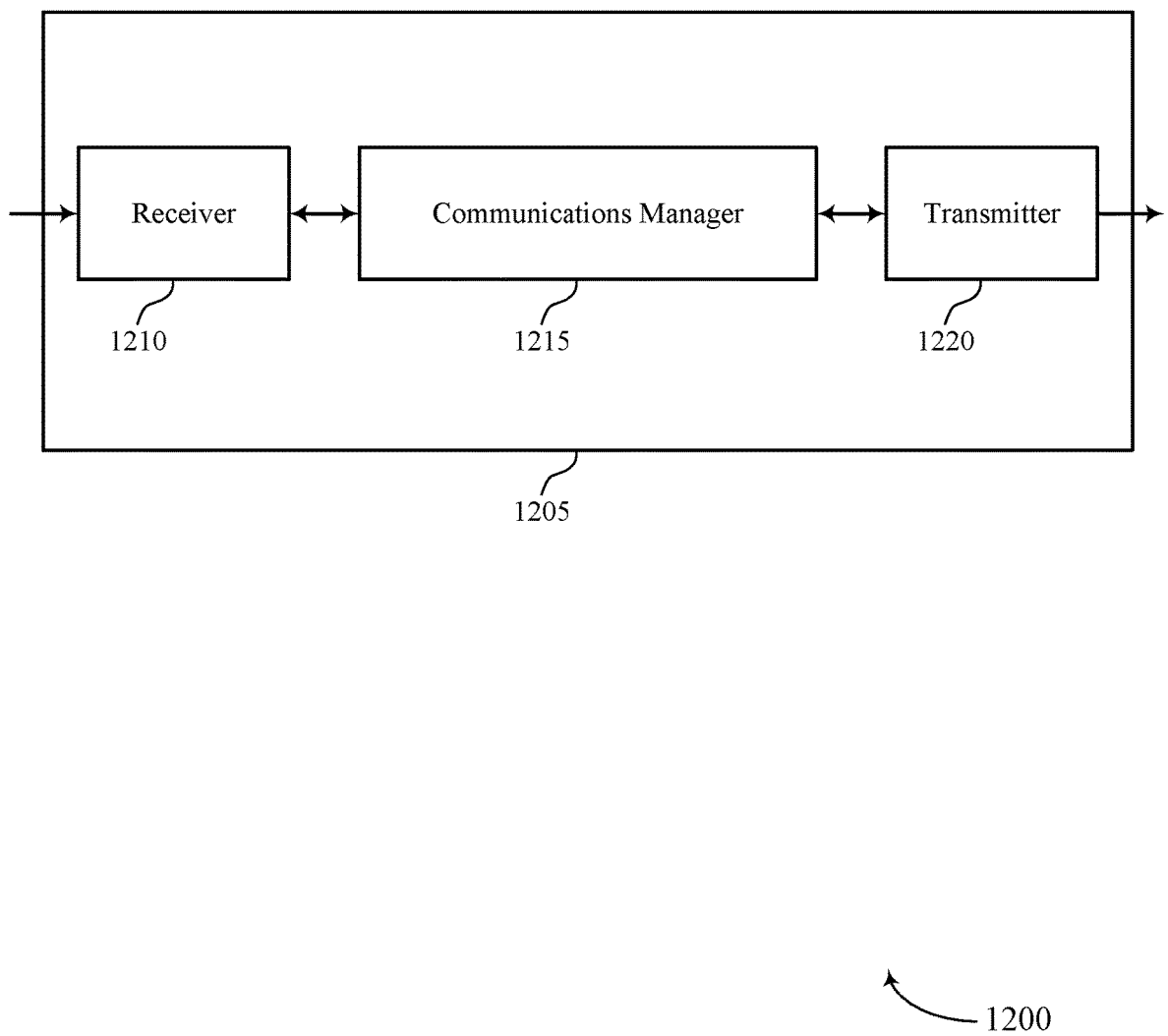
FIGS. 12 and 13 show block diagrams of devices that support a control link for a low-power and simplified transceiver in accordance with one or more aspects of the present disclosure.

FIG. 12 shows a block diagram 1200 of a device 1205 that supports control link for low-power and simplified transceiver in accordance with one or more aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to control link for low-power and simplified transceiver, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may perform a first random-access procedure to establish a control link with a base station, the UE including a reflective surface for forwarding signals from the base station to a device in a wireless network, detect that the control link with the base station is lost based on a timer or counter expiring or based on failing to receive signaling from the base station, and perform a second random-access procedure to re-establish the control link with the base station based on detecting that the control link with the base station is lost. The communications manager 1215 may also perform a first random-access procedure to establish a control link with a base station, the UE including a reflective surface for forwarding signals from the base station to a device in a wireless network and transmit an uplink transmission to the base station to maintain the control link with the base station.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

The communications manager 1215 may be an example of means for performing various aspects of control link management for low-power or simplified transceivers as described herein. The communications manager 1215, or its sub-components, may be implemented in hardware (e.g., in communications management circuitry). The circuitry may comprise of a processor, a digital signal processor (DSP), an application-specific integrated circuit (ASIC), a field-programmable gate array (FPGA) or other programmable logic devices, discrete gate or transistor logic, discrete hardware components, or any combination thereof designed to perform the functions described in the present disclosure.

In another implementation, the communications manager 1215, or its sub-components, may be implemented in code (e.g., as communications management software or firmware) executed by a processor, or any combination thereof. If implemented in code executed by a processor, the functions of the communications manager 1215, or its sub-components may be executed by a general-purpose processor, a DSP, an ASIC, a FPGA, or other programmable logic devices.

In some examples, the communication manager 1215 may be configured to perform various operations (e.g., establishing, receiving, detecting, re-establishing, transmitting, etc.) using or otherwise in cooperation with the receiver 1210, the transmitter 1220, or both.

Figure 13:
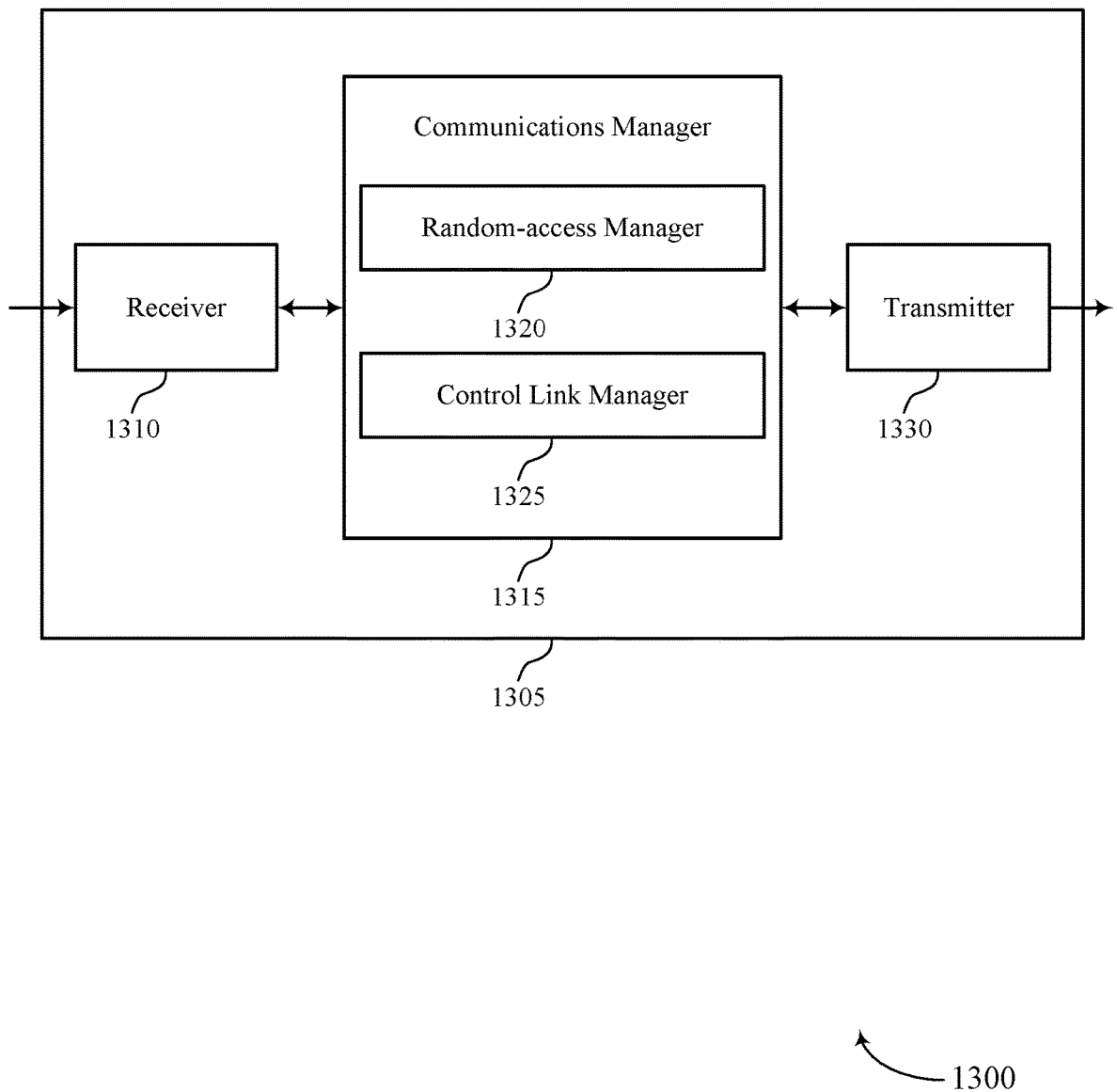

FIG. 13 shows a block diagram 1300 of a device 1305 that supports control link for low-power and simplified transceiver in accordance with one or more aspects of the present disclosure. The device 1305 may be an example of aspects of a device 1205, or a UE 115 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to control link for low-power and simplified transceiver, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a random-access manager 1320 and a control link manager 1325. The communications manager 1315 may be an example of aspects of the communications manager 1215 described herein.

The random-access manager 1320 may perform a first random-access procedure to establish a control link with a base station, the UE including a reflective surface for forwarding signals from the base station to a device in a wireless network. The control link manager 1325 may detect that the control link with the base station is lost based on a timer or counter expiring or based on failing to receive signaling from the base station. The random-access manager 1320 may perform a second random-access procedure to re-establish the control link with the base station based on detecting that the control link with the base station is lost.

The random-access manager 1320 may perform a first random-access procedure to establish a control link with a base station, the UE including a reflective surface for forwarding signals from the base station to a device in a wireless network. The control link manager 1325 may transmit an uplink transmission to the base station to maintain the control link with the base station.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
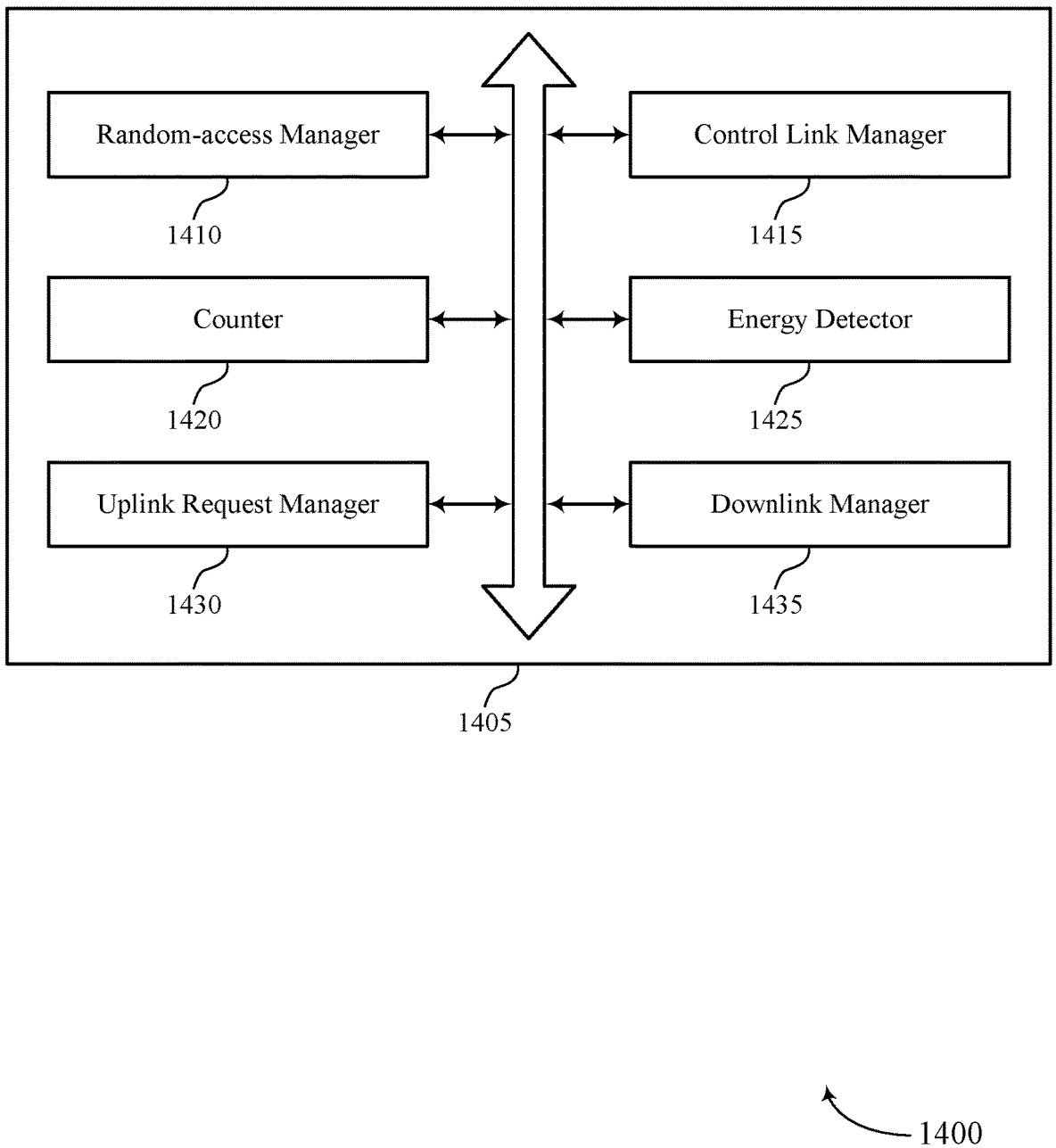
FIG. 14 shows a block diagram of a communications manager that supports a control link for a low-power and simplified transceiver in accordance with one or more aspects of the present disclosure.

FIG. 14 shows a block diagram 1400 of a communications manager 1405 that supports control link for low-power and simplified transceiver in accordance with one or more aspects of the present disclosure. The communications manager 1405 may be an example of aspects of a communications manager 1215, a communications manager 1315, or a communications manager 1510 described herein. The communications manager 1405 may include a random-access manager 1410, a control link manager 1415, a counter 1420, an energy detector 1425, an uplink request manager 1430, and a downlink manager 1435. Each of these modules may communicate, directly or indirectly, with one another (e.g., via one or more buses).

The random-access manager 1410 may perform a first random-access procedure to establish a control link with a base station, the UE including a reflective surface for forwarding signals from the base station to a device in a wireless network. The control link manager 1415 may detect that the control link with the base station is lost based on a timer or counter expiring or based on failing to receive signaling from the base station. In some examples, the random-access manager 1410 may perform a second random-access procedure to re-establish the control link with the base station based on detecting that the control link with the base station is lost.

In some examples, the control link manager 1415 may fail to receive one or more periodic indicators in a control channel, where detecting that the control link with the base station is lost is based on failing to receive the one or more periodic indicators in the control channel. The counter 1420 may increment after failing to receive each of the one or more periodic indicators in the control channel, where detecting that the control link with the base station is lost is based on the counter exceeding a threshold. In some examples, the counter 1420 may decrement after failing to receive each of the one or more periodic indicators in the control channel, where detecting that the control link with the base station is lost is based on the counter reaching zero.

In some examples, the control link manager 1415 may identify that the control link with the base station is valid for a duration of the timer, where detecting that the control link with the base station is lost is based on the timer expiring. The energy detector 1425 may fail to detect energy from the base station for a duration of the timer, where detecting that the control link with the base station is lost is based on failing to detect the energy from the base station for the duration of the timer. In some examples, the control link manager 1415 may restart the timer after detecting energy from the base station. In some examples, the random-access manager 1410 may perform a contention-free random-access procedure using a C-RNTI to re-establish the control link with the base station.

In some examples, the random-access manager 1410 may perform a first random-access procedure to establish a control link with a base station, the UE including a reflective surface for forwarding signals from the base station to a device in a wireless network. In some examples, the control link manager 1415 may transmit an uplink transmission to the base station to maintain the control link with the base station. In some cases, the uplink transmission includes a scheduling request. In some cases, the uplink transmission includes a periodic uplink transmission. The uplink request manager 1430 may receive a request for the uplink transmission from the UE in response to a downlink transmission. The downlink manager 1435 may receive the downlink transmission from the base station, where the uplink transmission is received in response to the downlink transmission. In some examples, the random-access manager 1410 may transmit a random-access preamble indicating a quantity of control commands received from the base station.

Figure 15:
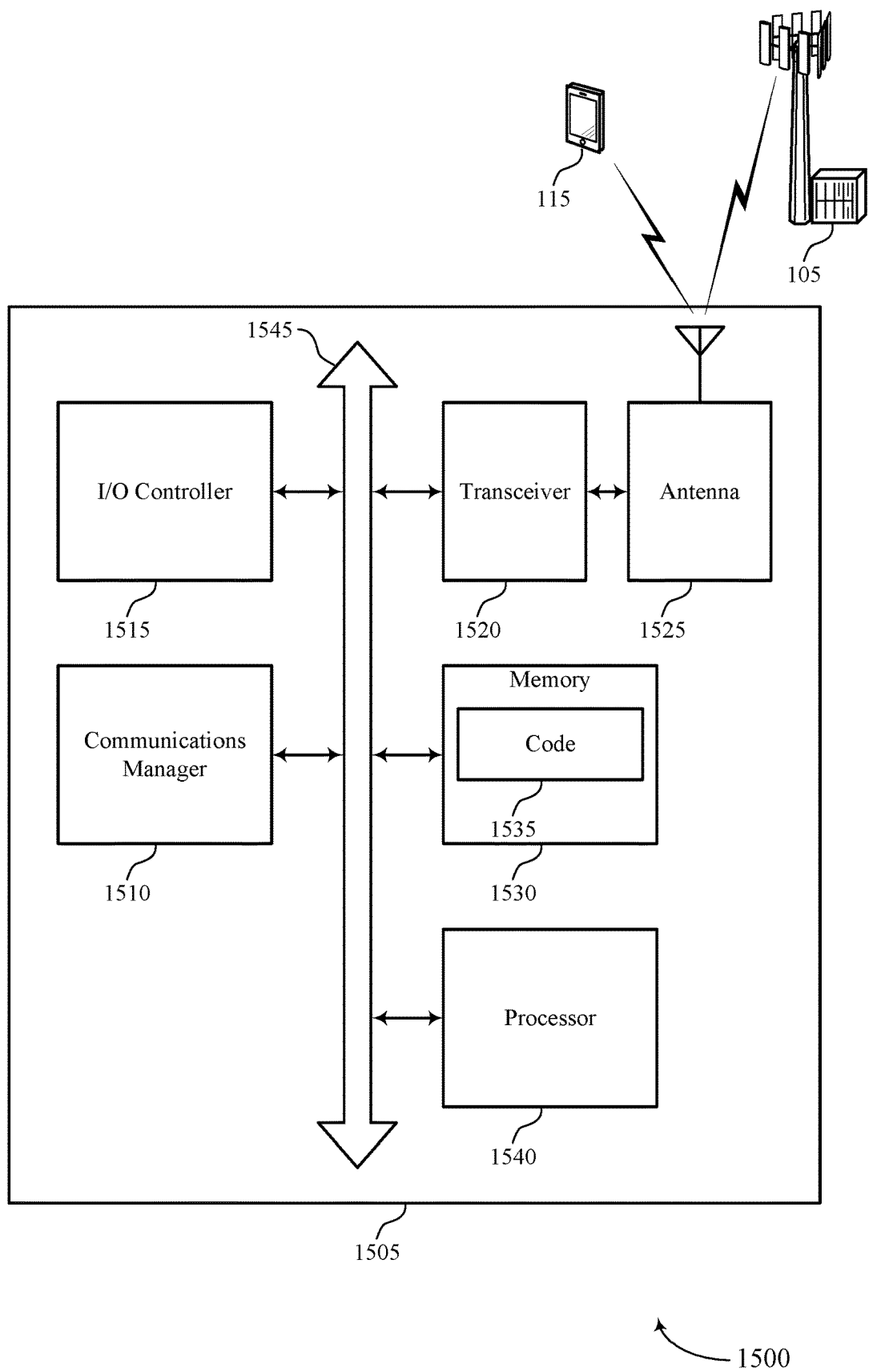
FIG. 15 shows a diagram of a system including a device that supports a control link for a low-power and simplified transceiver in accordance with one or more aspects of the present disclosure.

FIG. 15 shows a diagram of a system 1500 including a device 1505 that supports control link for low-power and simplified transceiver in accordance with one or more aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may perform a first random-access procedure to establish a control link with a base station, the UE including a reflective surface for forwarding signals from the base station to a device in a wireless network, detect that the control link with the base station is lost based on a timer or counter expiring or based on failing to receive signaling from the base station, and perform a second random-access procedure to re-establish the control link with the base station based on detecting that the control link with the base station is lost. The communications manager 1510 may also perform a first random-access procedure to establish a control link with a base station, the UE including a reflective surface for forwarding signals from the base station to a device in a wireless network and transmit an uplink transmission to the base station to maintain the control link with the base station.

The I/O controller 1515 may manage input and output signals for the device 1205. The I/O controller 1515 may also manage peripherals not integrated into the device 1205. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1205 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic input/output system (BIOS) which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1205 to perform various functions (e.g., functions or tasks supporting control link for low-power and simplified transceiver).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
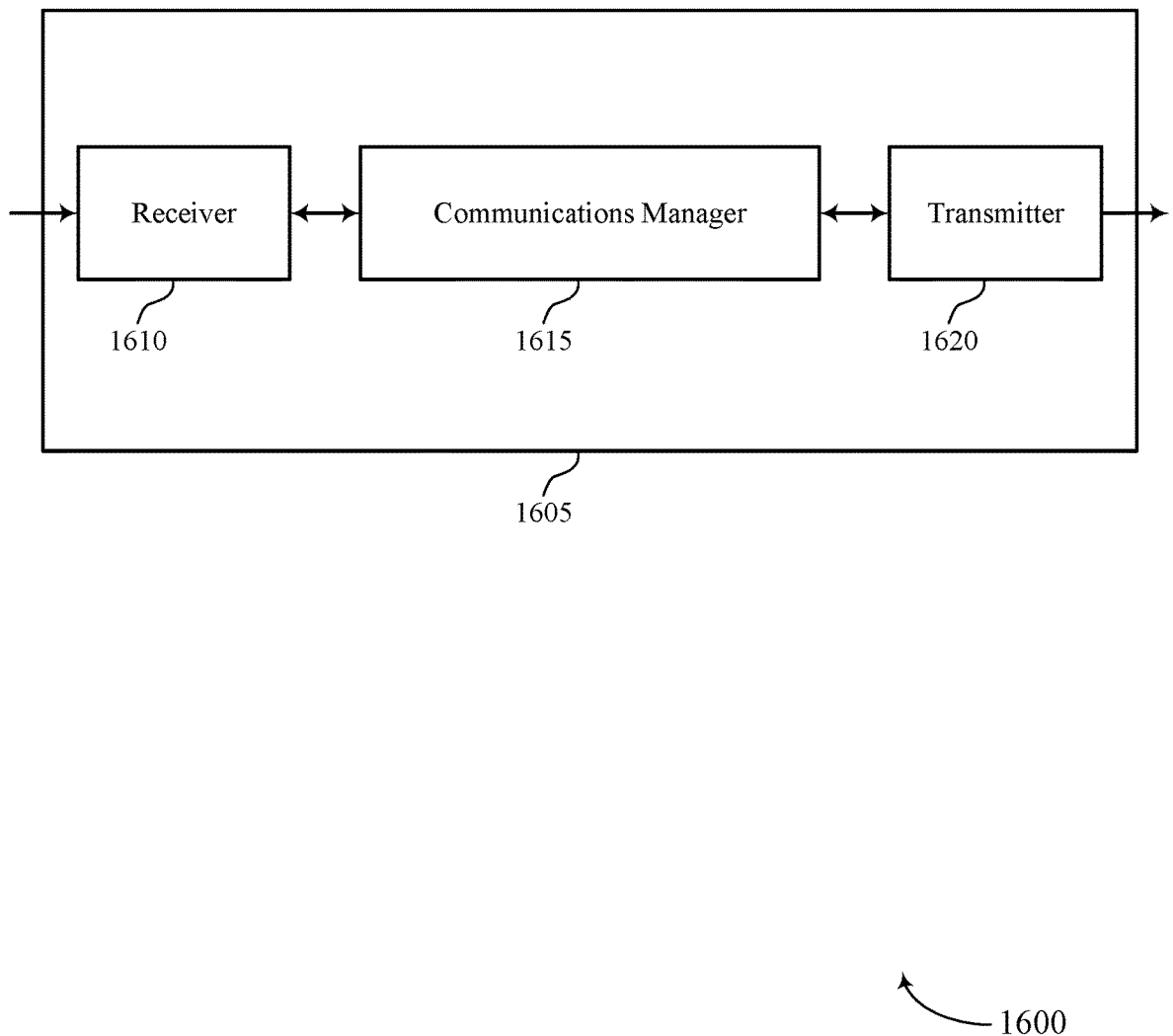
FIGS. 16 and 17 show block diagrams of devices that support a control link for a low-power and simplified transceiver in accordance with one or more aspects of the present disclosure.

FIG. 16 shows a block diagram 1600 of a device 1605 that supports control link for low-power and simplified transceiver in accordance with one or more aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to control link for low-power and simplified transceiver, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may perform a first random-access procedure to establish a control link with a UE, the UE including a reflective surface for forwarding signals from the base station to a device in a wireless network, transmit signaling to the UE to maintain the control link with the UE, and perform a second random-access procedure to re-establish the control link with the UE after the control link with the UE is lost. The communications manager 1615 may also perform a first random-access procedure to establish a control link with a UE, the UE including a reflective surface for forwarding signals from the base station to a device in a wireless network and receive an uplink transmission from the UE to maintain the control link with the base station. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

The communications manager 1615 may be an example of means for performing various aspects of control link management for low-power or simplified transceivers as described herein. The communications manager 1615, or its sub-components, may be implemented in hardware (e.g., in communications management circuitry). The circuitry may comprise of a processor, a DSP, an ASIC, an FPGA or other programmable logic devices, discrete gate or transistor logic, discrete hardware components, or any combination thereof designed to perform the functions described in the present disclosure.

In another implementation, the communications manager 1615, or its sub-components, may be implemented in code (e.g., as communications management software or firmware) executed by a processor, or any combination thereof. If implemented in code executed by a processor, the functions of the communications manager 1615, or its sub-components may be executed by a general-purpose processor, a DSP, an ASIC, a FPGA, or other programmable logic devices.

In some examples, the communication manager 1615 may be configured to perform various operations (e.g., establishing, receiving, detecting, re-establishing, transmitting, etc.) using or otherwise in cooperation with the receiver 1610, the transmitter 1620, or both.

Figure 17:
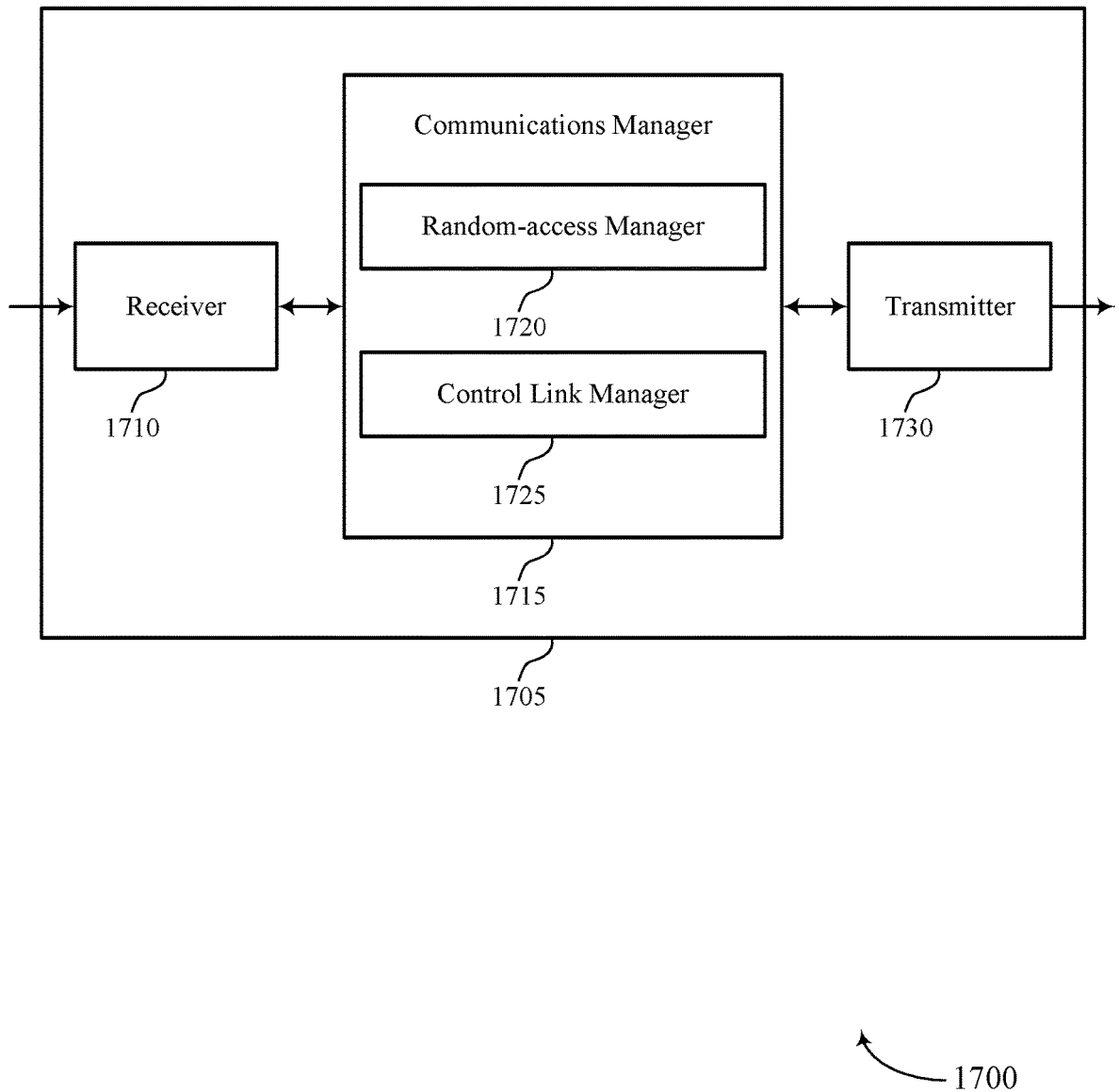

FIG. 17 shows a block diagram 1700 of a device 1705 that supports control link for low-power and simplified transceiver in accordance with one or more aspects of the present disclosure. The device 1705 may be an example of aspects of a device 1605, or a base station 105 as described herein. The device 1705 may include a receiver 1710, a communications manager 1715, and a transmitter 1730. The device 1705 may also include a processor. Each of these components may be in communication with one another (e.g., via one or more buses).

The receiver 1710 may receive information such as packets, user data, or control information associated with various information channels (e.g., control channels, data channels, and information related to control link for low-power and simplified transceiver, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1715 as described herein. The communications manager 1715 may include a random-access manager 1720 and a control link manager 1725. The communications manager 1715 may be an example of aspects of the communications manager 1910 described herein.

The random-access manager 1720 may perform a first random-access procedure to establish a control link with a UE, the UE including a reflective surface for forwarding signals from the base station to a device in a wireless network. The control link manager 1725 may transmit signaling to the UE to maintain the control link with the UE. The random-access manager 1720 may perform a second random-access procedure to re-establish the control link with the UE after the control link with the UE is lost.

The random-access manager 1720 may perform a first random-access procedure to establish a control link with a UE, the UE including a reflective surface for forwarding signals from the base station to a device in a wireless network. The control link manager 1725 may receive an uplink transmission from the UE to maintain the control link with the base station.

The transmitter 1730 may transmit signals generated by other components of the device 1705. In some examples, the transmitter 1730 may be collocated with a receiver 1710 in a transceiver module. For example, the transmitter 1730 may be an example of aspects of the transceiver 1920 described with reference to FIG. 19. The transmitter 1730 may utilize a single antenna or a set of antennas.

Figure 18:
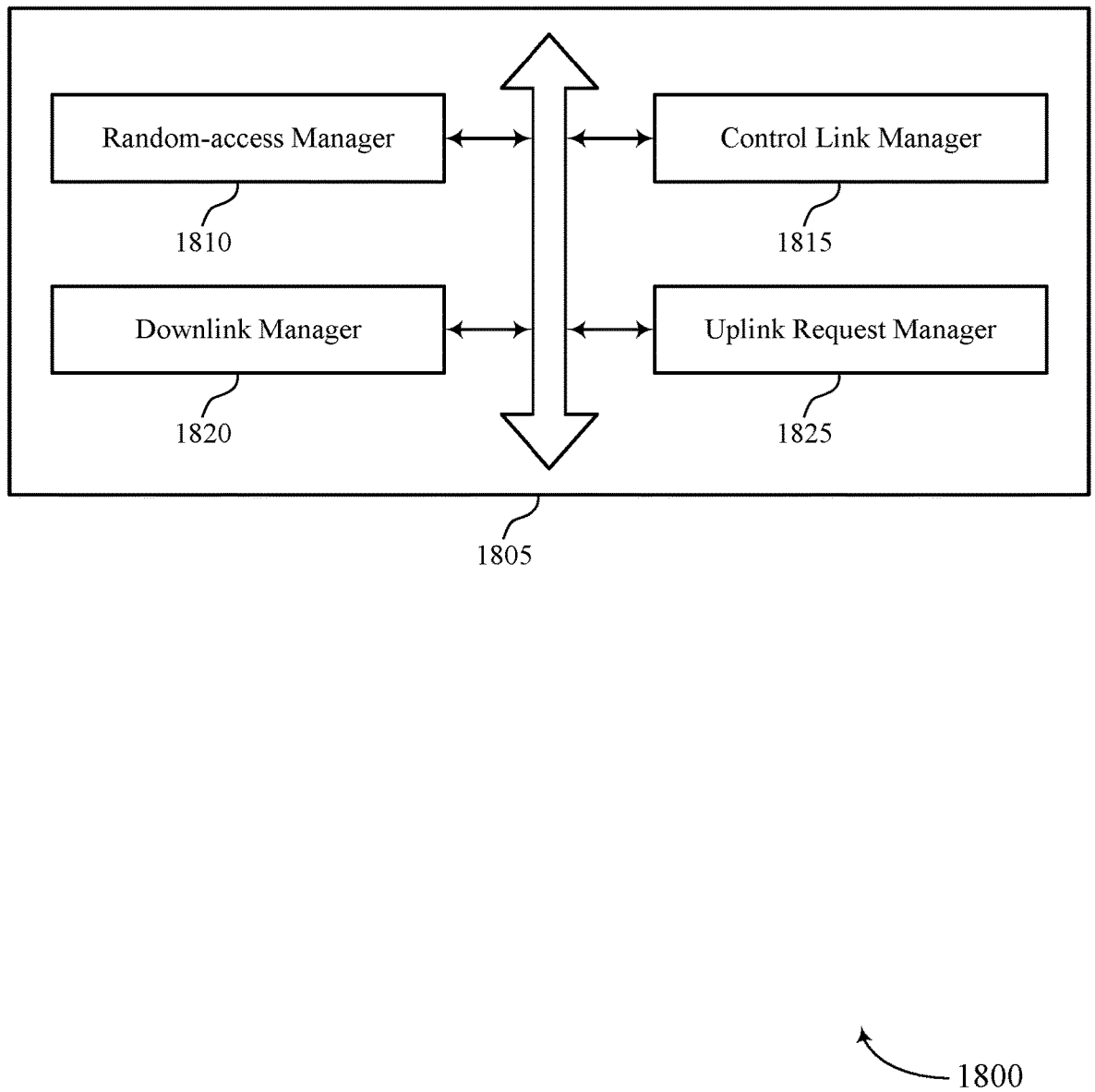
FIG. 18 shows a block diagram of a communications manager that supports a control link for a low-power and simplified transceiver in accordance with one or more aspects of the present disclosure.

FIG. 18 shows a block diagram 1800 of a communications manager 1805 that supports control link for low-power and simplified transceiver in accordance with one or more aspects of the present disclosure. The communications manager 1805 may be an example of aspects of a communications manager 1615, a communications manager 1715, or a communications manager 1910 described herein. The communications manager 1805 may include a random-access manager 1810, a control link manager 1815, a downlink manager 1820, and an uplink request manager 1825. Each of these modules may communicate, directly or indirectly, with one another (e.g., via one or more buses).

The random-access manager 1810 may perform a first random-access procedure to establish a control link with a UE, the UE including a reflective surface for forwarding signals from the base station to a device in a wireless network. The control link manager 1815 may transmit signaling to the UE to maintain the control link with the UE. In some examples, the random-access manager 1810 may perform a second random-access procedure to re-establish the control link with the UE after the control link with the UE is lost. In some examples, the control link manager 1815 may transmit one or more periodic indicators in a control channel to the base station, where the control link with the UE is lost when the UE fails to receive a threshold number of the one or more periodic indicators. In some examples, the random-access manager 1810 may perform a contention-free random-access procedure using a C-RNTI to re-establish the control link with the UE.

In some examples, the random-access manager 1810 may perform a first random-access procedure to establish a control link with a UE, the UE including a reflective surface for forwarding signals from the base station to a device in a wireless network. In some examples, the control link manager 1815 may receive an uplink transmission from the UE to maintain the control link with the base station. In some examples, the control link manager 1815 may fail to receive one or more uplink transmissions from the UE. In some examples, the control link manager 1815 may detect that the control link with the UE is lost based on failing to receive the one or more uplink transmissions from the UE. The downlink manager 1820 may avoid transmitting downlink signals to the UE for forwarding to the device in the wireless network until the UE performs a second random-access procedure to re-establish the control link with the base station. In some cases, the uplink transmission includes a scheduling request. In some cases, the uplink transmission includes a periodic uplink transmission.

The uplink request manager 1825 may transmit a request for the uplink transmission from the UE in response to a downlink transmission. In some examples, the downlink manager 1820 may transmit the downlink transmission to the UE, where the uplink transmission is received in response to the downlink transmission. In some examples, the random-access manager 1810 may receive a random-access preamble indicating a first quantity of control commands received from the base station. In some examples, the control link manager 1815 may determine that a second quantity of control commands transmitted by the base station exceeds the first quantity of control commands received by the UE by a threshold amount. In some examples, the control link manager 1815 may detect that the control link with the UE is lost based on the determining. In some examples, the downlink manager 1820 may avoid transmitting downlink signals to the UE for forwarding to the device in the wireless network until the UE performs a second random-access procedure to re-establish the control link with the base station.

Figure 19:
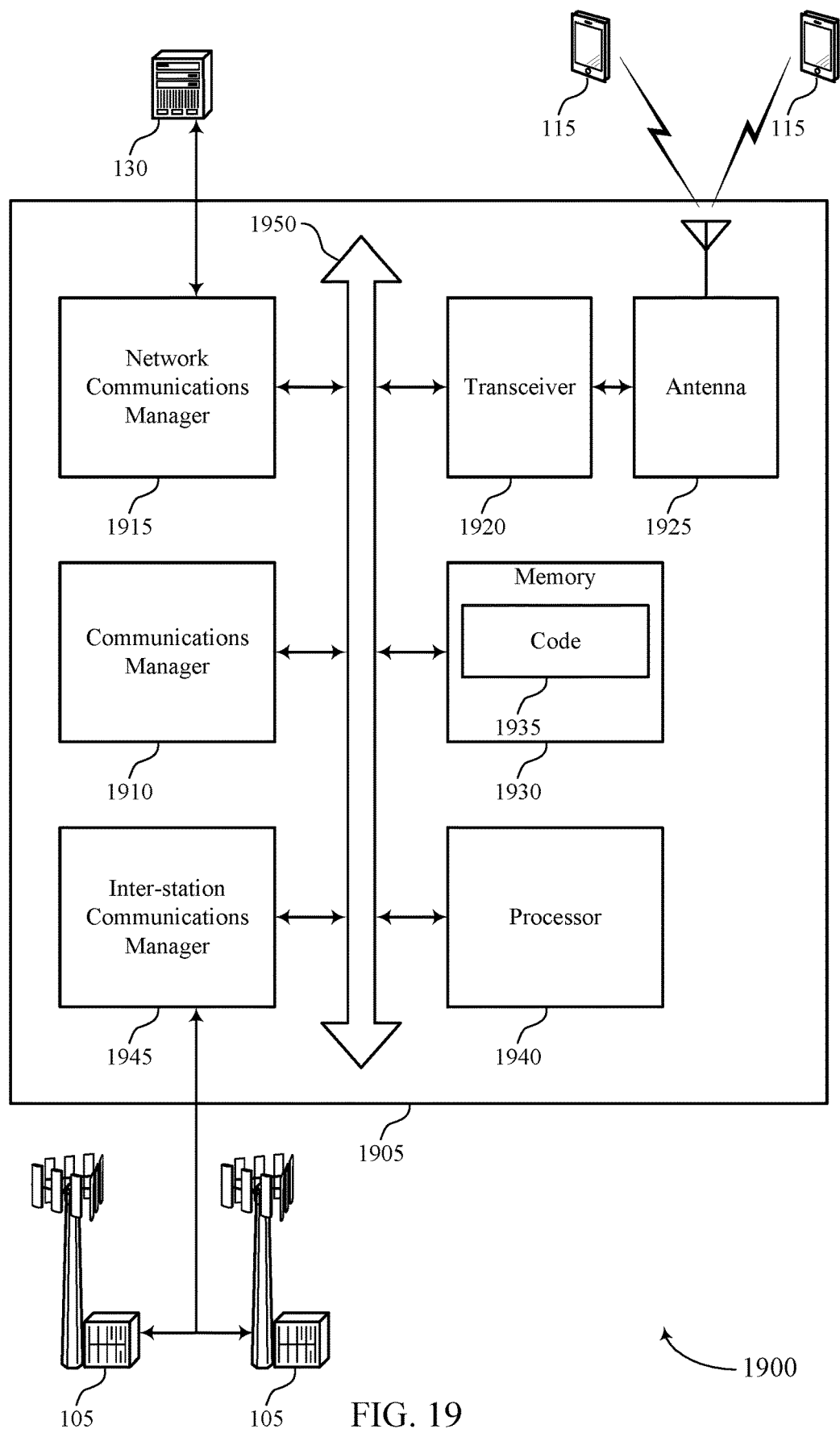
FIG. 19 shows a diagram of a system including a device that supports a control link for a low-power and simplified transceiver in accordance with one or more aspects of the present disclosure.

FIG. 19 shows a diagram of a system 1900 including a device 1905 that supports control link for low-power and simplified transceiver in accordance with one or more aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may perform a first random-access procedure to establish a control link with a UE, the UE including a reflective surface for forwarding signals from the base station to a device in a wireless network, transmit signaling to the UE to maintain the control link with the UE, and perform a second random-access procedure to re-establish the control link with the UE after the control link with the UE is lost. The communications manager 1910 may also perform a first random-access procedure to establish a control link with a UE, the UE including a reflective surface for forwarding signals from the base station to a device in a wireless network and receive an uplink transmission from the UE to maintain the control link with the base station.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1605 to perform various functions (e.g., functions or tasks supporting control link for low-power and simplified transceiver).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
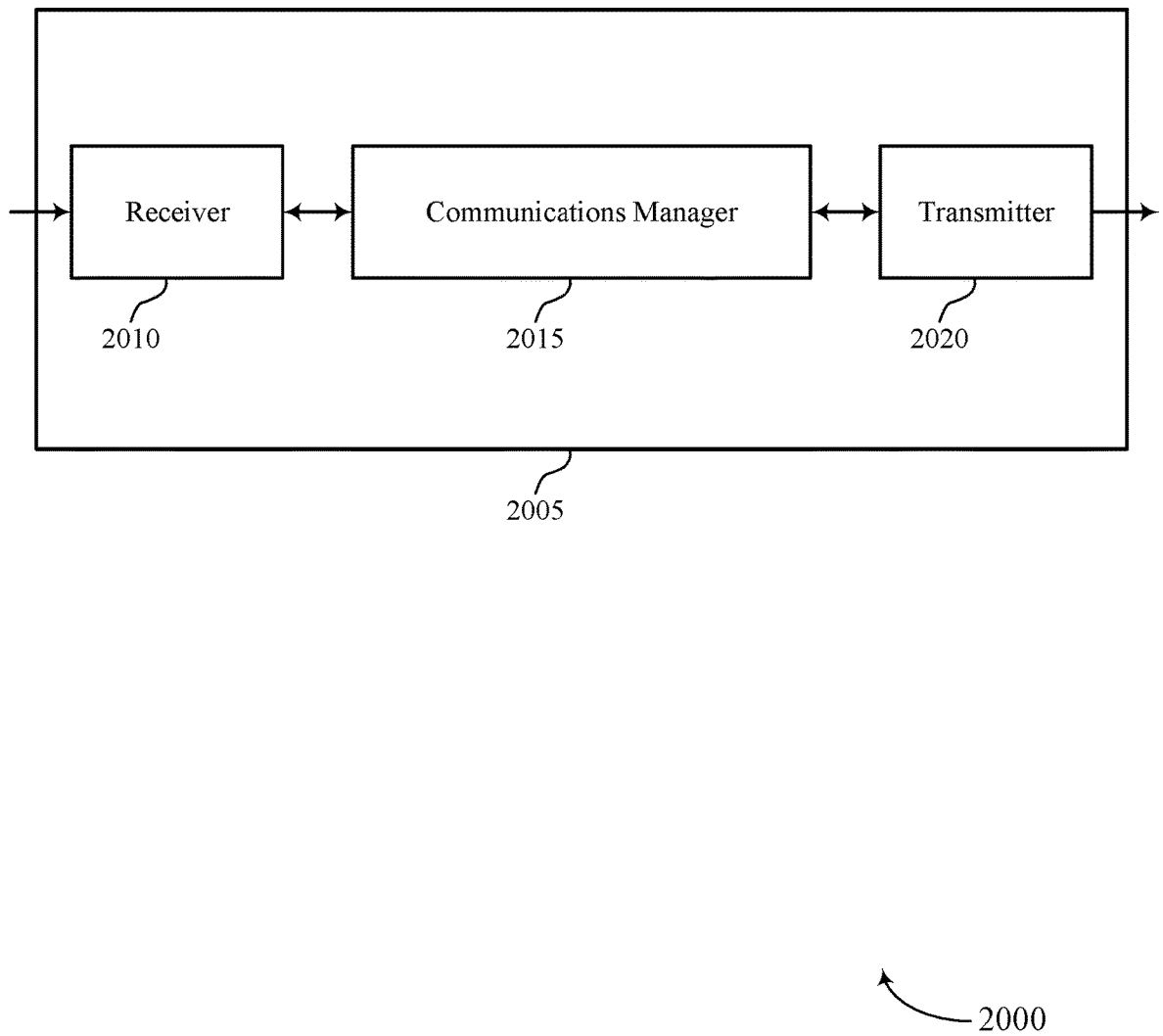
FIGS. 20 and 21 show block diagrams of devices that support a control link for a low-power and simplified transceiver in accordance with one or more aspects of the present disclosure.

FIG. 20 shows a block diagram 2000 of a device 2005 that supports random-access procedure for low-power and simplified transceiver in accordance with one or more aspects of the present disclosure. The device 2005 may be an example of aspects of a UE 115 as described herein. The device 2005 may include a receiver 2010, a communications manager 2015, and a transmitter 2020. The device 2005 may also include a processor. Each of these components may be in communication with one another (e.g., via one or more buses).

The receiver 2010 may receive information such as packets, user data, or control information associated with various information channels (e.g., control channels, data channels, and information related to random-access procedure for low-power and simplified transceiver, etc.). Information may be passed on to other components of the device 2005. The receiver 2010 may be an example of aspects of the transceiver 2320 described with reference to FIG. 23. The receiver 2010 may utilize a single antenna or a set of antennas.

The communications manager 2015 may initiate a random-access procedure to connect to a base station, transmit, to the base station, an indication that the UE includes a reflective surface for forwarding signals from the base station to a device in a wireless network, and receive signals from the base station for forwarding to the device in the wireless network based on transmitting the indication. The communications manager 2015 may be an example of aspects of the communications manager 2310 described herein.

The communications manager 2015, or its sub-components, may be implemented in hardware, code (e.g., software or firmware) executed by a processor, or any combination thereof. If implemented in code executed by a processor, the functions of the communications manager 2015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 2015, or its sub-components, may be physically located at various positions, including being distributed such that portions of functions are implemented at different physical locations by one or more physical components. In some examples, the communications manager 2015, or its sub-components, may be a separate and distinct component in accordance with various aspects of the present disclosure. In some examples, the communications manager 2015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2020 may transmit signals generated by other components of the device 2005. In some examples, the transmitter 2020 may be collocated with a receiver 2010 in a transceiver module. For example, the transmitter 2020 may be an example of aspects of the transceiver 2320 described with reference to FIG. 23. The transmitter 2020 may utilize a single antenna or a set of antennas.

Figure 21:
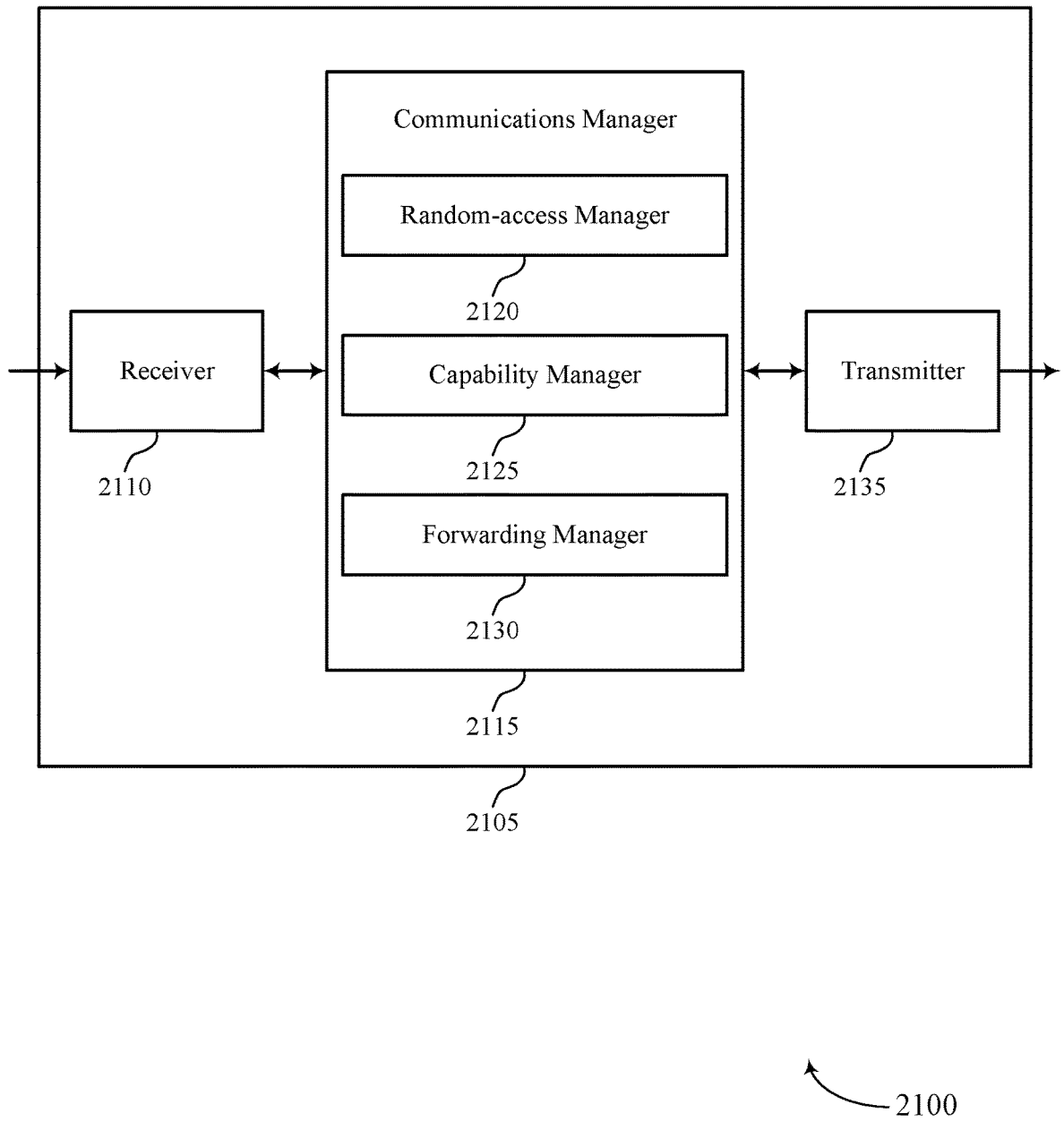

FIG. 21 shows a block diagram 2100 of a device 2105 that supports random-access procedure for low-power and simplified transceiver in accordance with one or more aspects of the present disclosure. The device 2105 may be an example of aspects of a device 2005, or a UE 115 as described herein. The device 2105 may include a receiver 2110, a communications manager 2115, and a transmitter 2135. The device 2105 may also include a processor. Each of these components may be in communication with one another (e.g., via one or more buses).

The receiver 2110 may receive information such as packets, user data, or control information associated with various information channels (e.g., control channels, data channels, and information related to random-access procedure for low-power and simplified transceiver, etc.). Information may be passed on to other components of the device 2105. The receiver 2110 may be an example of aspects of the transceiver 2320 described with reference to FIG. 23. The receiver 2110 may utilize a single antenna or a set of antennas.

The communications manager 2115 may be an example of aspects of the communications manager 2015 as described herein. The communications manager 2115 may include a random-access manager 2120, a capability manager 2125, and a forwarding manager 2130. The communications manager 2115 may be an example of aspects of the communications manager 2310 described herein.

The random-access manager 2120 may initiate a random-access procedure to connect to a base station. The capability manager 2125 may transmit, to the base station, an indication that the UE includes a reflective surface for forwarding signals from the base station to a device in a wireless network. The forwarding manager 2130 may receive signals from the base station for forwarding to the device in the wireless network based on transmitting the indication.

The transmitter 2135 may transmit signals generated by other components of the device 2105. In some examples, the transmitter 2135 may be collocated with a receiver 2110 in a transceiver module. For example, the transmitter 2135 may be an example of aspects of the transceiver 2320 described with reference to FIG. 23. The transmitter 2135 may utilize a single antenna or a set of antennas.

Figure 22:
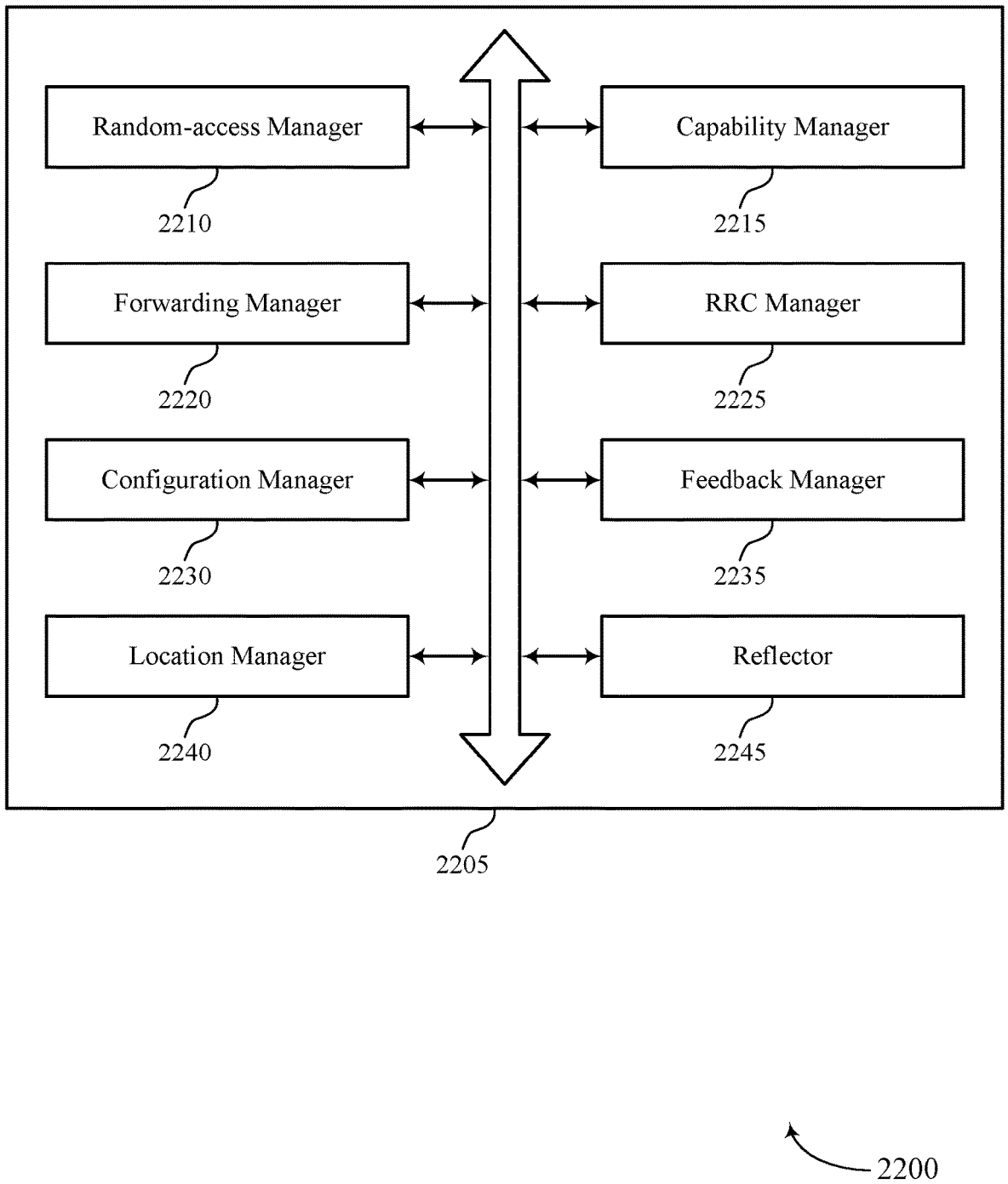
FIG. 22 shows a block diagram of a communications manager that supports a control link for a low-power and simplified transceiver in accordance with one or more aspects of the present disclosure.

FIG. 22 shows a block diagram 2200 of a communications manager 2205 that supports random-access procedure for low-power and simplified transceiver in accordance with one or more aspects of the present disclosure. The communications manager 2205 may be an example of aspects of a communications manager 2015, a communications manager 2115, or a communications manager 2310 described herein. The communications manager 2205 may include a random-access manager 2210, a capability manager 2215, a forwarding manager 2220, a RRC manager 2225, a configuration manager 2230, a feedback manager 2235, a location manager 2240, and a reflector 2245. Each of these modules may communicate, directly or indirectly, with one another (e.g., via one or more buses).

The random-access manager 2210 may initiate a random-access procedure to connect to a base station. The capability manager 2215 may transmit, to the base station, an indication that the UE includes a reflective surface for forwarding signals from the base station to a device in a wireless network. The forwarding manager 2220 may receive signals from the base station for forwarding to the device in the wireless network based on transmitting the indication.

In some examples, the random-access manager 2210 may transmit a random-access preamble indicating that the UE includes the reflective surface. In some examples, the random-access manager 2210 may identify the random-access preamble from one or more random-access preambles reserved for indicating that the UE includes the reflective surface. In some examples, the random-access manager 2210 may transmit a first random-access message in a two-step random-access procedure including the indication that the UE includes the reflective surface. In some examples, the random-access manager 2210 may transmit a third random-access message in a four-step random-access procedure including the indication that the UE includes the reflective surface. The RRC manager 2225 may transmit, after the random-access procedure, an RRC message indicating that the UE includes the reflective surface.

In some examples, the random-access manager 2210 may receive an indication of one or more random-access preambles reserved for indicating that the UE includes the reflective surface. In some examples, the random-access manager 2210 may transmit, as part of a subsequent random-access procedure, a random-access preamble of the one or more random-access preambles indicating that the UE includes the reflective surface. The configuration manager 2230 may receive, from the base station, a command indicating a sweep pattern, sweep direction, center frequency, bandwidth, or a combination thereof for forwarding signals from the base station to the device in the wireless network. In some examples, the forwarding manager 2220 may forward signals from the base station to the device in the wireless network based on receiving the command.

The feedback manager 2235 may receive, from the base station, a command indicating positive or negative feedback for signals forwarded from the base station to the device in the wireless network. In some examples, the configuration manager 2230 may tune parameters for forwarding signals from the base station to the device in the wireless network based on the command. In some examples, the forwarding manager 2220 may forward signals from the base station to the device in the wireless network based on the tuning. The location manager 2240 may transmit an indication of a location of the device in the wireless network to the base station. The reflector 2245 may receive one or more signals from the base station, and the reflector 2245 may reflect the one or more signals back to the base station at a same angle at which the one or more signals are received. In some cases, the UE includes a low-power UE and the reflective surface includes an IRS.

Figure 23:
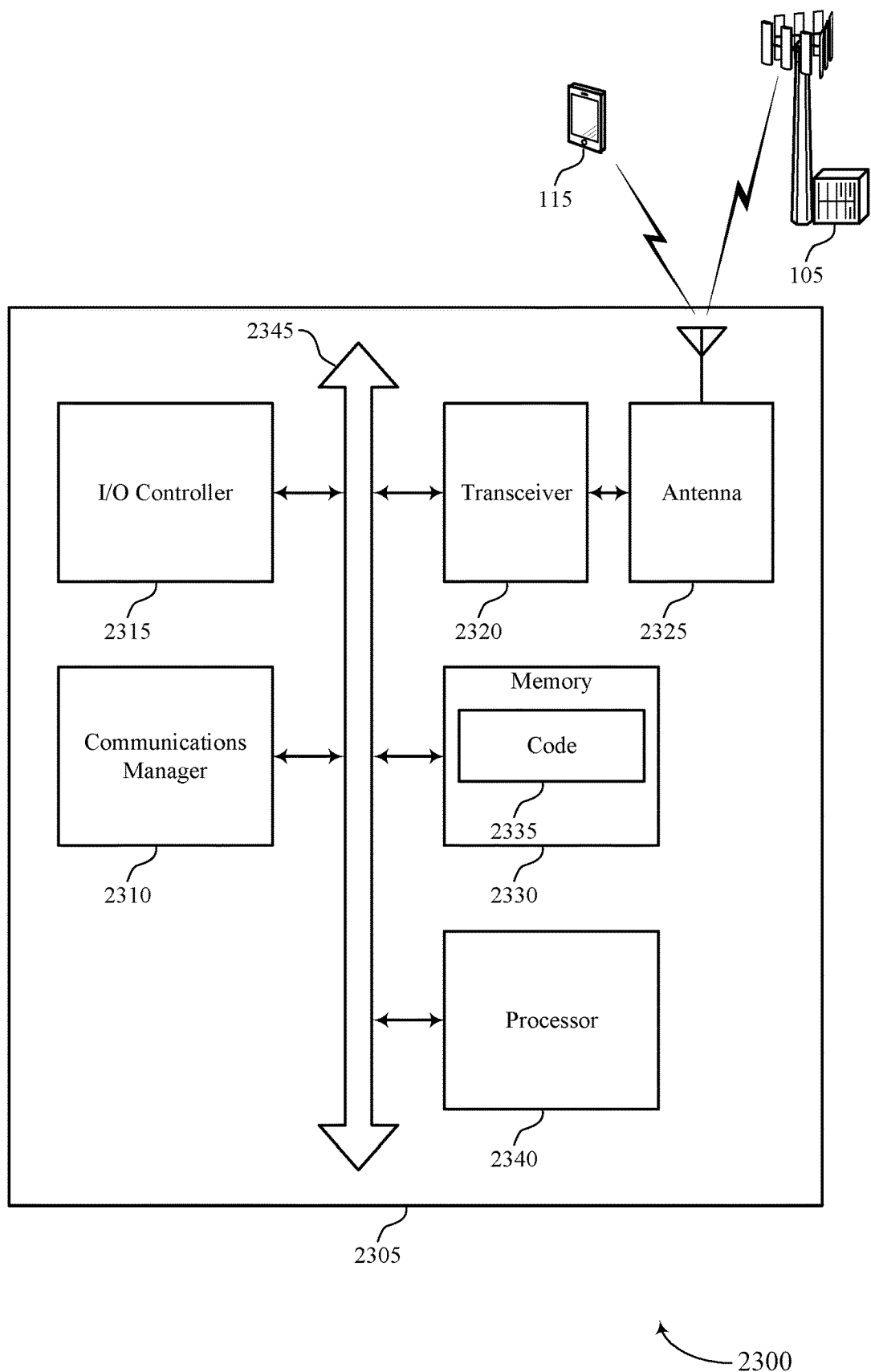
FIG. 23 shows a diagram of a system including a device that supports a control link for a low-power and simplified transceiver in accordance with one or more aspects of the present disclosure.

FIG. 23 shows a diagram of a system 2300 including a device 2305 that supports random-access procedure for low-power and simplified transceiver in accordance with one or more aspects of the present disclosure. The device 2305 may be an example of or include the components of device 2005, device 2105, or a UE 115 as described herein. The device 2305 may include components for bi-directional voice and data communications including components for transmitting and receiving communications, including a communications manager 2310, an I/O controller 2315, a transceiver 2320, an antenna 2325, memory 2330, and a processor 2340. These components may be in electronic communication via one or more buses (e.g., bus 2345).

The communications manager 2310 may initiate a random-access procedure to connect to a base station, transmit, to the base station, an indication that the UE includes a reflective surface for forwarding signals from the base station to a device in a wireless network, and receive signals from the base station for forwarding to the device in the wireless network based on transmitting the indication.

The I/O controller 2315 may manage input and output signals for the device 2305. The I/O controller 2315 may also manage peripherals not integrated into the device 2305. In some cases, the I/O controller 2315 may represent a physical connection or port to an external peripheral. In some cases, the I/O controller 2315 may utilize an operating system such as iOS®, ANDROID®, MS-DOS®, MS-WINDOWS®, OS/2®, UNIX®, LINUX®, or another known operating system. In other cases, the I/O controller 2315 may represent or interact with a modem, a keyboard, a mouse, a touchscreen, or a similar device. In some cases, the I/O controller 2315 may be implemented as part of a processor. In some cases, a user may interact with the device 2305 via the I/O controller 2315 or via hardware components controlled by the I/O controller 2315.

The transceiver 2320 may communicate bi-directionally, via one or more antennas, wired, or wireless links as described above. For example, the transceiver 2320 may represent a wireless transceiver and may communicate bi-directionally with another wireless transceiver. The transceiver 2320 may also include a modem to modulate the packets and provide the modulated packets to the antennas for transmission, and to demodulate packets received from the antennas.

In some cases, the wireless device may include a single antenna 2325. However, in some cases the device may have more than one antenna 2325, which may be capable of concurrently transmitting or receiving multiple wireless transmissions.

The memory 2330 may include random-access memory (RAM) and read-only memory (ROM). The memory 2330 may store computer-readable, computer-executable code 1135 including instructions that, when executed, cause the processor to perform various functions described herein. In some cases, the memory 2330 may contain, among other things, a basic input/output system (BIOS) which may control basic hardware or software operation such as the interaction with peripheral components or devices.

The processor 2340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2340 may be configured to operate a memory array using a memory controller. In other cases, a memory controller may be integrated into the processor 2340. The processor 2340 may be configured to execute computer-readable instructions stored in a memory (e.g., the memory 2330) to cause the device 2305 to perform various functions (e.g., functions or tasks supporting random-access procedure for low-power and simplified transceiver).

The code 2335 may include instructions to implement aspects of the present disclosure, including instructions to support wireless communications. The code 2335 may be stored in a non-transitory computer-readable medium such as system memory or other type of memory. In some cases, the code 2335 may not be directly executable by the processor 2340 but may cause a computer (e.g., when compiled and executed) to perform functions described herein.

Figure 24:
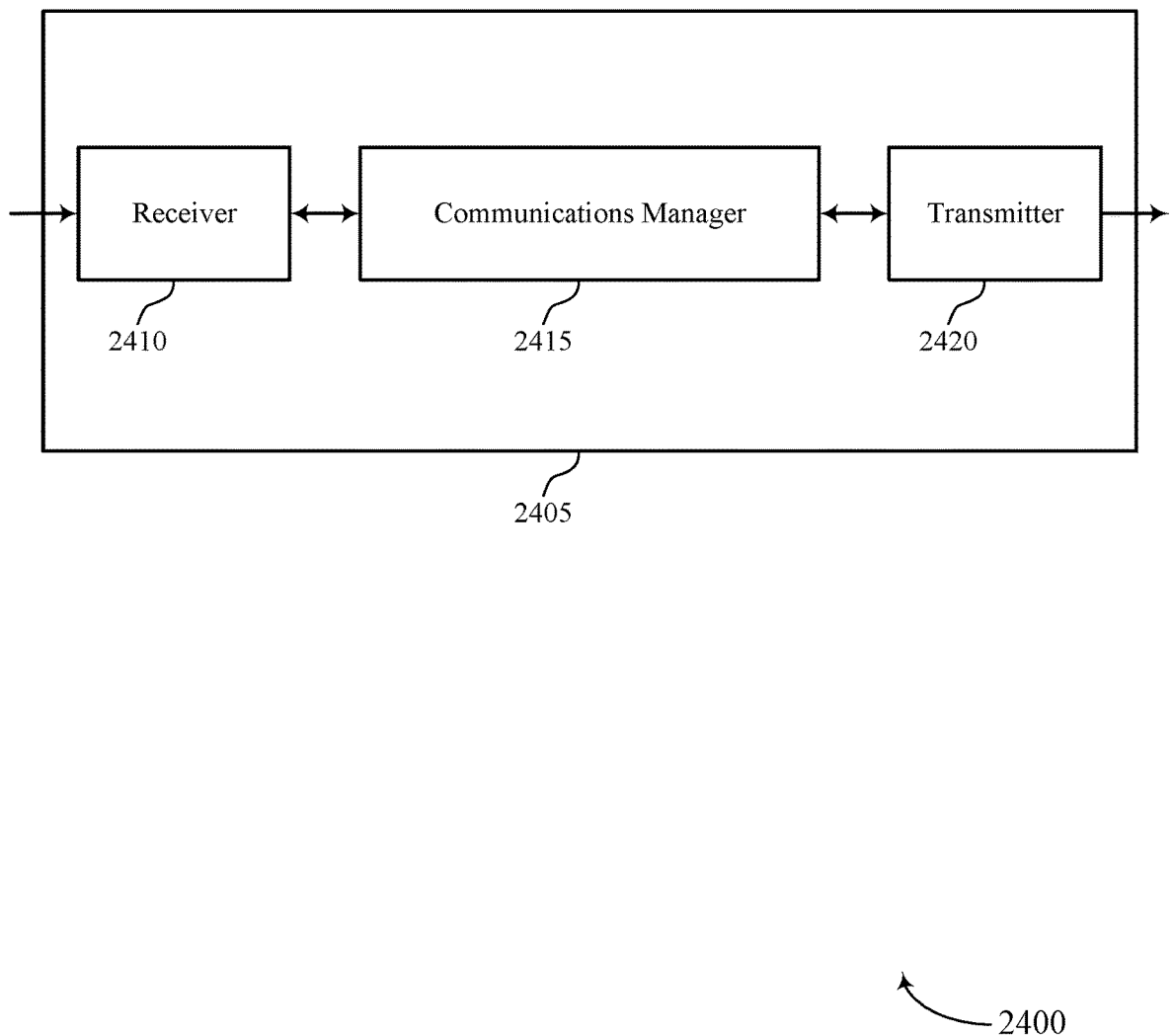
FIGS. 24 and 25 show block diagrams of devices that support a control link for a low-power and simplified transceiver in accordance with one or more aspects of the present disclosure.

FIG. 24 shows a block diagram 2400 of a device 2405 that supports random-access procedure for low-power and simplified transceiver in accordance with one or more aspects of the present disclosure. The device 2405 may be an example of aspects of a base station 105 as described herein. The device 2405 may include a receiver 2410, a communications manager 2415, and a transmitter 2420. The device 2405 may also include a processor. Each of these components may be in communication with one another (e.g., via one or more buses).

The receiver 2410 may receive information such as packets, user data, or control information associated with various information channels (e.g., control channels, data channels, and information related to random-access procedure for low-power and simplified transceiver, etc.). Information may be passed on to other components of the device 2405. The receiver 2410 may be an example of aspects of the transceiver 1520 described with reference to FIG. 15. The receiver 2410 may utilize a single antenna or a set of antennas.

The communications manager 2415 may receive, from a UE, an indication that the UE includes a reflective surface for forwarding signals from the base station to a device in a wireless network and transmit signals to the UE for forwarding to the device in the wireless network based on receiving the indication. The communications manager 2415 may be an example of aspects of the communications manager 1510 described herein.

The communications manager 2415, or its sub-components, may be implemented in hardware, code (e.g., software or firmware) executed by a processor, or any combination thereof. If implemented in code executed by a processor, the functions of the communications manager 2415, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 2415, or its sub-components, may be physically located at various positions, including being distributed such that portions of functions are implemented at different physical locations by one or more physical components. In some examples, the communications manager 2415, or its sub-components, may be a separate and distinct component in accordance with various aspects of the present disclosure. In some examples, the communications manager 2415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 2420 may transmit signals generated by other components of the device 2405. In some examples, the transmitter 2420 may be collocated with a receiver 2410 in a transceiver module. For example, the transmitter 2420 may be an example of aspects of the transceiver 2720 described with reference to FIG. 27. The transmitter 2420 may utilize a single antenna or a set of antennas.

Figure 25:
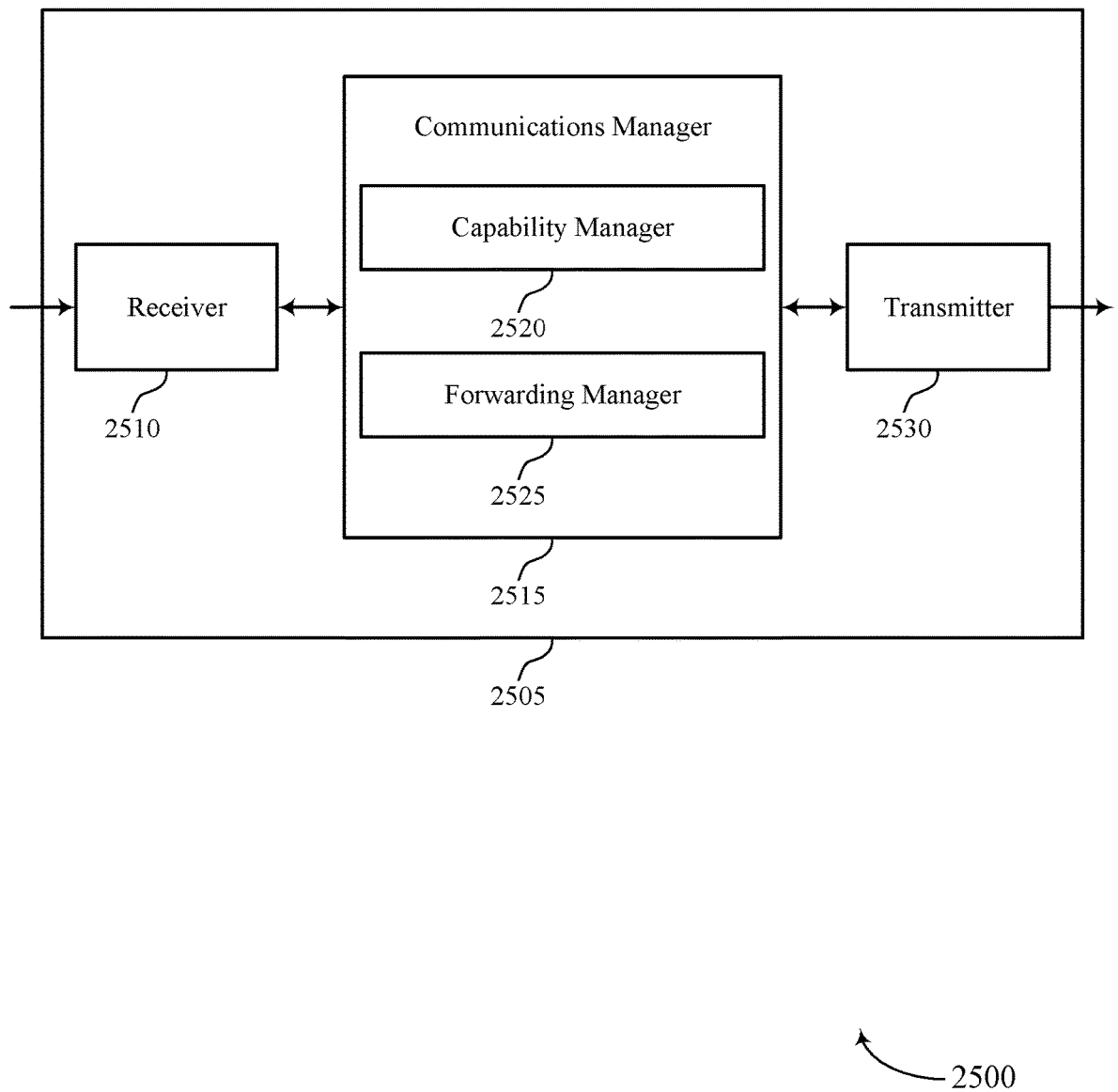

FIG. 25 shows a block diagram 2500 of a device 2505 that supports random-access procedure for low-power and simplified transceiver in accordance with one or more aspects of the present disclosure. The device 2505 may be an example of aspects of a device 2405, or a base station 105 as described herein. The device 2505 may include a receiver 2510, a communications manager 2515, and a transmitter 2530. The device 2505 may also include a processor. Each of these components may be in communication with one another (e.g., via one or more buses).

The receiver 2510 may receive information such as packets, user data, or control information associated with various information channels (e.g., control channels, data channels, and information related to random-access procedure for low-power and simplified transceiver, etc.). Information may be passed on to other components of the device 2505. The receiver 2510 may be an example of aspects of the transceiver 2720 described with reference to FIG. 27. The receiver 2510 may utilize a single antenna or a set of antennas.

The communications manager 2515 may be an example of aspects of the communications manager 2415 as described herein. The communications manager 2515 may include a capability manager 2520 and a forwarding manager 2525. The communications manager 2515 may be an example of aspects of the communications manager 2710 described herein.

The capability manager 2520 may receive, from a UE, an indication that the UE includes a reflective surface for forwarding signals from the base station to a device in a wireless network. The forwarding manager 2525 may transmit signals to the UE for forwarding to the device in the wireless network based on receiving the indication.

The transmitter 2530 may transmit signals generated by other components of the device 2505. In some examples, the transmitter 2530 may be collocated with a receiver 2510 in a transceiver module. For example, the transmitter 2530 may be an example of aspects of the transceiver 2720 described with reference to FIG. 27. The transmitter 2530 may utilize a single antenna or a set of antennas.

Figure 26:
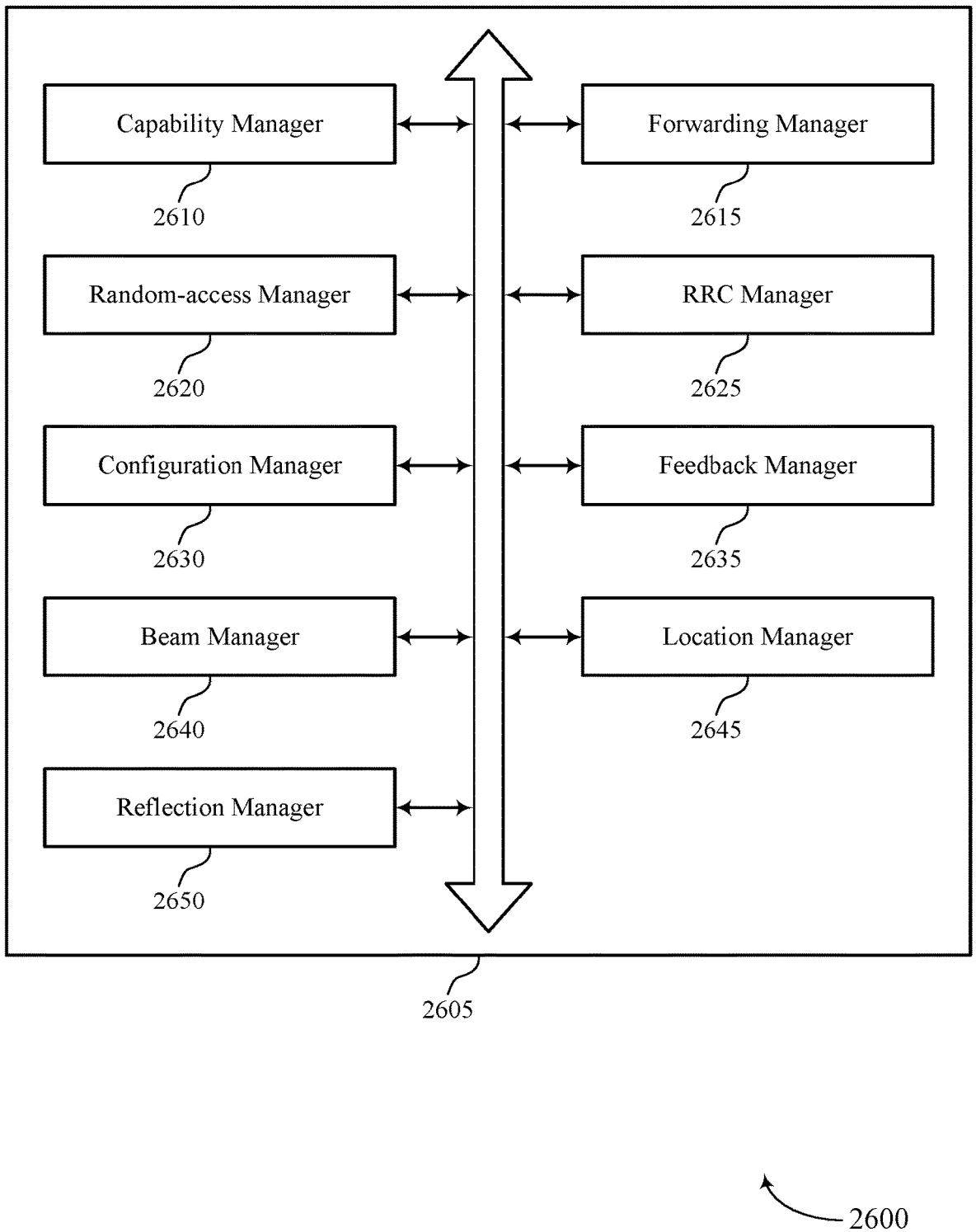
FIG. 26 shows a block diagram of a communications manager that supports a control link for a low-power and simplified transceiver in accordance with one or more aspects of the present disclosure.

FIG. 26 shows a block diagram 2600 of a communications manager 2605 that supports random-access procedure for low-power and simplified transceiver in accordance with one or more aspects of the present disclosure. The communications manager 2605 may be an example of aspects of a communications manager 2415, a communications manager 2515, or a communications manager 2710 described herein. The communications manager 2605 may include a capability manager 2610, a forwarding manager 2615, a random-access manager 2620, a RRC manager 2625, a configuration manager 2630, a feedback manager 2635, a beam manager 2640, a location manager 2645, and a reflection manager 2650. Each of these modules may communicate, directly or indirectly, with one another (e.g., via one or more buses).

The capability manager 2610 may receive, from a UE, an indication that the UE includes a reflective surface for forwarding signals from the base station to a device in a wireless network. The forwarding manager 2615 may transmit signals to the UE for forwarding to the device in the wireless network based on receiving the indication. The random-access manager 2620 may receive a random-access preamble indicating that the UE includes the reflective surface. In some examples, receiving a first random-access message in a two-step random-access procedure including the indication that the UE includes the reflective surface. In some examples, receiving a third random-access message in a four-step random-access procedure including the indication that the UE includes the reflective surface. The RRC manager 2625 may receive, after a random-access procedure, an RRC message indicating that the UE includes the reflective surface.

In some examples, the random-access manager 2620 may transmit to the UE, an indication of one or more random-access preambles reserved for indicating that the UE includes the reflective surface. In some examples, the random-access manager 2620 may receive, from the UE as part of a subsequent random-access procedure, a random-access preamble of the one or more random-access preambles indicating that the UE includes the reflective surface. The configuration manager 2630 may transmit, to the UE, a command indicating a sweep pattern, sweep direction, center frequency, bandwidth, or a combination thereof for forwarding signals from the base station to the device in the wireless network. The feedback manager 2635 may receive, from the device in the wireless network, feedback on signals forwarded by the UE from the base station to the device in the wireless network, where transmitting the command is based on the received feedback.

In some examples, the feedback manager 2635 may receive, from the device in the wireless network, feedback on signals forwarded by the UE from the base station to the device in the wireless network. In some examples, the feedback manager 2635 may transmit, to the UE, a command indicating positive or negative feedback for signals forwarded from the base station to the device in the wireless network based on receiving the feedback. In some examples, the forwarding manager 2615 may transmit, to the UE on a set of beams, a set of signals for forwarding to the device in the wireless network. In some examples, the feedback manager 2635 may receive, from the device in the wireless network, feedback on the set of signals forwarded by the UE from the base station to the device in the wireless network. The beam manager 2640 may identify a beam of the set of beams associated with a highest quality based on the received feedback. In some examples, the beam manager 2640 may select the identified beam for transmitting signals to the UE for forwarding to the device in the wireless network.

The location manager 2645 may receive an indication of a location of the UE. In some examples, the beam manager 2640 may select a beam for transmitting signals to the UE for forwarding to the device in the wireless network based on the location of the UE. In some examples, the beam manager 2640 may transmit a set of signals to the UE on a set of beams. The reflection manager 2650 may receive a reflection of the set of signals from the UE at a same angle at which the set of signals are transmitted to the UE on the set of beams. In some examples, the beam manager 2640 may identify a beam of the set of beams associated with a highest quality based on receiving the reflection. In some examples, the beam manager 2640 may select the identified beam for transmitting signals to the UE for forwarding to the device in the wireless network. In some examples, the beam manager 2640 may select a beam identified in the random-access procedure for transmitting signals to the UE for forwarding to the device in the wireless network. In some cases, the UE includes a low-power UE and the reflective surface includes an IRS.

Figure 27:
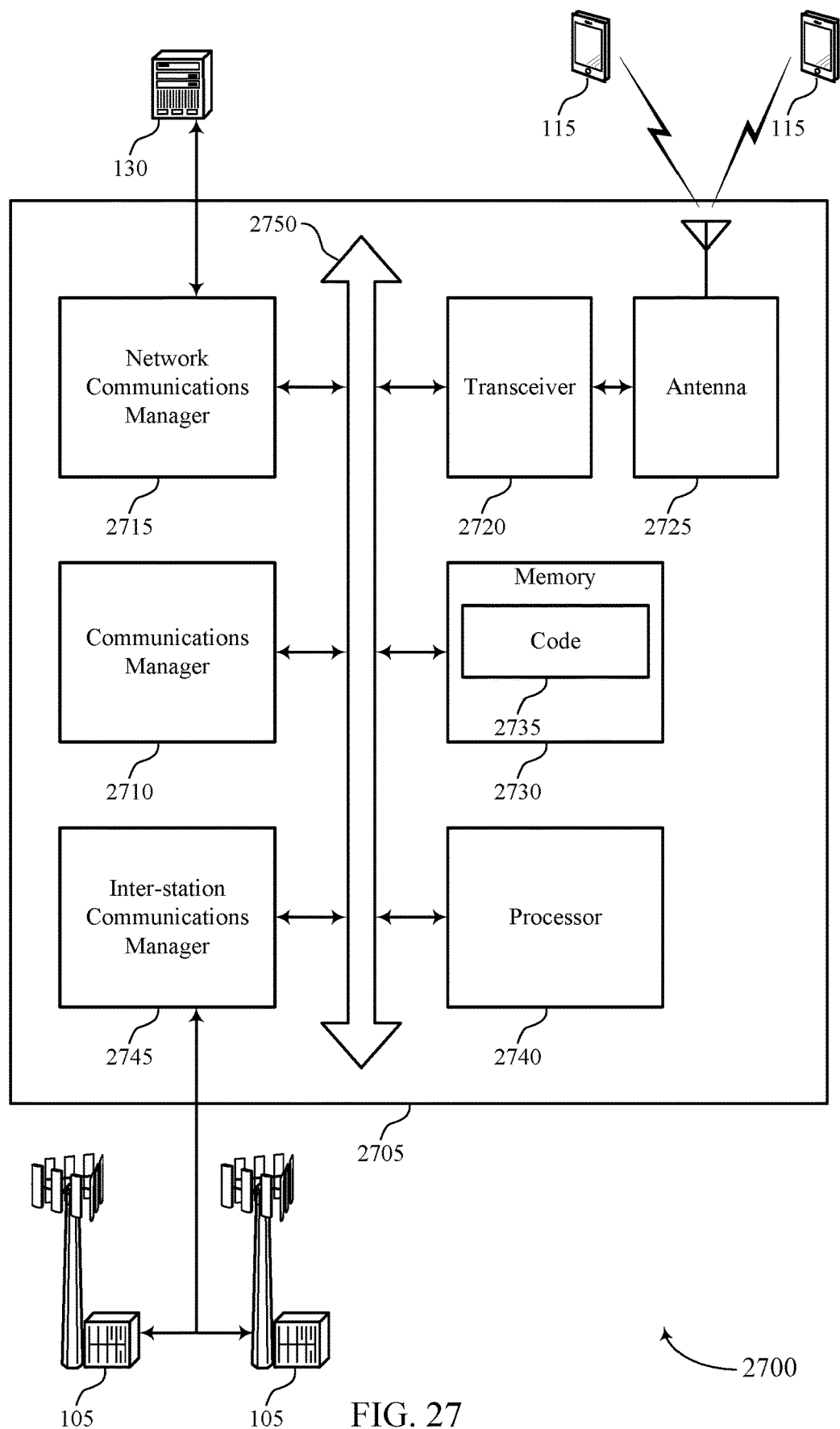
FIG. 27 shows a diagram of a system including a device that supports a control link for a low-power and simplified transceiver in accordance with one or more aspects of the present disclosure.

FIG. 27 shows a diagram of a system 2700 including a device 2705 that supports random-access procedure for low-power and simplified transceiver in accordance with one or more aspects of the present disclosure. The device 2705 may be an example of or include the components of device 2405, device 2505, or a base station 105 as described herein. The device 1505 may include components for bi-directional voice and data communications including components for transmitting and receiving communications, including a communications manager 2710, a network communications manager 2715, a transceiver 2720, an antenna 2725, memory 2730, a processor 2740, and an inter-station communications manager 2745. These components may be in electronic communication via one or more buses (e.g., bus 2750).

The communications manager 2710 may receive, from a UE, an indication that the UE includes a reflective surface for forwarding signals from the base station to a device in a wireless network and transmit signals to the UE for forwarding to the device in the wireless network based on receiving the indication.

The network communications manager 2715 may manage communications with the core network (e.g., via one or more wired backhaul links). For example, the network communications manager 2715 may manage the transfer of data communications for client devices, such as one or more UEs 115.

The transceiver 2720 may communicate bi-directionally, via one or more antennas, wired, or wireless links as described above. For example, the transceiver 2720 may represent a wireless transceiver and may communicate bi-directionally with another wireless transceiver. The transceiver 2720 may also include a modem to modulate the packets and provide the modulated packets to the antennas for transmission, and to demodulate packets received from the antennas.

In some cases, the wireless device may include a single antenna 2725. However, in some cases the device may have more than one antenna 2725, which may be capable of concurrently transmitting or receiving multiple wireless transmissions.

The memory 2730 may include RAM, ROM, or a combination thereof. The memory 2730 may store computer-readable code 2735 including instructions that, when executed by a processor (e.g., the processor 2740) cause the device to perform various functions described herein. In some cases, the memory 2730 may contain, among other things, a BIOS which may control basic hardware or software operation such as the interaction with peripheral components or devices.

The processor 2740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2740 may be configured to operate a memory array using a memory controller. In some cases, a memory controller may be integrated into processor 2740. The processor 2740 may be configured to execute computer-readable instructions stored in a memory (e.g., the memory 2730) to cause the device 2705 to perform various functions (e.g., functions or tasks supporting random-access procedure for low-power and simplified transceiver).

The inter-station communications manager 2745 may manage communications with other base station 105, and may include a controller or scheduler for controlling communications with UEs 115 in cooperation with other base stations 105. For example, the inter-station communications manager 2745 may coordinate scheduling for transmissions to UEs 115 for various interference mitigation techniques such as beamforming or joint transmission. In some examples, the inter-station communications manager 2745 may provide an X2 interface within an LTE/LTE-A wireless communication network technology to provide communication between base stations 105.

The code 2735 may include instructions to implement aspects of the present disclosure, including instructions to support wireless communications. The code 2735 may be stored in a non-transitory computer-readable medium such as system memory or other type of memory. In some cases, the code 2735 may not be directly executable by the processor 2740 but may cause a computer (e.g., when compiled and executed) to perform functions described herein.

Figure 28:
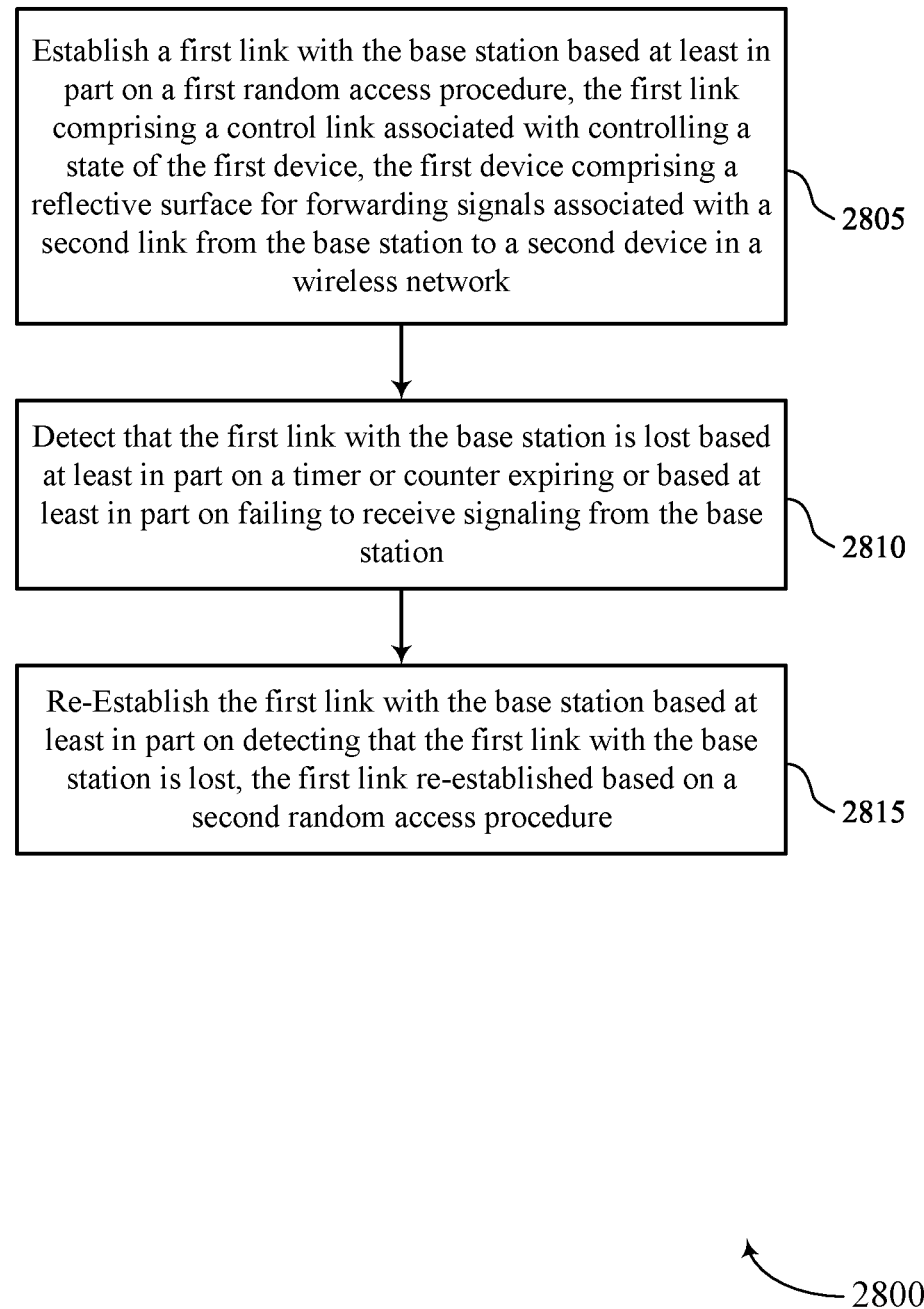
FIGS. 28 through 41 show flowcharts illustrating methods that support a control link for a low-power and simplified transceiver in accordance with one or more aspects of the present disclosure.

FIG. 28 shows a flowchart illustrating a method 2800 that supports control link for low-power and simplified transceiver in accordance with aspects of the present disclosure. The operations of the method 2800 may be implemented by a UE or its components as described herein. For example, the operations of the method 2800 may be performed by a UE 115 as described with reference to FIGS. 1 through 15 and 20 through 23. In some examples, a UE may execute a set of instructions to control the functional elements of the UE to perform the described functions. Additionally or alternatively, the UE may perform aspects of the described functions using special-purpose hardware.

At 2805, the method may include establishing a first link with the base station based on a first random access procedure, the first link including a control link associated with controlling a state of the first device, the first device including a reflective surface for forwarding signals associated with a second link from the base station to a second device in a wireless network. The operations of 2805 may be performed in accordance with examples as disclosed herein. In some examples, aspects of the operations of 2805 may be performed by control link manager 1415 as described with reference to FIG. 14.

At 2810, the method may include detecting that the first link with the base station is lost based on a timer or counter expiring or based on failing to receive signaling from the base station. The operations of 2810 may be performed in accordance with examples as disclosed herein. In some examples, aspects of the operations of 2810 may be performed by control link manager 1415 as described with reference to FIG. 14.

At 2815, the method may include re-establishing the first link with the base station based on detecting that the first link with the base station is lost, the first link re-established based on a second random access procedure. The operations of 2815 may be performed in accordance with examples as disclosed herein. In some examples, aspects of the operations of 2815 may be performed by control link manager 1415 as described with reference to FIG. 14.

Figure 29:
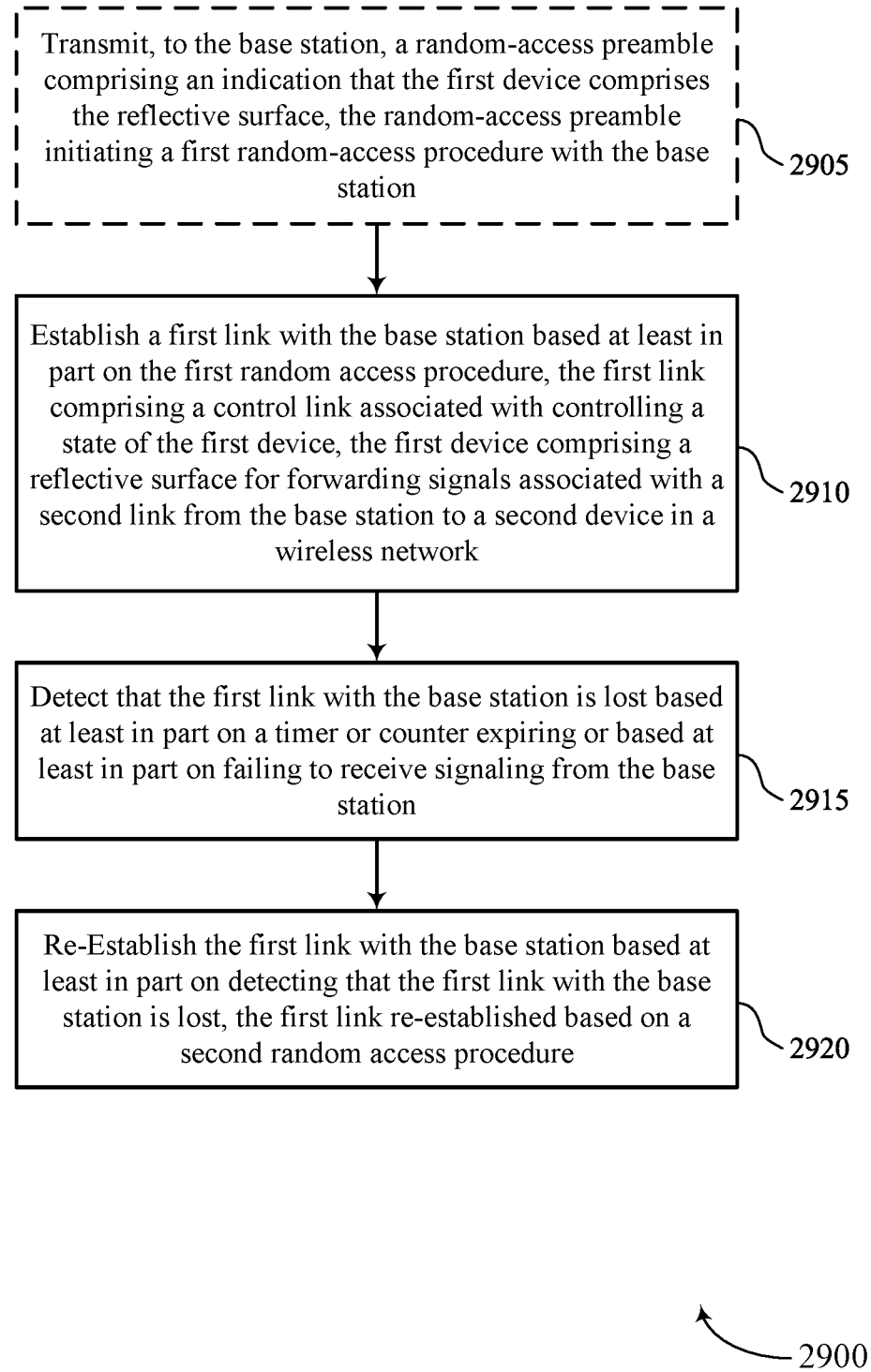

FIG. 29 shows a flowchart illustrating a method 2900 that supports control link for low-power and simplified transceiver in accordance with aspects of the present disclosure. The operations of the method 2900 may be implemented by a UE or its components as described herein. For example, the operations of the method 2900 may be performed by a UE 115 as described with reference to FIGS. 1 through 15 and 20 through 23. In some examples, a UE may execute a set of instructions to control the functional elements of the UE to perform the described functions. Additionally or alternatively, the UE may perform aspects of the described functions using special-purpose hardware.

At 2905, the method may include transmitting, to the base station, a random-access preamble including an indication that the first device includes the reflective surface, the random-access preamble initiating a first random-access procedure with the base station. The operations of 2905 may be performed in accordance with examples as disclosed herein. In some examples, aspects of the operations of 2905 may be performed by control link manager 1415 as described with reference to FIG. 14.

At 2910, the method may include establishing a first link with the base station based on the first random access procedure, the first link including a control link associated with controlling a state of the first device, the first device including a reflective surface for forwarding signals associated with a second link from the base station to a second device in a wireless network. The operations of 2910 may be performed in accordance with examples as disclosed herein. In some examples, aspects of the operations of 2910 may be performed by control link manager 1415 as described with reference to FIG. 14.

At 2915, the method may include detecting that the first link with the base station is lost based on a timer or counter expiring or based on failing to receive signaling from the base station. The operations of 2915 may be performed in accordance with examples as disclosed herein. In some examples, aspects of the operations of 2915 may be performed by control link manager 1415 as described with reference to FIG. 14.

At 2920, the method may include re-establishing the first link with the base station based on detecting that the first link with the base station is lost, the first link re-established based on a second random access procedure. The operations of 2920 may be performed in accordance with examples as disclosed herein. In some examples, aspects of the operations of 2920 may be performed by control link manager 1415 as described with reference to FIG. 14.

Figure 30:
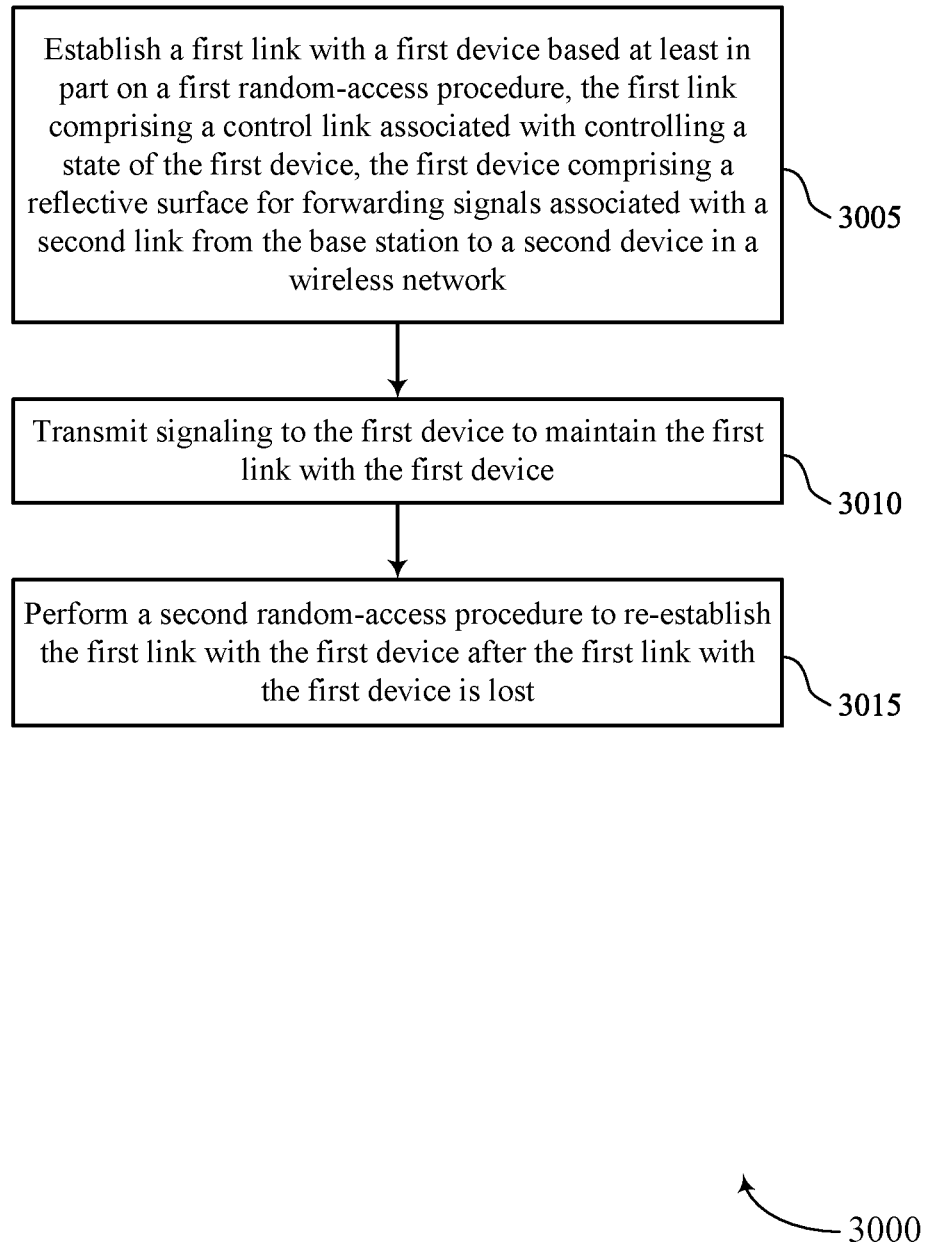

FIG. 30 shows a flowchart illustrating a method 3000 that supports control link for low-power and simplified transceiver in accordance with aspects of the present disclosure. The operations of the method 3000 may be implemented by a base station or its components as described herein. For example, the operations of the method 3000 may be performed by a base station 105 as described with reference to FIGS. 1 through 11, 16 through 19, and 24 through 27. In some examples, a base station may execute a set of instructions to control the functional elements of the base station to perform the described functions. Additionally or alternatively, the base station may perform aspects of the described functions using special-purpose hardware.

At 3005, the method may include establishing a first link with a first device based on a first random-access procedure, the first link including a control link associated with controlling a state of the first device, the first device including a reflective surface for forwarding signals associated with a second link from the base station to a second device in a wireless network. The operations of 3005 may be performed in accordance with examples as disclosed herein. In some examples, aspects of the operations of 3005 may be performed by control link manager 1815 as described with reference to FIG. 18.

At 3010, the method may include transmitting signaling to the first device to maintain the first link with the first device. The operations of 3010 may be performed in accordance with examples as disclosed herein. In some examples, aspects of the operations of 3010 may be performed by control link manager 1815 as described with reference to FIG. 18.

At 3015, the method may include performing a second random-access procedure to re-establish the first link with the first device after the first link with the first device is lost. The operations of 3015 may be performed in accordance with examples as disclosed herein. In some examples, aspects of the operations of 3015 may be performed by control link manager 1815 as described with reference to FIG. 18.

Figure 31:
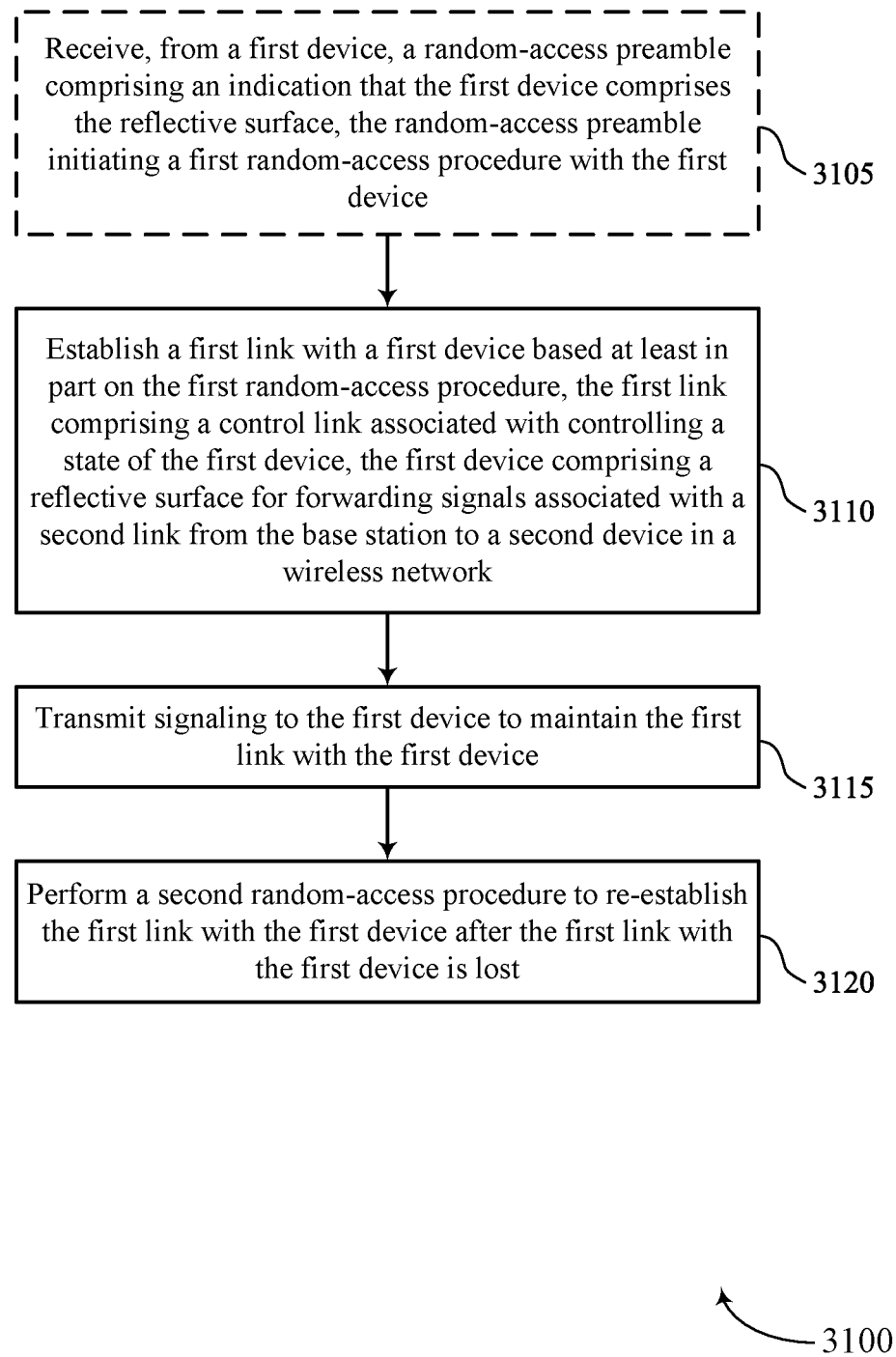

FIG. 31 shows a flowchart illustrating a method 3100 that supports control link for low-power and simplified transceiver in accordance with aspects of the present disclosure. The operations of the method 3100 may be implemented by a base station or its components as described herein. For example, the operations of the method 3100 may be performed by a base station 105 as described with reference to FIGS. 1 through 11, 16 through 19, and 24 through 27. In some examples, a base station may execute a set of instructions to control the functional elements of the base station to perform the described functions. Additionally or alternatively, the base station may perform aspects of the described functions using special-purpose hardware.

At 3105, the method may include receiving, from a first device, a random-access preamble including an indication that the first device includes the reflective surface, the random-access preamble initiating a first random-access procedure with the first device. The operations of 3105 may be performed in accordance with examples as disclosed herein. In some examples, aspects of the operations of 3105 may be performed by control link manager 1815 as described with reference to FIG. 18.

At 3110, the method may include establishing a first link with a first device based on the first random-access procedure, the first link including a control link associated with controlling a state of the first device, the first device including a reflective surface for forwarding signals associated with a second link from the base station to a second device in a wireless network. The operations of 3110 may be performed in accordance with examples as disclosed herein. In some examples, aspects of the operations of 3110 may be performed by control link manager 1815 as described with reference to FIG. 18.

At 3115, the method may include transmitting signaling to the first device to maintain the first link with the first device. The operations of 3115 may be performed in accordance with examples as disclosed herein. In some examples, aspects of the operations of 3115 may be performed by control link manager 1815 as described with reference to FIG. 18.

At 3120, the method may include performing a second random-access procedure to re-establish the first link with the first device after the first link with the first device is lost. The operations of 3120 may be performed in accordance with examples as disclosed herein. In some examples, aspects of the operations of 3120 may be performed by control link manager 1815 as described with reference to FIG. 18.

Figure 32:
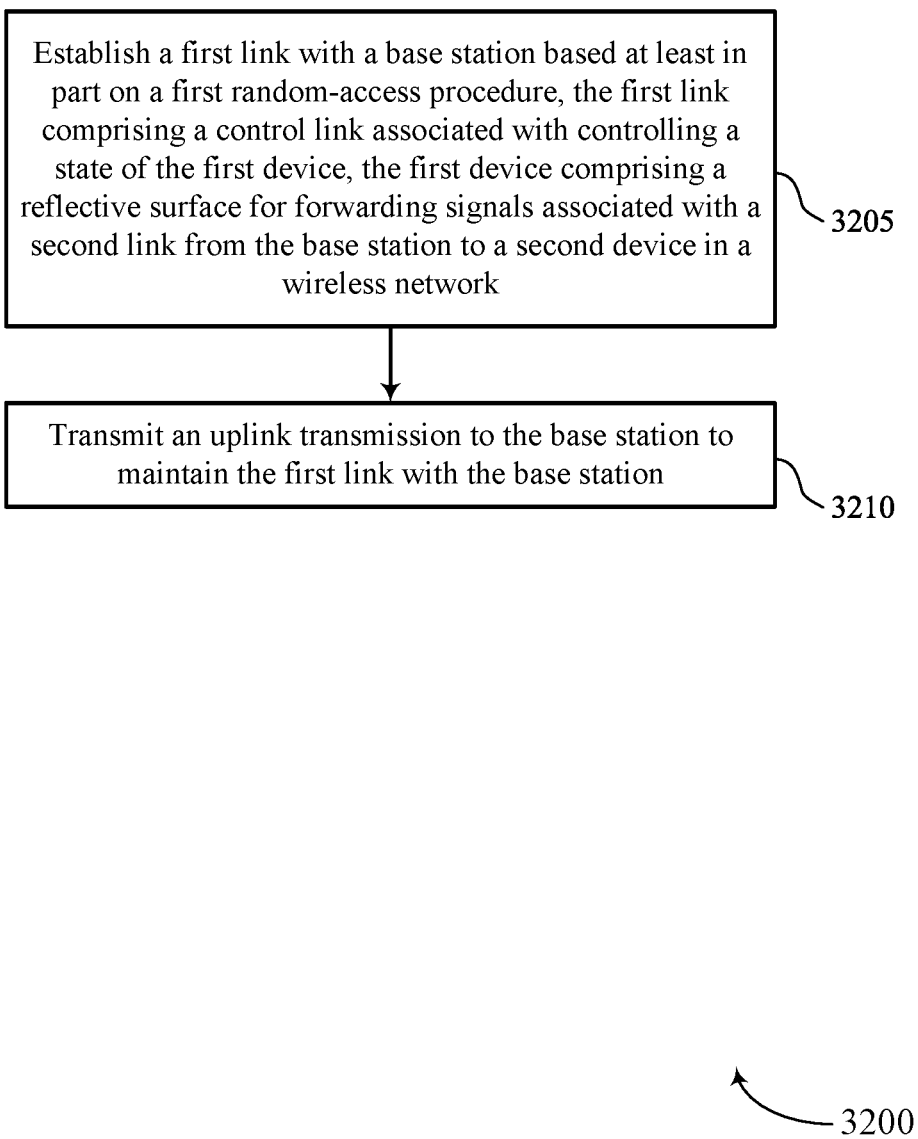

FIG. 32 shows a flowchart illustrating a method 3200 that supports control link for low-power and simplified transceiver in accordance with aspects of the present disclosure. The operations of the method 3200 may be implemented by a UE or its components as described herein. For example, the operations of the method 3200 may be performed by a UE 115 as described with reference to FIGS. 1 through 15 and 20 through 23. In some examples, a UE may execute a set of instructions to control the functional elements of the UE to perform the described functions. Additionally or alternatively, the UE may perform aspects of the described functions using special-purpose hardware.

At 3205, the method may include establishing a first link with a base station based on a first random-access procedure, the first link including a control link associated with controlling a state of the first device, the first device including a reflective surface for forwarding signals associated with a second link from the base station to a second device in a wireless network. The operations of 3205 may be performed in accordance with examples as disclosed herein. In some examples, aspects of the operations of 3205 may be performed by control link manager 1415 as described with reference to FIG. 14.

At 3210, the method may include transmitting an uplink transmission to the base station to maintain the first link with the base station. The operations of 3210 may be performed in accordance with examples as disclosed herein. In some examples, aspects of the operations of 3210 may be performed by control link manager 1415 as described with reference to FIG. 14.

Figure 33:
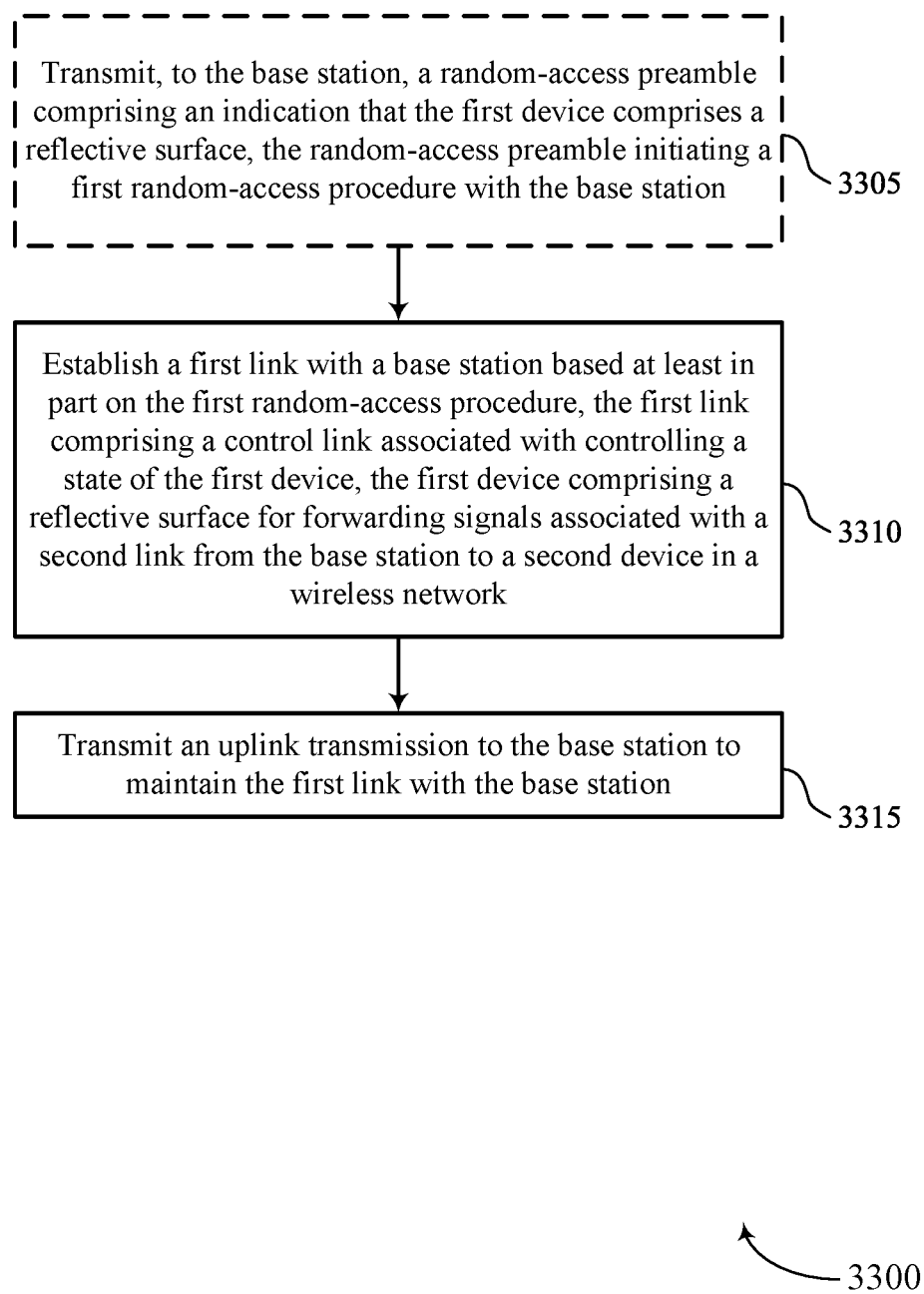

FIG. 33 shows a flowchart illustrating a method 3300 that supports control link for low-power and simplified transceiver in accordance with aspects of the present disclosure. The operations of the method 3300 may be implemented by a UE or its components as described herein. For example, the operations of the method 3300 may be performed by a UE 115 as described with reference to FIGS. 1 through 15 and 20 through 23. In some examples, a UE may execute a set of instructions to control the functional elements of the UE to perform the described functions. Additionally or alternatively, the UE may perform aspects of the described functions using special-purpose hardware.

At 3305, the method may include transmitting, to the base station, a random-access preamble including an indication that the first device includes a reflective surface, the random-access preamble initiating a first random-access procedure with the base station. The operations of 3305 may be performed in accordance with examples as disclosed herein. In some examples, aspects of the operations of 3305 may be performed by control link manager 1415 as described with reference to FIG. 14.

At 3310, the method may include establishing a first link with a base station based on the first random-access procedure, the first link including a control link associated with controlling a state of the first device, the first device including a reflective surface for forwarding signals associated with a second link from the base station to a second device in a wireless network. The operations of 3310 may be performed in accordance with examples as disclosed herein. In some examples, aspects of the operations of 3310 may be performed by control link manager 1415 as described with reference to FIG. 14.

At 3315, the method may include transmitting an uplink transmission to the base station to maintain the first link with the base station. The operations of 3315 may be performed in accordance with examples as disclosed herein. In some examples, aspects of the operations of 3315 may be performed by control link manager 1415 as described with reference to FIG. 14.

Figure 34:
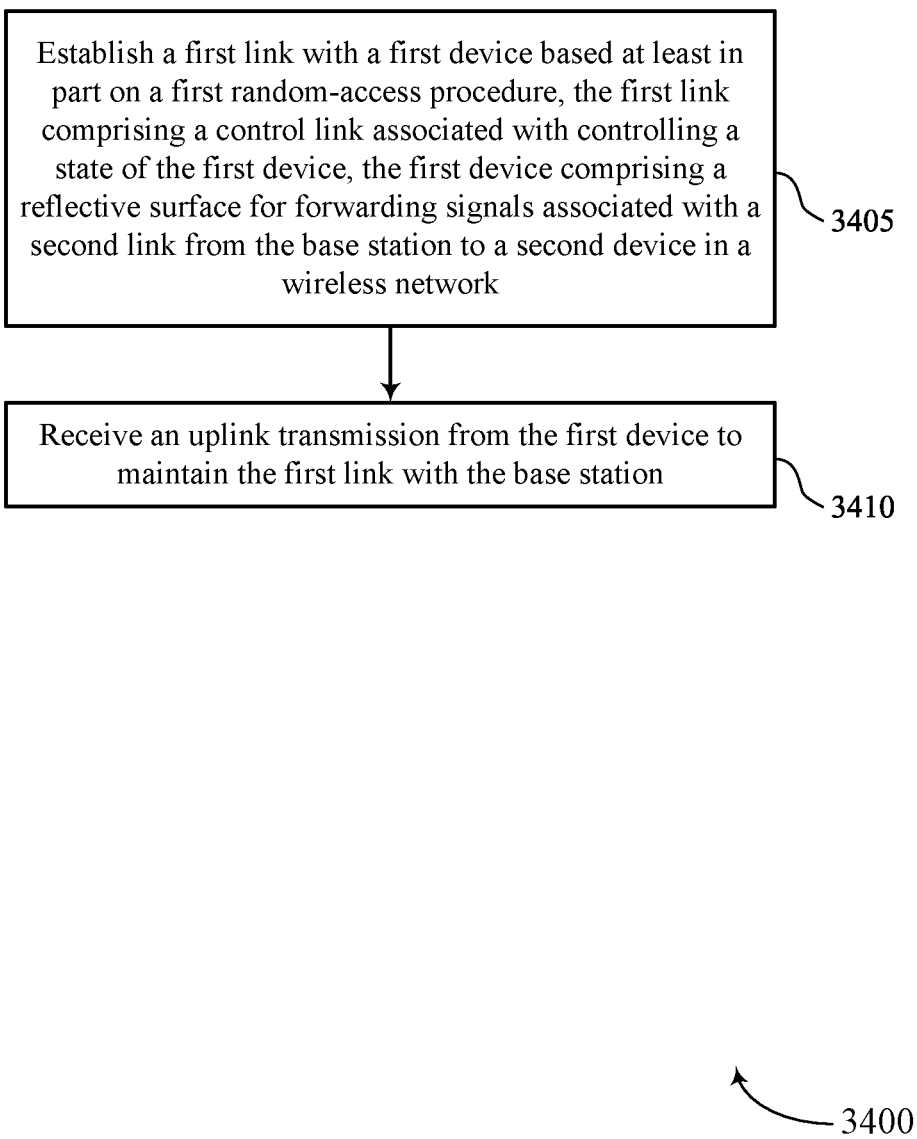

FIG. 34 shows a flowchart illustrating a method 3400 that supports control link for low-power and simplified transceiver in accordance with aspects of the present disclosure. The operations of the method 3400 may be implemented by a base station or its components as described herein. For example, the operations of the method 3400 may be performed by a base station 105 as described with reference to FIGS. 1 through 11, 16 through 19, and 24 through 27. In some examples, a base station may execute a set of instructions to control the functional elements of the base station to perform the described functions. Additionally or alternatively, the base station may perform aspects of the described functions using special-purpose hardware.

At 3405, the method may include establishing a first link with a first device based on a first random-access procedure, the first link including a control link associated with controlling a state of the first device, the first device including a reflective surface for forwarding signals associated with a second link from the base station to a second device in a wireless network. The operations of 3405 may be performed in accordance with examples as disclosed herein. In some examples, aspects of the operations of 3405 may be performed by control link manager 1815 as described with reference to FIG. 18.

At 3410, the method may include receiving an uplink transmission from the first device to maintain the first link with the base station. The operations of 3410 may be performed in accordance with examples as disclosed herein. In some examples, aspects of the operations of 3410 may be performed by control link manager 1815 as described with reference to FIG. 18.

Figure 35:
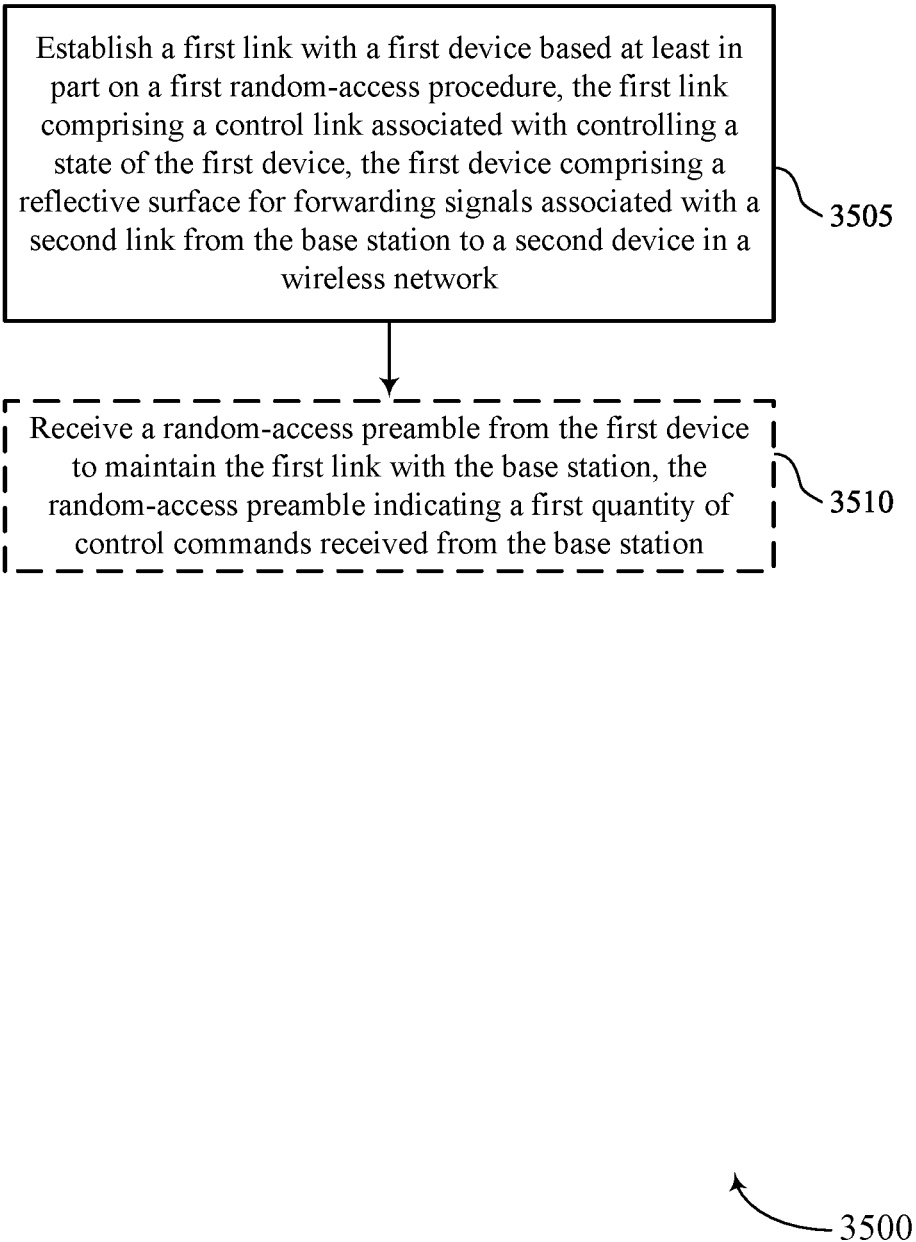

FIG. 35 shows a flowchart illustrating a method 3500 that supports control link for low-power and simplified transceiver in accordance with aspects of the present disclosure. The operations of the method 3500 may be implemented by a base station or its components as described herein. For example, the operations of the method 3500 may be performed by a base station 105 as described with reference to FIGS. 1 through 11, 16 through 19, and 24 through 27. In some examples, a base station may execute a set of instructions to control the functional elements of the base station to perform the described functions. Additionally or alternatively, the base station may perform aspects of the described functions using special-purpose hardware.

At 3505, the method may include establishing a first link with a first device based on a first random-access procedure, the first link including a control link associated with controlling a state of the first device, the first device including a reflective surface for forwarding signals associated with a second link from the base station to a second device in a wireless network. The operations of 3505 may be performed in accordance with examples as disclosed herein. In some examples, aspects of the operations of 3505 may be performed by control link manager 1815 as described with reference to FIG. 18.

At 3510, the method may include receiving a random-access preamble from the first device to maintain the first link with the base station, the random access preamble indicating a first quantity of control commands received from the base station The operations of 3510 may be performed in accordance with examples as disclosed herein. In some examples, aspects of the operations of 3510 may be performed by control link manager 1815 as described with reference to FIG. 18.

Figure 36:
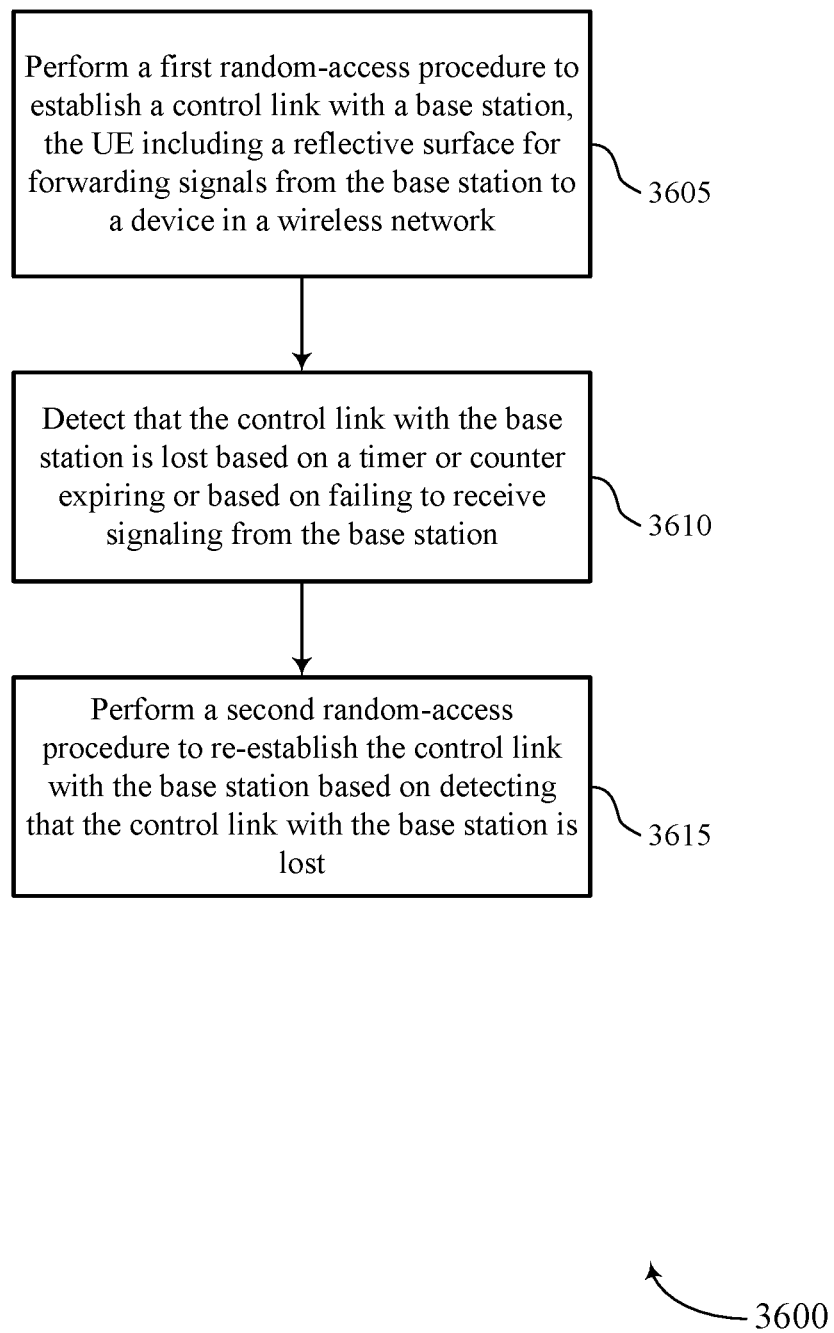

FIG. 36 shows a flowchart illustrating a method 3600 that supports control link for low-power and simplified transceiver in accordance with one or more aspects of the present disclosure. The operations of method 3600 may be implemented by a UE 115 or its components as described herein. For example, the operations of method 3600 may be performed by a communications manager as described with reference to FIGS. 12 through 15. In some examples, a UE may execute a set of instructions to control the functional elements of the UE to perform the functions described below. Additionally, or alternatively, a UE may perform aspects of the functions described below using special-purpose hardware.

At 3605, the UE may perform a first random-access procedure to establish a control link with a base station, the UE including a reflective surface for forwarding signals from the base station to a device in a wireless network. The operations of 3605 may be performed according to the methods described herein. In some examples, aspects of the operations of 3605 may be performed by a random-access manager as described with reference to FIGS. 12 through 15.

At 3610, the UE may detect that the control link with the base station is lost based on a timer or counter expiring or based on failing to receive signaling from the base station. The operations of 3610 may be performed according to the methods described herein. In some examples, aspects of the operations of 3610 may be performed by a control link manager as described with reference to FIGS. 12 through 15.

At 3615, the UE may perform a second random-access procedure to re-establish the control link with the base station based on detecting that the control link with the base station is lost. The operations of 3615 may be performed according to the methods described herein. In some examples, aspects of the operations of 3615 may be performed by a random-access manager as described with reference to FIGS. 12 through 15.

Figure 37:
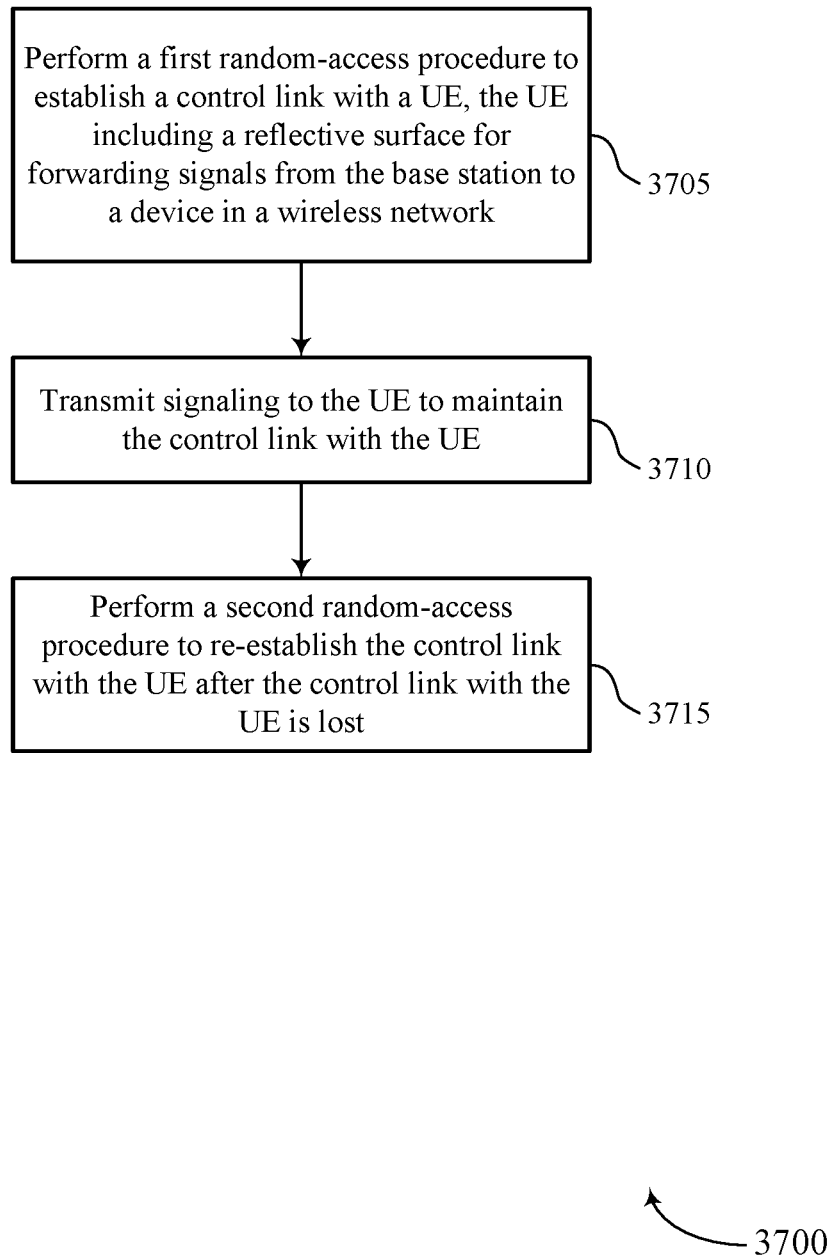

FIG. 37 shows a flowchart illustrating a method 3700 that supports control link for low-power and simplified transceiver in accordance with one or more aspects of the present disclosure. The operations of method 3700 may be implemented by a base station 105 or its components as described herein. For example, the operations of method 3700 may be performed by a communications manager as described with reference to FIGS. 16 through 19. In some examples, a base station may execute a set of instructions to control the functional elements of the base station to perform the functions described below. Additionally, or alternatively, a base station may perform aspects of the functions described below using special-purpose hardware.

At 3705, the base station may perform a first random-access procedure to establish a control link with a UE, the UE including a reflective surface for forwarding signals from the base station to a device in a wireless network. The operations of 3705 may be performed according to the methods described herein. In some examples, aspects of the operations of 3705 may be performed by a random-access manager as described with reference to FIGS. 16 through 19.

At 3710, the base station may transmit signaling to the UE to maintain the control link with the UE. The operations of 3710 may be performed according to the methods described herein. In some examples, aspects of the operations of 3710 may be performed by a control link manager as described with reference to FIGS. 16 through 19.

At 3715, the base station may perform a second random-access procedure to re-establish the control link with the UE after the control link with the UE is lost. The operations of 3715 may be performed according to the methods described herein. In some examples, aspects of the operations of 3715 may be performed by a random-access manager as described with reference to FIGS. 16 through 19.

Figure 38:
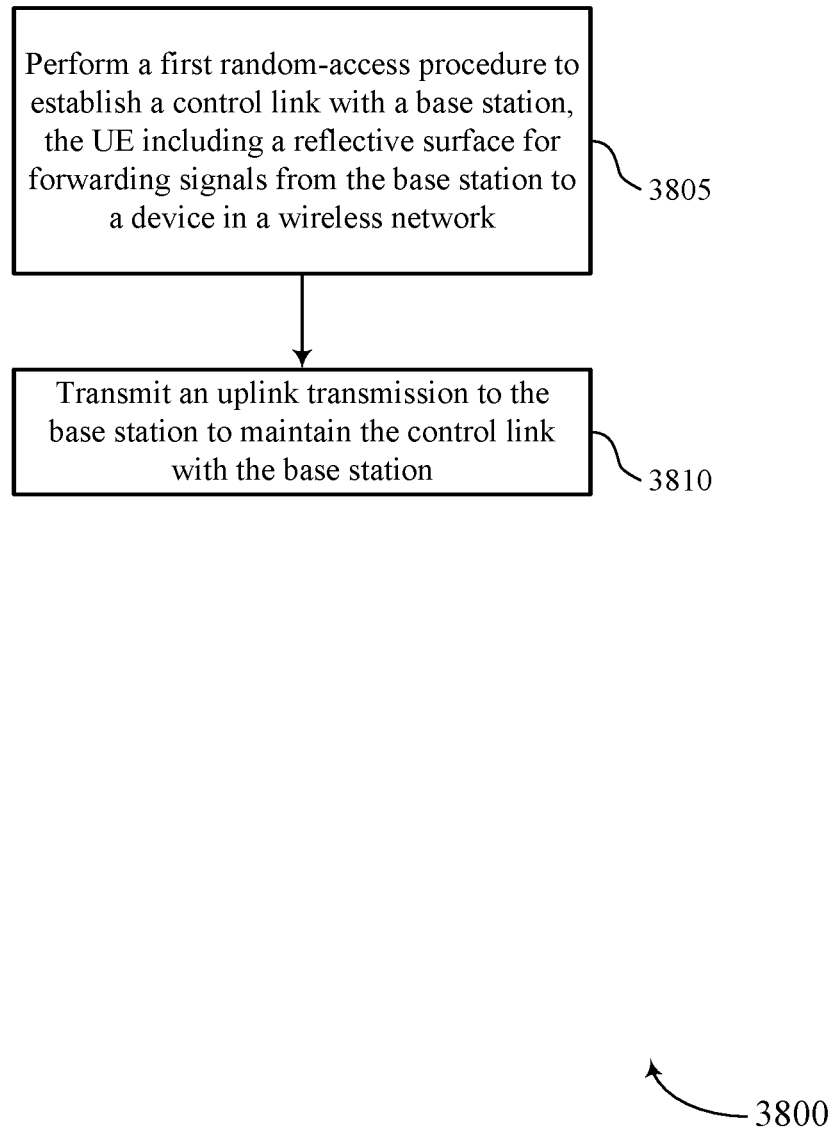

FIG. 38 shows a flowchart illustrating a method 3800 that supports control link for low-power and simplified transceiver in accordance with one or more aspects of the present disclosure. The operations of method 3800 may be implemented by a UE 115 or its components as described herein. For example, the operations of method 3800 may be performed by a communications manager as described with reference to FIGS. 12 through 15. In some examples, a UE may execute a set of instructions to control the functional elements of the UE to perform the functions described below. Additionally, or alternatively, a UE may perform aspects of the functions described below using special-purpose hardware.

At 3805, the UE may perform a first random-access procedure to establish a control link with a base station, the UE including a reflective surface for forwarding signals from the base station to a device in a wireless network. The operations of 3805 may be performed according to the methods described herein. In some examples, aspects of the operations of 3805 may be performed by a random-access manager as described with reference to FIGS. 12 through 15.

At 3810, the UE may transmit an uplink transmission to the base station to maintain the control link with the base station. The operations of 3810 may be performed according to the methods described herein. In some examples, aspects of the operations of 3810 may be performed by a control link manager as described with reference to FIGS. 12 through 15.

Figure 39:
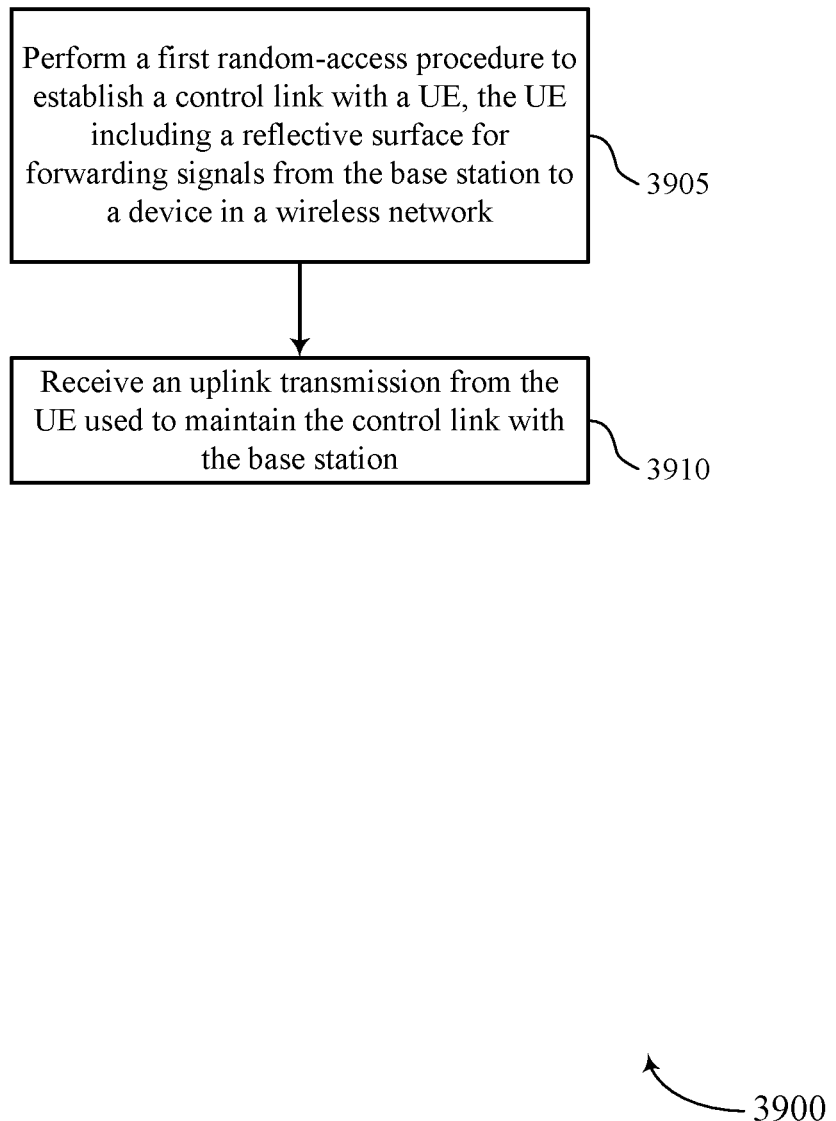

FIG. 39 shows a flowchart illustrating a method 3900 that supports control link for low-power and simplified transceiver in accordance with one or more aspects of the present disclosure. The operations of method 3900 may be implemented by a base station 105 or its components as described herein. For example, the operations of method 3900 may be performed by a communications manager as described with reference to FIGS. 16 through 19. In some examples, a base station may execute a set of instructions to control the functional elements of the base station to perform the functions described below. Additionally, or alternatively, a base station may perform aspects of the functions described below using special-purpose hardware.

At 3905, the base station may perform a first random-access procedure to establish a control link with a UE, the UE including a reflective surface for forwarding signals from the base station to a device in a wireless network. The operations of 3905 may be performed according to the methods described herein. In some examples, aspects of the operations of 3905 may be performed by a random-access manager as described with reference to FIGS. 16 through 19.

At 3910, the base station may receive an uplink transmission from the UE to maintain the control link with the base station. The operations of 3910 may be performed according to the methods described herein. In some examples, aspects of the operations of 3910 may be performed by a control link manager as described with reference to FIGS. 16 through 19.

Figure 40:
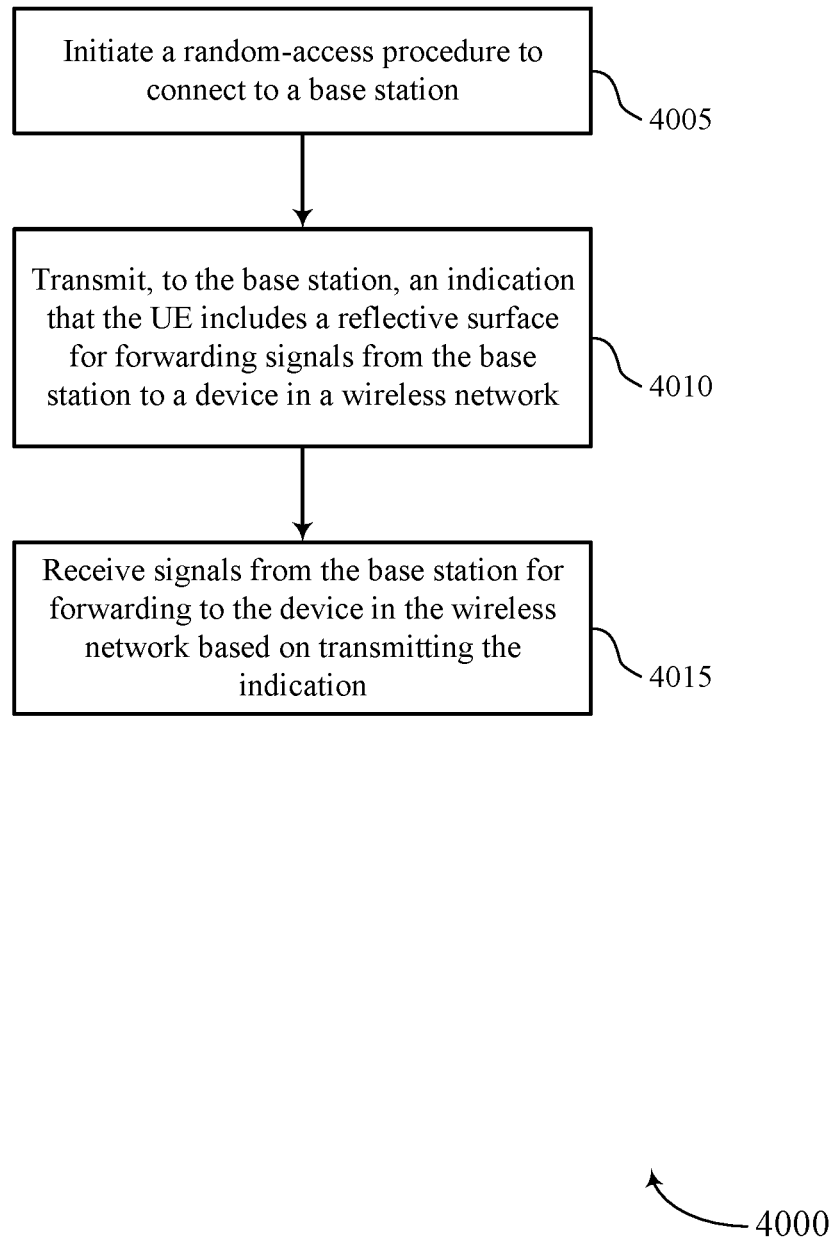

FIG. 40 shows a flowchart illustrating a method 4000 that supports random-access procedure for low-power and simplified transceiver in accordance with one or more aspects of the present disclosure. The operations of method 4000 may be implemented by a UE 115 or its components as described herein. For example, the operations of method 4000 may be performed by a communications manager as described with reference to FIGS. 20 through 23. In some examples, a UE may execute a set of instructions to control the functional elements of the UE to perform the functions described below. Additionally, or alternatively, a UE may perform aspects of the functions described below using special-purpose hardware.

At 4005, the UE may initiate a random-access procedure to connect to a base station. The operations of 4005 may be performed according to the methods described herein. In some examples, aspects of the operations of 4005 may be performed by a random-access manager as described with reference to FIGS. 20 through 23.

At 4010, the UE may transmit, to the base station, an indication that the UE includes a reflective surface for forwarding signals from the base station to a device in a wireless network. The operations of 4010 may be performed according to the methods described herein. In some examples, aspects of the operations of 4010 may be performed by a capability manager as described with reference to FIGS. 20 through 23.

At 4015, the UE may receive signals from the base station for forwarding to the device in the wireless network based on transmitting the indication. The operations of 4015 may be performed according to the methods described herein. In some examples, aspects of the operations of 4015 may be performed by a forwarding manager as described with reference to FIGS. 20 through 23.

Figure 41:
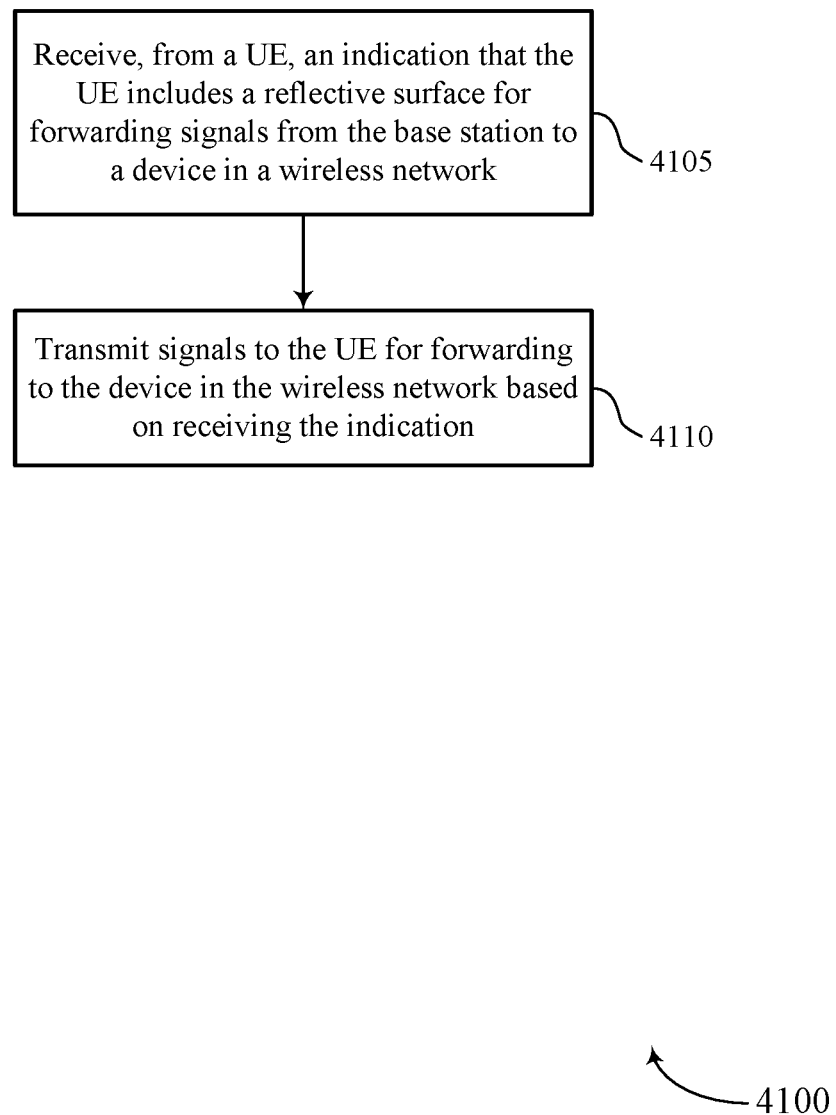

FIG. 41 shows a flowchart illustrating a method 4100 that supports random-access procedure for low-power and simplified transceiver in accordance with one or more aspects of the present disclosure. The operations of method 4100 may be implemented by a base station 105 or its components as described herein. For example, the operations of method 4100 may be performed by a communications manager as described with reference to FIGS. 24 through 27. In some examples, a base station may execute a set of instructions to control the functional elements of the base station to perform the functions described below. Additionally, or alternatively, a base station may perform aspects of the functions described below using special-purpose hardware.

At 4105, the base station may receive, from a UE, an indication that the UE includes a reflective surface for forwarding signals from the base station to a device in a wireless network. The operations of 4105 may be performed according to the methods described herein. In some examples, aspects of the operations of 4105 may be performed by a capability manager as described with reference to FIGS. 24 through 27.

At 4110, the base station may transmit signals to the UE for forwarding to the device in the wireless network based on receiving the indication. The operations of 4110 may be performed according to the methods described herein. In some examples, aspects of the operations of 4110 may be performed by a forwarding manager as described with reference to FIGS. 24 through 27.

The following provides an overview of aspects of the present disclosure:

Aspect 1: A method for wireless communication at a first device, comprising: establishing a first link with the base station based at least in part on a first random access procedure, the first link comprising a control link associated with controlling a state of the first device, the first device comprising a reflective surface for forwarding signals associated with a second link from the base station to a second device in a wireless network; detecting that the first link with the base station is lost based at least in part on a timer or counter expiring or based at least in part on failing to receive signaling from the base station; and re-establishing the first link with the base station based at least in part on detecting that the first link with the base station is lost, the first link re-established based on a second random access procedure.

Aspect 2: The method of aspect 1, further comprising: failing to receive one or more periodic indicators in a control channel, wherein detecting that the first link with the base station is lost is based at least in part on failing to receive the one or more periodic indicators in the control channel.

Aspect 3: The method of aspect 2, further comprising: incrementing a counter after failing to receive each of the one or more periodic indicators in the control channel, wherein detecting that the first link with the base station is lost is based at least in part on the counter exceeding a threshold.

Aspect 4: The method of aspect 2, further comprising: decrementing a counter after failing to receive each of the one or more periodic indicators in the control channel, wherein detecting that the first link with the base station is lost is based at least in part on the counter reaching zero.

Aspect 5: The method of any of aspects 1 through 4, further comprising: identifying that the first link with the base station is valid for a duration of the timer, wherein detecting that the first link with the base station is lost is based at least in part on the timer expiring.

Aspect 6: The method of any of aspects 1 through 5, further comprising: failing to detect energy from the base station for a duration of the timer, wherein detecting that the first link with the base station is lost is based at least in part on failing to detect the energy from the base station for the duration of the timer.

Aspect 7: The method of aspect 6, further comprising: restarting the timer after detecting energy from the base station.

Aspect 8: The method of any of aspects 1 through 7, wherein performing the second random-access procedure comprises: performing a contention-free random-access procedure using a cell radio network temporary identifier (C-RNTI) to re-establish the first link with the base station.

Aspect 9: The method of any of aspects 1 through 8, further comprising: transmitting, to the base station, a random-access preamble comprising an indication that the first device comprises the reflective surface, the random-access preamble initiating the first random-access procedure with the base station.

Aspect 10: The method of aspect 9, further comprising: identifying the random-access preamble from one or more random-access preambles reserved for indicating that the first device comprises the reflective surface.

Aspect 11: The method of any of aspects 1 through 10, wherein the first device comprises a UE; and the second device comprises a UE; or the second device comprises a base station.

Aspect 12: A method for wireless communication at a base station, comprising: establishing a first link with a first device based at least in part on a first random-access procedure, the first link comprising a control link associated with controlling a state of the first device, the first device comprising a reflective surface for forwarding signals associated with a second link from the base station to a second device in a wireless network transmitting signaling to the first device to maintain the first link with the first device; and performing a second random-access procedure to re-establish the first link with the first device after the first link with the first device is lost.

Aspect 13: The method of aspect 12, wherein transmitting signaling to the first device to maintain the first link with the first device comprises: transmitting one or more periodic indicators in a control channel to the base station, wherein the first link with the first device is lost when the first device fails to receive a threshold number of the one or more periodic indicators.

Aspect 14: The method of any of aspects 12 through 13, further comprising: receiving, from a first device, a random-access preamble comprising an indication that the first device comprises the reflective surface, the random-access preamble initiating the first random-access procedure with the first device.

Aspect 15: The method of any of aspects 12 through 14, wherein performing the second random-access procedure comprises: performing a contention-free random-access procedure using a cell radio network temporary identifier (C-RNTI) to re-establish the first link with the UE.

Aspect 16: A method for wireless communication at a first device, comprising: establishing a first link with a base station based at least in part on a first random-access procedure, the first link comprising a control link associated with controlling a state of the first device, the first device comprising a reflective surface for forwarding signals associated with a second link from the base station to a second device in a wireless network; and transmitting an uplink transmission to the base station to maintain the first link with the base station.

Aspect 17: The method of aspect 16, wherein the uplink transmission comprises a scheduling request.

Aspect 18: The method of any of aspects 16 through 17, wherein the uplink transmission comprises a periodic uplink transmission.

Aspect 19: The method of any of aspects 16 through 18, further comprising: receiving a request for the uplink transmission from the base device in response to a downlink transmission; and receiving the downlink transmission from the base station, wherein the uplink transmission is received in response to the downlink transmission.

Aspect 20: The method of any of aspects 16 through 19, wherein transmitting the uplink transmission to the base station comprises: transmitting a random-access preamble indicating a quantity of control commands received from the base station.

Aspect 21: The method of any of aspects 16 through 20, further comprising: transmitting, to the base station, a random-access preamble comprising an indication that the first device comprises a reflective surface, the random-access preamble initiating the first random-access procedure with the base station.

Aspect 22: The method of aspect 21, further comprising: identifying the random-access preamble from one or more random-access preambles reserved for indicating that the first device comprises the reflective surface.

Aspect 23: The method of any of aspects 16 through 22, wherein the first device comprises a UE; and the second device comprises a UE; or the second device comprises a base station.

Aspect 24: A method for wireless communication at a base station, comprising: establishing a first link with a first device based at least in part on a first random-access procedure, the first link comprising a control link associated with controlling a state of the first device, the first device comprising a reflective surface for forwarding signals associated with a second link from the base station to a second device in a wireless network; and receiving an uplink transmission from the first device to maintain the first link with the base station.

Aspect 25: The method of aspect 24, further comprising: failing to receive one or more uplink transmissions from the first device; detecting that the first link with the first device is lost based at least in part on failing to receive the one or more uplink transmissions from the first device; and avoiding transmitting downlink signals to the first device for forwarding to the device in the wireless network until the first device performs a second random-access procedure to re-establish the first link with the base station.

Aspect 26: The method of any of aspects 24 through 25, wherein the uplink transmission comprises a scheduling request.

Aspect 27: The method of any of aspects 24 through 26, wherein the uplink transmission comprises a periodic uplink transmission.

Aspect 28: The method of any of aspects 24 through 27, further comprising: transmitting a request for the uplink transmission from the first device in response to a downlink transmission; and transmitting the downlink transmission to the first device, wherein the uplink transmission is received in response to the downlink transmission.

Aspect 29: The method of any of aspects 24 through 28, wherein receiving the uplink transmission from the first device comprises: receiving a random-access preamble indicating a first quantity of control commands received from the base station.

Aspect 30: The method of aspect 29, further comprising: determining that a second quantity of control commands transmitted by the base station exceeds the first quantity of control commands received by the first device by a threshold amount; detecting that the first link with the first device is lost based at least in part on the determining; and avoiding transmitting downlink signals to the first device for forwarding to the device in the wireless network until the first device performs a second random-access procedure to re-establish the first link with the base station.

Aspect 31: An apparatus for wireless communication comprising a processor and memory coupled to the processor. The processor and memory may be configured to cause the apparatus to perform a method of any of aspects 1 through 11.

Aspect 32: An apparatus for wireless communication at a first device, comprising at least one means for performing a method of any of aspects 1 through 11.

Aspect 33: A non-transitory computer-readable medium storing code for wireless communication at a first device, the code comprising instructions executable by a processor to perform a method of any of aspects 1 through 11.

Aspect 34: An apparatus for wireless communication comprising a processor and memory coupled to the processor. The processor and memory may be configured to cause the apparatus to perform a method of any of aspects 12 through 15.

Aspect 35: An apparatus for wireless communication at a base station, comprising at least one means for performing a method of any of aspects 12 through 15.

Aspect 36: A non-transitory computer-readable medium storing code for wireless communication at a base station, the code comprising instructions executable by a processor to perform a method of any of aspects 12 through 15.

Aspect 37: An apparatus for wireless communication comprising a processor and memory coupled to the processor. The processor and memory may be configured to cause the apparatus to perform a method of any of aspects 16 through 23.

Aspect 38: An apparatus for wireless communication at a first device, comprising at least one means for performing a method of any of aspects 16 through 23.

Aspect 39: A non-transitory computer-readable medium storing code for wireless communication at a first device, the code comprising instructions executable by a processor to perform a method of any of aspects 16 through 23.

Aspect 40: An apparatus for wireless communication comprising a processor and memory coupled to the processor. The processor and memory may be configured to cause the apparatus to perform a method of any of aspects 24 through 30.

Aspect 41: An apparatus for wireless communication at a base station, comprising at least one means for performing a method of any of aspects 24 through 30.

Aspect 42: A non-transitory computer-readable medium storing code for wireless communication at a base station, the code comprising instructions executable by a processor to perform a method of any of aspects 24 through 30.

Aspect 43: A method for wireless communications at a UE, comprising: performing a first random-access procedure to establish a control link with a base station, the UE comprising a reflective surface for forwarding signals from the base station to a device in a wireless network, detecting that the control link with the base station is lost based at least in part on a timer or counter expiring or based at least in part on failing to receive signaling from the base station, and performing a second random-access procedure to re-establish the control link with the base station based at least in part on detecting that the control link with the base station is lost.

Aspect 44: The method of aspect 1, further comprising: failing to receive one or more periodic indicators in a control channel, wherein detecting that the control link with the base station is lost is based at least in part on failing to receive the one or more periodic indicators in the control channel.

Aspect 45: The method of any one of aspects 1 or 2, further comprising: incrementing a counter after failing to receive each of the one or more periodic indicators in the control channel, wherein detecting that the control link with the base station is lost is based at least in part on the counter exceeding a threshold.

Aspect 46: The method of any one of aspects 1 through 3, further comprising: decrementing a counter after failing to receive each of the one or more periodic indicators in the control channel, wherein detecting that the control link with the base station is lost is based at least in part on the counter reaching zero.

Aspect 47: The method of any one of aspects 1 through 4, further comprising: identifying that the control link with the base station is valid for a duration of the timer, wherein detecting that the control link with the base station is lost is based at least in part on the timer expiring.

Aspect 48: The method of any one of aspects 1 through 5, further comprising: failing to detect energy from the base station for a duration of the timer, wherein detecting that the control link with the base station is lost is based at least in part on failing to detect the energy from the base station for the duration of the timer.

Aspect 49: The method of any one of aspects 1 through 6, further comprising: restarting the timer after detecting energy from the base station.

Aspect 50: The method of any one of aspects 1 through 7, wherein performing the second random-access procedure comprises: performing a contention-free random-access procedure using a C-RNTI to re-establish the control link with the base station.

Aspect 51: A method for wireless communications at a base station, comprising: performing a first random-access procedure to establish a control link with a user equipment (UE), the UE comprising a reflective surface for forwarding signals from the base station to a device in a wireless network, transmitting signaling to the UE to maintain the control link with the UE, and performing a second random-access procedure to re-establish the control link with the UE after the control link with the UE is lost.

Aspect 52: The method of aspect 9, wherein transmitting signaling to the UE to maintain the control link with the UE comprises: transmitting one or more periodic indicators in a control channel to the base station, wherein the control link with the UE is lost when the UE fails to receive a threshold number of the one or more periodic indicators.

Aspect 53: The method of any one of aspects 9 or 10, wherein performing the second random-access procedure comprises: performing a contention-free random-access procedure using a C-RNTI to re-establish the control link with the UE.

Aspect 54: A method for wireless communications at a UE, comprising: performing a first random-access procedure to establish a control link with a base station, the UE comprising a reflective surface for forwarding signals from the base station to a device in a wireless network, and transmitting an uplink transmission to the base station to maintain the control link with the base station.

Aspect 55: The method of aspect 12, wherein the uplink transmission comprises a scheduling request.

Aspect 56: The method of any one of aspects 12 or 13, wherein the uplink transmission comprises a periodic uplink transmission.

Aspect 57: The method of any one of aspects 12 through 14, further comprising: receiving a request for the uplink transmission from the UE in response to a downlink transmission, and receiving the downlink transmission from the base station, wherein the uplink transmission is received in response to the downlink transmission.

Aspect 58: The method of any one of aspects 12 through 15, wherein transmitting the uplink transmission to the base station comprises: transmitting a random-access preamble indicating a quantity of control commands received from the base station.

Aspect 59: A method for wireless communications at a base station, comprising: performing a first random-access procedure to establish a control link with a UE, the UE comprising a reflective surface for forwarding signals from the base station to a device in a wireless network, and receiving an uplink transmission from the UE to maintain the control link with the base station.

Aspect 60: The method of aspect 17, further comprising: failing to receive one or more uplink transmissions from the UE, detecting that the control link with the UE is lost based at least in part on failing to receive the one or more uplink transmissions from the UE, and avoiding transmitting downlink signals to the UE for forwarding to the device in the wireless network until the UE performs a second random-access procedure to re-establish the control link with the base station.

Aspect 61: The method of any one of aspects 17 or 18, wherein the uplink transmission comprises a scheduling request.

Aspect 62: The method of any one of aspects 17 through 19, wherein the uplink transmission comprises a periodic uplink transmission.

Aspect 63: The method of any one of aspects 17 through 20, further comprising: transmitting a request for the uplink transmission from the UE in response to a downlink transmission, and transmitting the downlink transmission to the UE, wherein the uplink transmission is received in response to the downlink transmission.

Aspect 64: The method of any one of aspects 17 through 21, wherein receiving the uplink transmission from the UE comprises: receiving a random-access preamble indicating a first quantity of control commands received from the base station.

Aspect 65: The method of any one of aspects 17 through 22, further comprising: determining that a second quantity of control commands transmitted by the base station exceeds the first quantity of control commands received by the UE by a threshold amount, detecting that the control link with the UE is lost based at least in part on the determining, and avoiding transmitting downlink signals to the UE for forwarding to the device in the wireless network until the UE performs a second random-access procedure to re-establish the control link with the base station.

Aspect 66: An apparatus for wireless communication comprising at least one means for performing a method of any one of aspects 43 through 50.

Aspect 67: An apparatus for wireless communication comprising a processor and memory coupled to the processor. The processor and memory may be configured to cause the apparatus to perform a method of any one of aspects 43 through 50.

Aspect 68: A non-transitory computer-readable medium storing code for wireless communication comprising a processor, memory coupled to the processor, and instructions stored in the memory and executable by the processor to cause the apparatus to perform a method of any one of aspects 43 through 50.

Aspect 69: An apparatus for wireless communication comprising at least one means for performing a method of any one of aspects 51 through 53.

Aspect 70: An apparatus for wireless communication comprising a processor and memory coupled to the processor. The processor and memory may be configured to cause the apparatus to perform a method of any one of aspects 51 through 53.

Aspect 71: A non-transitory computer-readable medium storing code for wireless communication comprising a processor, memory coupled to the processor, and instructions stored in the memory and executable by the processor to cause the apparatus to perform a method of any one of aspects 51 through 53.

Aspect 72: An apparatus for wireless communication comprising at least one means for performing a method of any one of aspects 54 through 58.

Aspect 73: An apparatus for wireless communication comprising a processor and memory coupled to the processor. The processor and memory may be configured to cause the apparatus to perform a method of any one of aspects 54 through 58.

Aspect 74: A non-transitory computer-readable medium storing code for wireless communication comprising a processor, memory coupled to the processor, and instructions stored in the memory and executable by the processor to cause the apparatus to perform a method of any one of aspects 54 through 58.

Aspect 75: An apparatus for wireless communication comprising at least one means for performing a method of any one of aspects 59 through 65.

Aspect 76: An apparatus for wireless communication comprising a processor and memory coupled to the processor. The processor and memory may be configured to cause the apparatus to perform a method of any one of aspects 59 through 65.

Aspect 77: A non-transitory computer-readable medium storing code for wireless communication comprising a processor, memory coupled to the processor, and instructions stored in the memory and executable by the processor to cause the apparatus to perform a method of any one of aspects 59 through 65.

Aspect 78: A method for wireless communications at a UE, comprising: initiating a random-access procedure to connect to a base station, transmitting, to the base station, an indication that the UE comprises a reflective surface for forwarding signals from the base station to a device in a wireless network, and receiving signals from the base station for forwarding to the device in the wireless network based at least in part on transmitting the indication.

Aspect 79: The method of aspect 78, wherein transmitting the indication that the UE comprises the reflective surface comprises: transmitting a random-access preamble indicating that the UE comprises the reflective surface.

Aspect 80: The method of any one of aspects 78 or 79, further comprising: identifying the random-access preamble from one or more random-access preambles reserved for indicating that the UE comprises the reflective surface.

Aspect 81: The method of any one of aspects 78 through 80, wherein transmitting the indication that the UE comprises the reflective surface comprises: transmitting a first random-access message in a two-step random-access procedure comprising the indication that the UE comprises the reflective surface.

Aspect 82: The method of any one of aspects 78 through 81, wherein transmitting the indication that the UE comprises the reflective surface comprises: transmitting a third random-access message in a four-step random-access procedure comprising the indication that the UE comprises the reflective surface.

Aspect 83: The method of any one of aspects 78 through 82, wherein transmitting the indication that the UE comprises the reflective surface comprises: transmitting, after the random-access procedure, an RRC message indicating that the UE comprises the reflective surface.

Aspect 84: The method of any one of aspects 78 through 83, further comprising: receiving an indication of one or more random-access preambles reserved for indicating that the UE comprises the reflective surface, and transmitting, as part of a subsequent random-access procedure, a random-access preamble of the one or more random-access preambles indicating that the UE comprises the reflective surface.

Aspect 85: The method of any one of aspects 78 through 84, further comprising receiving, from the base station, a command indicating a sweep pattern, sweep direction, center frequency, bandwidth, or a combination thereof for forwarding signals from the base station to the device in the wireless network, and forwarding signals from the base station to the device in the wireless network based at least in part on receiving the command.

Aspect 86: The method of any one of aspects 78 through 85, further comprising: receiving, from the base station, a command indicating positive or negative feedback for signals forwarded from the base station to the device in the wireless network, tuning parameters for forwarding signals from the base station to the device in the wireless network based at least in part on the command, and forwarding signals from the base station to the device in the wireless network based at least in part on the tuning.

Aspect 87: The method of any one of aspects 78 through 86, further comprising: transmitting an indication of a location of the device in the wireless network to the base station.

Aspect 88: The method of any one of aspects 78 through 87, further comprising: receiving one or more signals from the base station, and reflecting the one or more signals back to the base station at a same angle at which the one or more signals are received.

Aspect 89: The method of any one of aspects 78 through 88, wherein the UE comprises a low-power UE and the reflective surface comprises an IRS.

Aspect 90: A method for wireless communications at a base station, comprising: receiving, from a UE, an indication that the UE comprises a reflective surface for forwarding signals from the base station to a device in a wireless network, and transmitting signals to the UE for forwarding to the device in the wireless network based at least in part on receiving the indication.

Aspect 91: The method of aspect 90, wherein receiving the indication that the UE comprises the reflective surface comprises: receiving a random-access preamble indicating that the UE comprises the reflective surface.

Aspect 92: The method of any one of aspects 90 or 91, wherein receiving the indication that the UE comprises the reflective surface comprises: receiving a first random-access message in a two-step random-access procedure comprising the indication that the UE comprises the reflective surface.

Aspect 93: The method of any one of aspects 90 through 92, wherein receiving the indication that the UE comprises the reflective surface comprises: receiving a third random-access message in a four-step random-access procedure comprising the indication that the UE comprises the reflective surface.

Aspect 94: The method of any one of aspects 90 through 93, wherein receiving the indication that the UE comprises the reflective surface comprises: receiving, after a random-access procedure, an RRC message indicating that the UE comprises the reflective surface.

Aspect 95: The method of any one of aspects 90 through 94, further comprising: transmitting, to the UE, an indication of one or more random-access preambles reserved for indicating that the UE comprises the reflective surface and receiving, from the UE as part of a subsequent random-access procedure, a random-access preamble of the one or more random-access preambles indicating that the UE comprises the reflective surface.

Aspect 96: The method of any one of aspects 90 through 95, further comprising: transmitting, to the UE, a command indicating a sweep pattern, sweep direction, center frequency, bandwidth, or a combination thereof for forwarding signals from the base station to the device in the wireless network.

Aspect 97: The method of any one of aspects 90 through 96, further comprising: receiving, from the device in the wireless network, feedback on signals forwarded by the UE from the base station to the device in the wireless network, wherein transmitting the command is based at least in part on the received feedback.

Aspect 98: The method of any one of aspects 90 through 97, further comprising: receiving, from the device in the wireless network, feedback on signals forwarded by the UE from the base station to the device in the wireless network and transmitting, to the UE, a command indicating positive or negative feedback for signals forwarded from the base station to the device in the wireless network based at least in part on receiving the feedback.

Aspect 99: The method of any one of aspect 90 through 98, further comprising: transmitting, to the UE on a plurality of beams, a plurality of signals for forwarding to the device in the wireless network, receiving, from the device in the wireless network, feedback on the plurality of signals forwarded by the UE from the base station to the device in the wireless network, identifying a beam of the plurality of beams associated with a highest quality based at least in part on the received feedback, and selecting the identified beam for transmitting signals to the UE for forwarding to the device in the wireless network.

Aspect 100: The method of any one of aspects 90 through 99, further comprising: receiving an indication of a location of the UE and selecting a beam for transmitting signals to the UE for forwarding to the device in the wireless network based at least in part on the location of the UE.

Aspect 101: The method of any one of aspects 90 through 100, further comprising: transmitting a plurality of signals to the UE on a plurality of beams, receiving a reflection of the plurality of signals from the UE at a same angle at which the plurality of signals are transmitted to the UE on the plurality of beams, identifying a beam of the plurality of beams associated with a highest quality based at least in part on receiving the reflection, and selecting the identified beam for transmitting signals to the UE for forwarding to the device in the wireless network.

Aspect 102: The method of any one of aspects 90 through 101, further comprising: selecting a beam identified in the random-access procedure for transmitting signals to the UE for forwarding to the device in the wireless network.

Aspect 103: The method of any one of aspects 90 through 102, wherein the UE comprises a low-power UE and the reflective surface comprises an IRS.

Aspect 104: An apparatus for wireless communication comprising at least one means for performing a method of any one of aspects 78 through 89.

Aspect 105: An apparatus for wireless communication comprising a processor and memory coupled to the processor. The processor and memory may be configured to cause the apparatus to perform a method of any one of aspects 78 through 89.

Aspect 106: A non-transitory computer-readable medium storing code for wireless communication comprising a processor, memory coupled to the processor, and instructions stored in the memory and executable by the processor to cause the apparatus to perform a method of any one of aspects 78 through 89.

Aspect 107: An apparatus for wireless communication comprising at least one means for performing a method of any one of aspects 90 through 103.

Aspect 108: An apparatus for wireless communication comprising a processor and memory coupled to the processor. The processor and memory may be configured to cause the apparatus to perform a method of any one of aspects 90 through 103.

Aspect 109: A non-transitory computer-readable medium storing code for wireless communication comprising a processor, memory coupled to the processor, and instructions stored in the memory and executable by the processor to cause the apparatus to perform a method of any one of aspects 90 through 103.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first device, comprising:
   one or more memories; and
   one or more processors coupled with the one or more memories and configured to cause the first device to:
   establish, as part of a first random access procedure, a first link with a network entity via communication of random-access messages, wherein the first link comprises a control link to control a state of the first device, wherein a control signal to control the state of the first device is embedded in one or more of the random-access messages, the control signal associated with the control link;
   refrain from communication of radio resource control (RRC) signaling with the network entity based at least in part on establishment of the first link;
   detect that the first link with the network entity is lost based at least in part on expiry of a timer or a counter, or based at least in part on a failure to receive signaling from the network entity; and
   re-establish the first link with the network entity based at least in part on the detection that the first link with the network entity is lost, the first link re-established based on a second random-access procedure.

2. The apparatus of claim 1, wherein, to establish the first link via the communication of the random-access messages and to refrain from the communication of the RRC signaling, the one or more processors are further configured to cause the first device to:
   exchange the random-access messages to establish the first link; and
   refrain from an exchange of the RRC signaling with the network entity based at least in part on the establishment of the first link.

3. The apparatus of claim 1, wherein the first device comprises a reflective surface to forward signals from the network entity to a second device in a wireless network, and wherein the forwarded signals are associated with a second link between the network entity and the second device.

4. The apparatus of claim 3, wherein:
   the first device comprises a first user equipment (UE); and
   the second device comprises one of a second UE or a second network entity.

5. The apparatus of claim 3, wherein the one or more processors are configured to cause the first device to:
   receive, from the network entity via the first link, a message that indicates a configuration for the reflective surface, wherein control of the state of the first device comprises control of the reflective surface via the configuration.

6. The apparatus of claim 1, wherein the one or more processors are configured to cause the first device to:
   fail to receive one or more periodic indicators in a control channel, wherein the detection that the first link with the network entity is lost is based at least in part on the failure to receive the one or more periodic indicators in the control channel.

7. The apparatus of claim 6, wherein the one or more processors are configured to cause the first device to:
   increment the counter after the failure to receive each of the one or more periodic indicators in the control channel, wherein the detection that the first link with the network entity is lost is based at least in part on exceedance of a threshold by the counter.

8. The apparatus of claim 6, wherein the one or more processors are configured to cause the first device to:
   decrement the counter after the failure to receive each of the one or more periodic indicators in the control channel, wherein the detection that the first link with the network entity is lost is based at least in part on arrival of the counter at a zero value.

9. The apparatus of claim 1, wherein
   the first link with the network entity is valid for a duration of the timer, and wherein the detection that the first link with the network entity is lost is based at least in part on expiry of the timer.

10. The apparatus of claim 1, wherein the one or more processors are configured to cause the first device to:
    fail to detect energy from the network entity for a duration of the timer,
    wherein the detection that the first link with the network entity is lost is based at least in part on the failure to detect the energy from the network entity for the duration of the timer.

11. The apparatus of claim 10, wherein the one or more processors are configured to cause the first device to:
    restart the timer after the detection of the energy from the network entity.

12. The apparatus of claim 1, wherein, to perform the second random-access procedure, the one or more processors are configured to cause the first device to:

perform a contention-free random-access procedure based at least in part on use of a cell radio network temporary identifier (C-RNTI) to re-establish the first link with the network entity.

13. The apparatus of claim 1, wherein the one or more processors are configured to cause the first device to:
transmit, to the network entity, a random-access preamble that comprises an indication that the first device comprises a reflective surface, wherein the random-access preamble initiates the communication of the random-access messages with the network entity.

14. The apparatus of claim 13, wherein
the random-access preamble is selected from one or more random-access preambles reserved for indication that the first device comprises the reflective surface.

15. An apparatus for wireless communication at a network entity, comprising:
one or more memories; and
one or more processors coupled with the one or more memories and configured to cause the network entity to:
establish a first link with a first device via a first random-access procedure, wherein the first link comprises a control link to control a state of the first device;
output, to the first device via the first link, a message that indicates a configuration for a reflective surface;
output signaling to the first device to maintain the first link with the first device; and
perform a second random-access procedure to re-establish the first link with the first device after the first link with the first device is lost.

16. The apparatus of claim 15, wherein, to establish the first link, the one or more processors are configured to cause the network entity to:
communicate random-access messages to establish the first link; and
refrain from communication of radio resource control (RRC) signaling with the first device after the first link is established.

17. The apparatus of claim 15, wherein, to establish the first link, the one or more processors are configured to cause the network entity to:
exchange random-access messages to establish the first link; and
refrain from an exchange of radio resource control (RRC) signaling with the first device after the first link is established.

18. The apparatus of claim 15, wherein the first device comprises the reflective surface to forward signals from the network entity to a second device in a wireless network, and wherein the forwarded signals are associated with a second link between the network entity and the second device.

19. The apparatus of claim 15, wherein the message that indicates the configuration for the reflective surface comprises a control signal to control the state of the first device, the control signal embedded in one or more random-access messages of the first random-access procedure.

20. The apparatus of claim 15, wherein, to output signaling to the first device to maintain the first link with the first device, the one or more processors are configured to cause the network entity to:
output one or more periodic indicators in a control channel to the first device, wherein the first link with the first device is lost based at least in part on a failure of the first device to receive a threshold number of the one or more periodic indicators.

21. The apparatus of claim 15, wherein the one or more processors are configured to cause the network entity to:
obtain, from the first device, a random-access preamble that comprises an indication the first device comprises the reflective surface, wherein the random-access preamble initiates the first random-access procedure with the first device.

22. The apparatus of claim 15, wherein, to perform the second random-access procedure, the one or more processors are configured to cause the network entity to:
perform a contention-free random-access procedure based at least in part on use of a cell radio network temporary identifier (C-RNTI) to re-establish the first link with the first device.

23. A method for wireless communication at a first device, comprising:
establishing, as part of a first random access procedure, a first link with a network entity via communicating random-access messages, the first link comprising a control link to control a state of the first device, a control signal to control the state of the first device being embedded in one or more of the random-access messages, the control signal associated with the control link;
refraining from communicating radio resource control (RRC) signaling with the network entity after establishing the first link;
detecting that the first link with the network entity is lost based at least in part on a timer or a counter expiring or based at least in part on failing to receive signaling from the network entity; and
re-establishing the first link with the network entity based at least in part on the detecting that the first link with the network entity is lost, the first link re-established based on a second random-access procedure.

24. The method of claim 23, the communicating the random-access messages and the refraining from communicating the RRC signaling comprising:
exchanging the random-access messages to establish the first link; and
refraining from exchanging the RRC signaling with the network entity based at least in part on establishing the first link.

25. The method of claim 23, the first device comprising a reflective surface to forward signals from the network entity to a second device in a wireless network, the forwarded signals being associated with a second link between the network entity and the second device.

26. The method of claim 25, further comprising:
receiving, from the network entity via the first link, a message indicating a configuration for the reflective surface, the controlling the state of the first device comprising controlling the reflective surface via the configuration.

27. The method of claim 23, further comprising:
failing to receive one or more periodic indicators in a control channel, the detecting that the first link with the network entity is lost being based at least in part on the failing to receive the one or more periodic indicators in the control channel.

28. A method for wireless communication at a network entity, comprising:
establishing a first link with a first device via a first random-access procedure, the first link comprising a control link to control a state of the first device;
outputting, to the first device via the first link, a message indicating a configuration for a reflective surface;

outputting signaling to the first device to maintain the first link with the first device; and performing a second random-access procedure to re-establish the first link with the first device after the first link with the first device is lost.

29. The method of claim 28, the establishing of the first link comprising:

communicating random-access messages with the first device based at least in part on establishing the first link; and refraining from communicating radio resource control (RRC) signaling with the first device after establishing the first link.

30. The method of claim 28, the establishing the first link comprising:

exchanging random-access messages with the first device based at least in part on establishing the first link; and refraining from exchanging radio resource control (RRC) signaling with the first device after establishing the first link.

31. The method of claim 28, the first device comprising the reflective surface for forwarding signals from the network entity to a second device in a wireless network, the forwarded signals being associated with a second link between the network entity and the second device.

32. The method of claim 28, the outputting signaling to the first device to maintain the first link with the first device comprising:

outputting one or more periodic indicators in a control channel to the first device, the first link with the first device being lost based at least in part on the first device failing to receive a threshold number of the one or more periodic indicators.

33. A non-transitory computer-readable medium storing code for wireless communication at a first device, the code comprising instructions executable by one or more processors to cause the first device to:

establish, as part of a first random-access procedure, a first link with a network entity via communication of random-access messages, wherein the first link comprises a control link to control a state of the first device, wherein a control signal to control the state of the first device is embedded in one or more of the random-access messages, the control signal associated with the control link;

refrain from communication of radio resource control (RRC) signaling with the network entity after the first link is established;

detect that the first link with the network entity is lost based at least in part on expiry of a timer or a counter or based at least in part on a failure to receive signaling from the network entity; and re-establish the first link with the network entity based at least in part on the detection that the first link with the network entity is lost, the first link re-established based on a second random-access procedure.

34. The non-transitory computer-readable medium of claim 33, wherein, to establish the first link via the communication of the random-access messages and to refrain from the communication of the RRC signaling, the instructions are further executable by the one or more processors to cause the first device to:

exchange the random-access messages to establish the first link; and refrain from an exchange of the RRC signaling with the first device based at least in part on establishment of the first link.

35. A non-transitory computer-readable medium storing code for wireless communication at a network entity, the code comprising instructions executable by one or more processors to cause the network entity to:

establishing a first link with a first device via a first random access procedure, wherein the first link comprises a control link to control a state of the first device;

outputting, to the first device via the first link, a message indicating a configuration for a reflective surface;

outputting signaling to the first device to maintain the first link with the first device; and performing a second random-access procedure to re-establish the first link with the first device after the first link with the first device is lost.

36. The non-transitory computer-readable medium of claim 35, wherein, to establish the first link, the instructions are further executable by the one or more processors to cause the network entity to:

exchange random-access messages to establish the first link; and refrain from an exchange of radio resource control (RRC) signaling with the first device after the first link is established.

37. The non-transitory computer-readable medium of claim 35, wherein, to establish the first link, the instructions are further executable by the one or more processors to cause the network entity to:

communicate random-access messages to establish the first link; and refrain from communication of radio resource control (RRC) signaling with the first device after the first link is established.

* * * * *